United States Patent
Redfern et al.

(10) Patent No.: US 10,809,933 B2
(45) Date of Patent: Oct. 20, 2020

(54) MATRIX TRANSFER ACCELERATOR SYSTEM AND METHOD

(71) Applicant: TEXAS INSTRUMENTS INCORPORATED, Dallas, TX (US)

(72) Inventors: Arthur John Redfern, Plano, TX (US); Asheesh Bhardwaj, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 196 days.

(21) Appl. No.: 15/907,042

(22) Filed: Feb. 27, 2018

(65) Prior Publication Data

US 2018/0246669 A1    Aug. 30, 2018

Related U.S. Application Data

(60) Provisional application No. 62/465,620, filed on Mar. 1, 2017, provisional application No. 62/464,954, filed
(Continued)

(51) Int. Cl.
*G06F 3/00* (2006.01)
*G06F 3/06* (2006.01)
(Continued)

(52) U.S. Cl.
CPC .......... *G06F 3/0647* (2013.01); *G06F 3/0613* (2013.01); *G06F 3/0683* (2013.01);
(Continued)

(58) Field of Classification Search
None
See application file for complete search history.

(56) References Cited

U.S. PATENT DOCUMENTS

| 4,897,717 A | 1/1990 | Hamilton et al. |
| 5,099,447 A | 3/1992 | Myszewski |

(Continued)

OTHER PUBLICATIONS

Notification of Transmittal of the International Search Report and the Written Opinion of the International Searching Authority, or the Declaration; PCT/US 2018/019746; dated Jan. 31, 2019; 8 pages.
(Continued)

*Primary Examiner* — Charles Rones
*Assistant Examiner* — Han V Doan
(74) *Attorney, Agent, or Firm* — Brian D. Graham; Charles A. Brill; Frank D. Cimino

(57) ABSTRACT

A matrix transfer accelerator (MTA) system/method that coordinates data transfers between an external data memory (EDM) and a local data memory (LDM) using matrix tiling and/or grouping is disclosed. The system utilizes foreground/background buffering that overlaps compute and data transfer operations and permits EDM-to-LDM data transfers with or without zero pad peripheral matrix filling. The system may incorporate an automated zero-fill direct memory access (DMA) controller (ZDC) that transfers data from the EDM to the LDM based on a set of DMA controller registers including data width register (DWR), transfer count register (TCR), fill count register (FCR), EDM source address register (ESR), and LDM target address register (LTR). The ZDC transfers matrix data from the EDM[ESR] to the LDM[LTR] such that EDM matrix data of DWR row data width is automatically zero-filled around a periphery of a matrix written to the LDM matrix based on the FCR value.

15 Claims, 45 Drawing Sheets

Related U.S. Application Data on Feb. 28, 2017, provisional application No. 62/464,964, filed on Feb. 28, 2017.

(51) Int. Cl.
*G06F 17/16* (2006.01)
*G06F 15/00* (2006.01)
*G06N 3/04* (2006.01)

(52) U.S. Cl.
CPC .............. *G06F 15/00* (2013.01); *G06F 17/16* (2013.01); *G06N 3/0454* (2013.01)

(56) References Cited

U.S. PATENT DOCUMENTS

| | | | |
|---|---|---|---|
| 5,745,793 | A | 4/1998 | Atsatt et al. |
| 5,870,568 | A | 2/1999 | Culkey et al. |
| 5,982,375 | A | 11/1999 | Nelson et al. |
| 8,301,749 | B1 | 10/2012 | Finklestein et al. |
| 9,606,803 | B2 | 3/2017 | Anderson et al. |
| 9,645,974 | B1 | 5/2017 | Patil et al. |
| 10,114,613 | B2 | 10/2018 | Bekas et al. |
| 2002/0191692 | A1 | 12/2002 | Fallon et al. |
| 2004/0136316 | A1 | 7/2004 | Kwak et al. |
| 2009/0292758 | A1 | 11/2009 | Brokenshire et al. |
| 2009/0300091 | A1 | 12/2009 | Brokenshire et al. |
| 2011/0153707 | A1 | 6/2011 | Ginzburg et al. |
| 2012/0011348 | A1 | 1/2012 | Eichenberger et al. |
| 2012/0072917 | A1 | 3/2012 | Boldyrev et al. |
| 2012/0140814 | A1 | 6/2012 | Sole Rojals et al. |
| 2012/0251013 | A1 | 10/2012 | Porikli |
| 2012/0268298 | A1 | 10/2012 | Oh |
| 2013/0262548 | A1 | 10/2013 | Ge et al. |
| 2014/0167987 | A1 | 6/2014 | Pell et al. |
| 2014/0365548 | A1 | 12/2014 | Mortensen |
| 2017/0139710 | A1 | 5/2017 | Zbiciak |
| 2017/0153890 | A1 | 6/2017 | Anderson et al. |
| 2017/0153959 | A1 | 6/2017 | Zbiciak |
| 2017/0168898 | A1 | 6/2017 | Zbiciak et al. |
| 2017/0249150 | A1 | 8/2017 | Zbiciak et al. |
| 2017/0308381 | A1 | 10/2017 | Zbiciak |
| 2019/0266218 | A1 | 8/2019 | Scott et al. |

OTHER PUBLICATIONS

International Search Report and Written Opinion, PCT/US2018/020334, dated Jun. 7, 2018 (11 pages).

Notification of Transmittal of the International Search Report and the Written Opinion of the International Searching Authority, or the Declaration; PCT/US 2018/020462; dated Aug. 9, 2018, 6 pages.

Notification of Transmittal of the International Search Report and the Written Opinion of the International Searching Authority, or the Declaration; PCT/US 2018/020283; dated Aug. 23, 2018, 8 pages.

Extended European Search Report; App. Pat. No. 18760733.8-1231/3590048 PCT/US2018020462; dated Feb. 4, 2020; 8 pages.

Utku Aydoinat, et al. "An Open CL(TM) Deep Learning Accelerator on Arria 10", arxiv.org, Cornell University Library, 201 Olin Library, Cornell University Ithaca, NY 14853, Jan. 13, 2017, XP080741254.

Hussain Tassadaq, et al. "PPMC: A Program Pattern Based Mwmory Controller", Mar. 19, 2012, International Conference on Financial Cryptography and Data Security; [Lecture Notes in Computer Science; Lect. Noptes Computer], Springer, Berlin,Heidelberg, pp. 89-101, XP047379471, ISBN: 978-3-642-17318-9.

Chen Zhang et al."Optimizing FPGA-based Accelerator Design for Deep Convolutional Neural Networks", Proceedings of the 2015 ACM/SIGDA International Symposium of Field-Programmable Gate Arrays, FPGA,15, Feb. 22, 2015, pp. 161-170, XP055265150, New, NY, USA, DOI: 10.1145/2684746.2689060, ISBN:978-45033315-3.

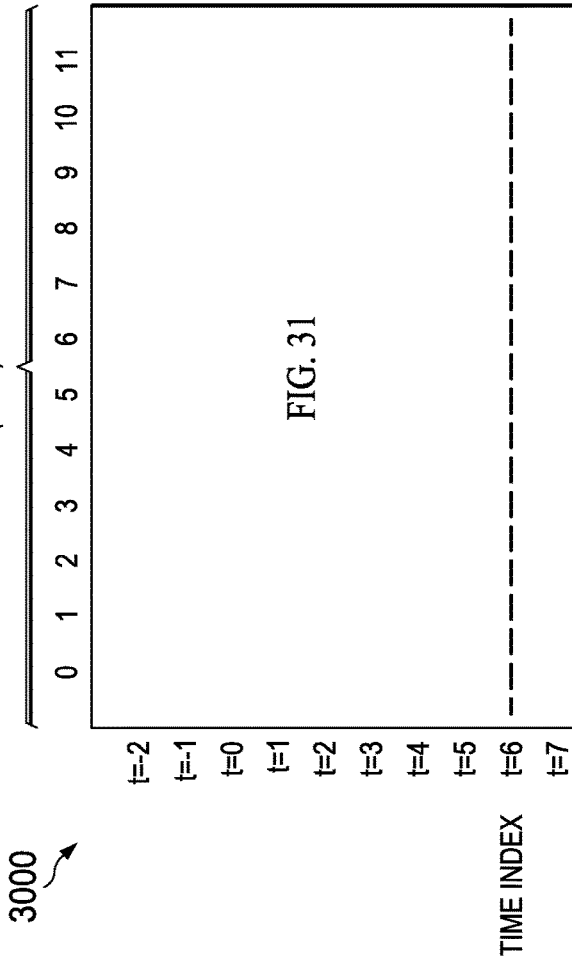
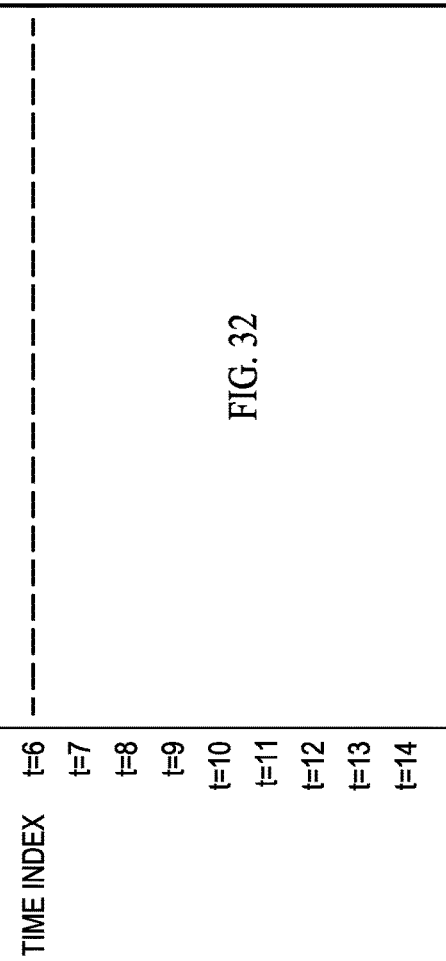
FIG. 30

FIG. 32

MATRIX TRANSFER ACCELERATOR SYSTEM AND METHOD

CROSS REFERENCE TO RELATED APPLICATIONS

This patent application claims benefit under 35 U.S.C. § 119 and incorporates by reference United States Provisional Patent Application for A METHOD FOR USING A MATRIX MULTIPLICATION ACCELERATOR (MMA) TO IMPLEMENT FUNDAMENTAL COMPUTATIONAL PRIMITIVES by inventors Arthur John Redfern, Timothy David Anderson, Kai Chirca, Chenchi Eric Luo, and Zhenhua Yu, filed electronically with the USPTO on Mar. 1, 2017, with Ser. No. 62/465,620.

This patent application claims benefit under 35 U.S.C. § 119 and incorporates by reference United States Provisional Patent Application for A FIXED POINT MATRIX MULTIPLICATION ACCELERATOR (MMA) by inventors Arthur John Redfern, Donald Edward Steiss, Timothy David Anderson, and Kai Chirca, filed electronically with the USPTO on Feb. 28, 2017, with Ser. No. 62/464,954.

This patent application claims benefit under 35 U.S.C. § 119 and incorporates by reference United States Provisional Patent Application for METHODS FOR EFFICIENT CONVOLUTIONAL NEURAL NETWORK (CNN) DATA MOVEMENT by inventors Arthur John Redfern and Asheesh Bhardwaj, filed electronically with the USPTO on Feb. 28, 2017, with Ser. No. 62/464,964.

TECHNICAL FIELD

The present invention relates to data transfers, and more particularly to the movement of large matrices between data memories having different access times.

SUMMARY

The present disclosure pertains to a system and method for a matrix transfer accelerator. The matrix transfer accelerator interfaces an external data memory with a local data memory via a data transfer processor. The data can include input feature map storage elements, such as a large feature map storage element. Data can be transferred from the external data memory or the local data memory through a column tile process. The data may be processed or transferred in portions or as a whole, column by column, or row by row. If done in increments the increments can be increased in increment steps, until each individual portion is completed. There can also be padding done for any of the information that is not complete, or has unequal data portions or storage elements.

BRIEF DESCRIPTION OF THE DRAWINGS

Figure 20:
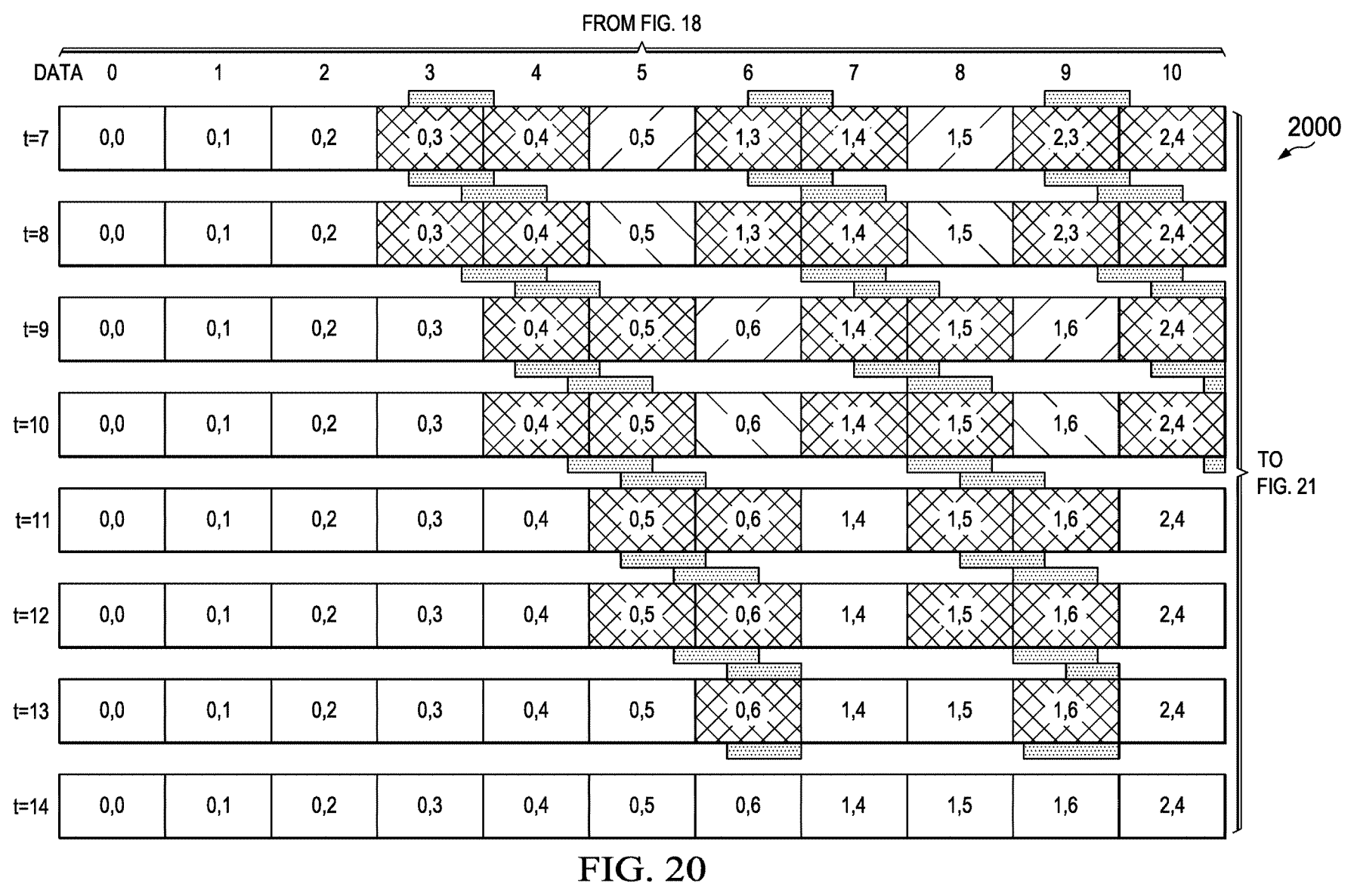

FIG. 20 illustrates an input feature map (IFM) data movement example pattern for large feature map tiles with no pad insertion incorporating partial storage in LDM with 128 B alignment for efficient EDM-to-LDM data movement that reduces local memory requirements and incorporates foreground/background data movement/compute cycles (lower left data movement quadrant—page 3 of 4);

FIG. 21 illustrates an input feature map (IFM) data movement example pattern for large feature map tiles with no pad insertion incorporating partial storage in LDM with 128 B alignment for efficient EDM-to-LDM data movement that reduces local memory requirements and incorporates foreground/background data movement/compute cycles (lower right data movement quadrant—page 4 of 4);

FIG. 24 illustrates an output feature map (OFM) data movement example pattern for large feature map tiles with no pad insertion incorporating partial storage in LDM with 128 B alignment for efficient EDM-to-LDM data movement that reduces local memory requirements and incorporates foreground/background data movement/compute cycles (lower section data movement map—page 2 of 2);

Figure 28:
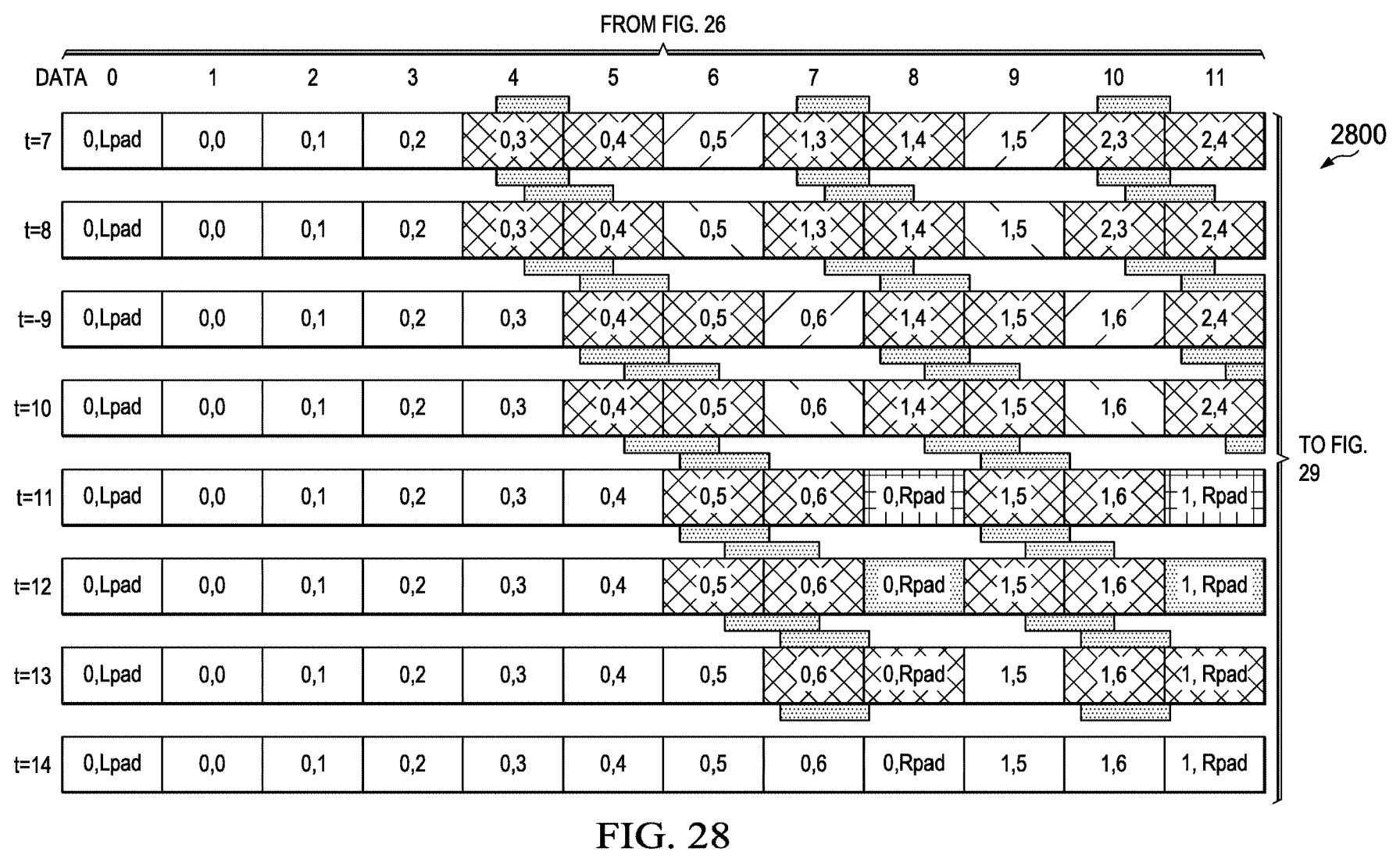

FIG. 28 illustrates an input feature map (IFM) data movement example pattern for large feature map tiles with pad insertion incorporating partial storage in LDM with 128 B alignment for efficient EDM-to-LDM data movement that reduces local memory requirements and incorporates foreground/background data movement/compute cycles (lower left data movement quadrant—page 3 of 4);

FIG. 29 illustrates an input feature map (IFM) data movement example pattern for large feature map tiles with pad insertion incorporating partial storage in LDM with 128 B alignment for efficient EDM-to-LDM data movement that reduces local memory requirements and incorporates foreground/background data movement/compute cycles (lower right data movement quadrant—page 4 of 4);

FIG. 30 illustrates an output feature map (OFM) data movement example pattern for large feature map tiles with pad insertion incorporating partial storage in LDM with 128 B alignment for efficient EDM-to-LDM data movement that reduces local memory requirements and incorporates foreground/background data movement/compute cycles (two section data movement map referencing FIG. 31-FIG. 32);

FIG. 32 illustrates an output feature map (OFM) data movement example pattern for large feature map tiles with pad insertion incorporating partial storage in LDM with 128 B alignment for efficient EDM-to-LDM data movement that reduces local memory requirements and incorporates foreground/background data movement/compute cycles (lower section data movement map—page 2 of 2);

DETAILED DESCRIPTION

Figure 1:
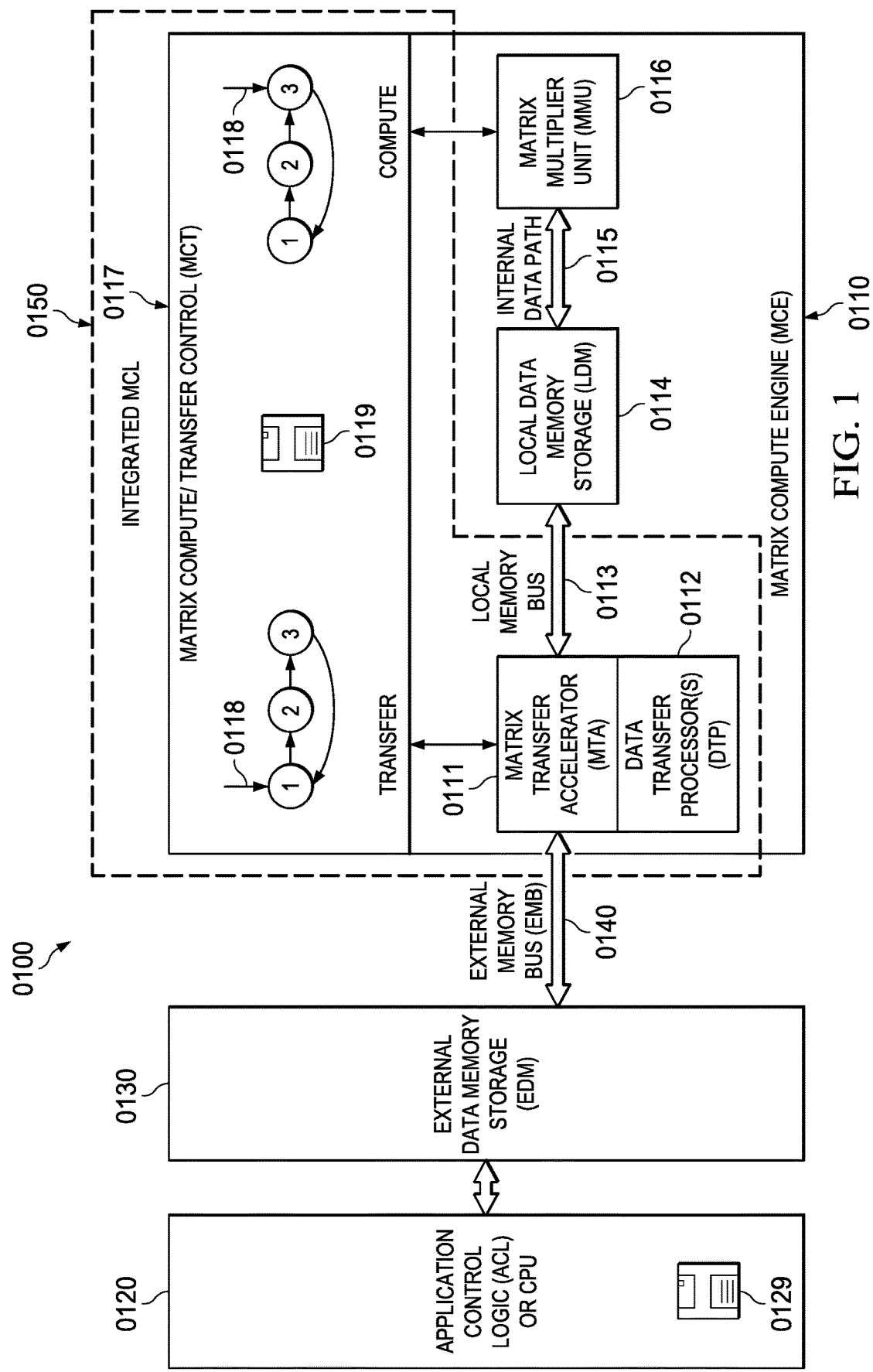
FIG. 1 illustrates a system block diagram of an embodiment of the present disclosure.

While this disclosure is susceptible of embodiment in many different forms, there is shown in the drawings and will herein be described in detailed embodiment of the disclosure with the understanding that the present disclosure is to be considered as an exemplification of the principles of the disclosure and is not intended to limit the broad aspect of the disclosure to the embodiment illustrated. However, it should be understood that this embodiment is only one example of the many advantageous uses of the innovative applications herein. In general, statements made in the specification of the present application do not necessarily limit any of the various claimed disclosures. Moreover, some statements may apply to some inventive features but not to others.

Data Widths

Within many system embodiments, the data bus width utilized by the external memory bus (EMB) will be 128 bytes (128 B), but this is not a limitation on the scope of the present disclosure. Additionally, for simplicity of presentation, examples contained herein are illustrated for 128 B data alignment boundaries, 128 B minimum external data memory (EDM) to local data memory (LDM) transfer lengths, and 64 B LDM compute lengths. Note, however, that these values are exemplary and the proposed techniques apply equally well to other data bus widths. Memory may include any volatile, non-volatile, magnetic, or electrical media, such as a random access memory (RAM), read-only memory (ROM), non-volatile RAM (NVRAM), electrically-erasable programmable ROM (EEPROM), flash memory, hard disks, or any other digital media.

Processing Data

Example embodiments may operate in the context of an integrated matrix multiplication unit (MMU) in which vectors and/or matrices are multiplied together using a wide variety of dot-matrix mathematical primitive functions, some of which are detailed in references incorporated with this patent application. Thus, the phrase "processing data" may refer to these matrix operations that may utilize tiles or groups of data stored within local data memory (LDM) as the arguments to these varied mathematical matrix operators.

Matrix Row Notation

Matrix rows (or portions thereof) may be referenced herein using the notation MATRIX[row,*] or MATRIX(row, *) to denote all columns within a particular row or equivalently in some circumstances a portion (tile or group) of columns within a given row. Alternatively, the column may also be indicated with all rows within a particular column or equivalently in some circumstances a portion (tile or group) of rows within a given column.

FSM Implementation

Example embodiments may be implemented using finite state machine (FSM) hardware logic. Within this document flowcharts are provided that detail operational steps associated with various aspects of these FSMs.

System Overview (0100)

A typical application context overview of an example embodiment is generally depicted in FIG. 1 (0100) wherein a matrix compute engine (MCE) (0110) is interfaced to application control logic (ACL) or CPU (0120) via an external data memory (EDM) (0130) and external data memory bus (0140). The matrix transfer accelerator (MTA) (0111) typically incorporates one or more data transfer processors (DTP) (0112) that perform data transfers between the EDM (0130) and the local data memory (LDM) (0114) via the internal local memory bus (LMB) (0113). The matrix transfer accelerator (MTA) (0111) coordinates overall operation of the DTP (0112) processors and interfacing between the EMB (0130) and an internal local memory bus (LMB) (0113) that permits access to local data memory (LDM) (0114) within the MCE (0110). Within this typical application context the EDM (0130) may include a large quantity of dynamic random access memory (DRAM), whereas the LDM may include a smaller quantity of much faster static random access memory (SRAM) which in many embodiments may be fully registered RAM.

The MCE (0110) typically incorporates an internal data or control path (IDP) (0115) between the LDM (0114) and a matrix multiplier unit (MMU) (0116) or other hardware accelerator that is responsible for performing high speed arithmetic operations or other functions on data contained within the LDM (0114). Control of the overall MCE (0110) arithmetic accelerator is provided by matrix compute/transfer control logic (MCT) (0117) that is typically constructed using registered logic that implements one or more finite state machines (FSMs) (0118) configured to control the overall function of the system and sequentially execute operations associated with data transfers between the EDM (0130) and the LDM (0114). As depicted in FIG. 1 (0100), in some embodiments, the MCT (0117) functionality may be integrated (Integrated Matrix Control Logic MCL (0150)) within the one or more data transfer processors (DTP) (0112) that are embodied within the overall matrix transfer accelerator (MTA) (0111) functionality. In this combined configuration, the one or more data transfer processors (DTP) (0112) provide overall control of data transfers between the EDM (0130) and the LDM (0114).

As indicated, the MCE (0110) and/or ACL (0120) may incorporate a tangible non-transitory computer readable medium (0119, 0129) that contains machine instructions, such as, a (portable or internally installed) hard drive disc, a flash drive, a compact disc, a DVD, a zip drive, a floppy disc, optical medium, magnetic medium, or any other number of possible drives or discs, that are executed by the internal logic of the MCE (0110) and ACL (0120) respectively.

Example embodiments may be implemented in a variety of application contexts wherein an integrated circuit (IC) system-on-a-chip (SOC) may incorporate a tightly or loosely coupled MTA that interfaces to host ACL/CPU hardware, DRAM memory storage, and a variety of peripheral interfaces.

CNN Application Context—Tiling and Grouping (0200)-(0400)

Figure 2:
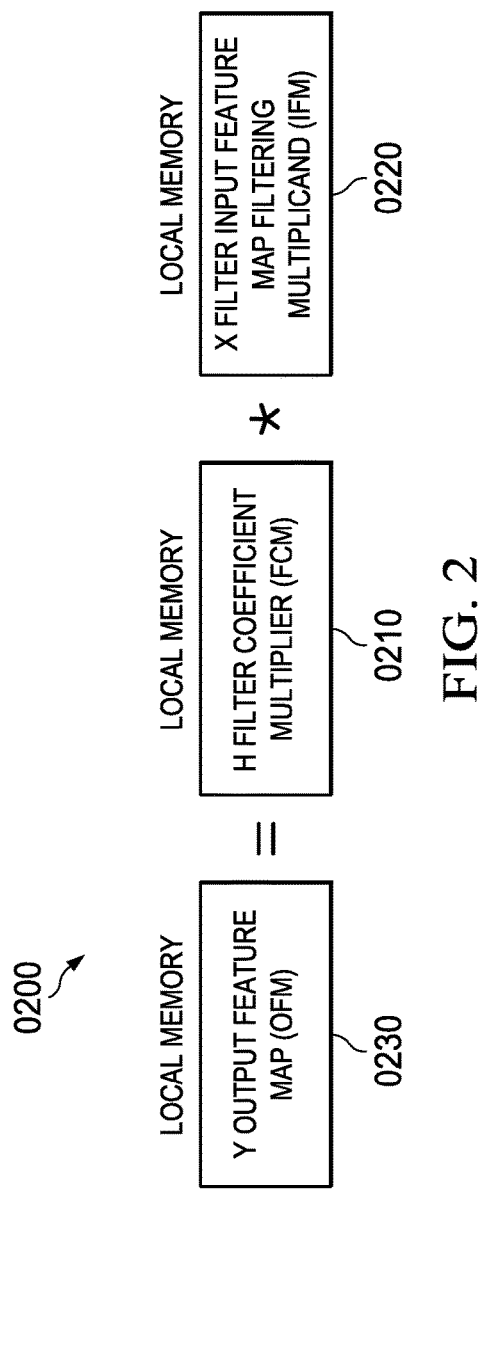
FIG. 2 illustrates a CNN matrix product calculation wherein the H filter coefficient multiplier (FCM), X input feature map filtering matrix multiplicand (IFM), and Y output feature map (OFM) are contained within local data memory (LDM)

Example embodiments will now be discussed in terms of an application context as generally depicted in FIG. 2 (0200)—FIG. 4 (0400), but the techniques of this disclosure are not limited to this application context. Here the application context discussed will relate to the use of a MCE to process convolutional neural networks (CNNs).

Convolutional neural networks (CNNs) are used for classification and may be used in (and are frequently the best performing method for) all sorts of applications relating to vision, speech, health/fitness, controls, and other applications. The keys to making CNNs run fast on a computing device are (a) providing a large amount of matrix based compute capability along with (b) efficient data movement. Unfortunately various constraints make efficient data movement difficult because of memory alignment and transfer length restrictions for optimal efficiency as well as algorithm requirements for data availability and alignment.

Example embodiments may provide systems/methods for efficient data movement that satisfy the memory alignment, transfer length, and algorithm requirements dictated by a variety of algorithm contexts including that of processing CNN data and other algorithms that may run on the MCE. An example depicting the data movement concepts in a CNN context is provided in FIG. 2 (0200) wherein a Y output feature map (OFM) (0230) is computed as the product of an H filter coefficient multiplier (FCM) (0210) and an X input feature map filtering matrix multiplicand (IFM) (0220) (an input feature map filtering matrix derived from X). In this example, if either all of the FCM (0210) or all of the IFM (0220) fit in LDM then no excess data movement is required as the FCM (0210) and IFM (0220) can be loaded and the MMU activated to produce the matrix product of FCM (0210) and IFM (0220) and store the product in the OFM (0230). As the size of the FCM (0210) or IFM (0220) exceeds the capacity of the LDM, this approach is no longer possible, as multiple data accesses to the EDM are required to process the OFM (0230) product, and this may involve non-optimal data transfers from the EMB to the LMB.

Figure 3:
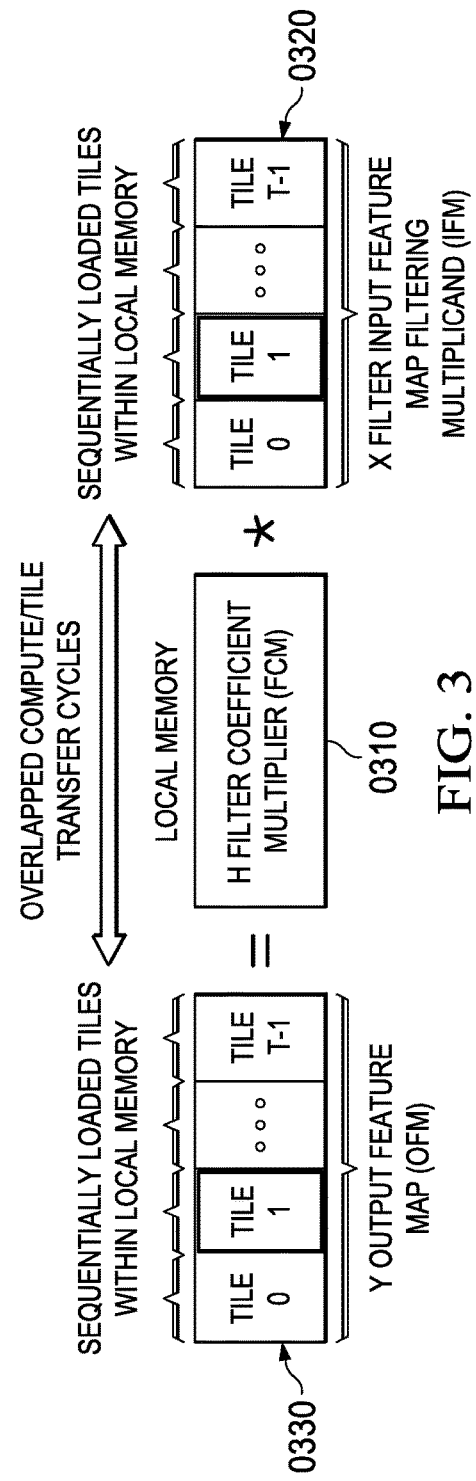
FIG. 3 illustrates a CNN matrix product calculation wherein the H filter coefficient multiplier (FCM) is contained in local data memory (LDM) and the X input feature map filtering matrix multiplicand (IFM), and Y output feature map (OFM) are processed as tiles within local data memory (LDM)

A variation of this situation is depicted in FIG. 3 (0300) wherein input feature maps IFM (0320) is larger than available LDM storage, resulting in a large OFM (0330) product that is also larger than available LDM storage. If all of the FCM (0310) fits into local memory then input feature map tiling can be used to reduce the LDM requirements of the IFM (0320). This tiling technique is useful for large IFM (0320) datasets as this permits IFM (0320) tiles to be sequentially loaded from EDM and overlap computation cycles associated with the MMU and production of the OFM (0330) product tiles.

Figure 4:
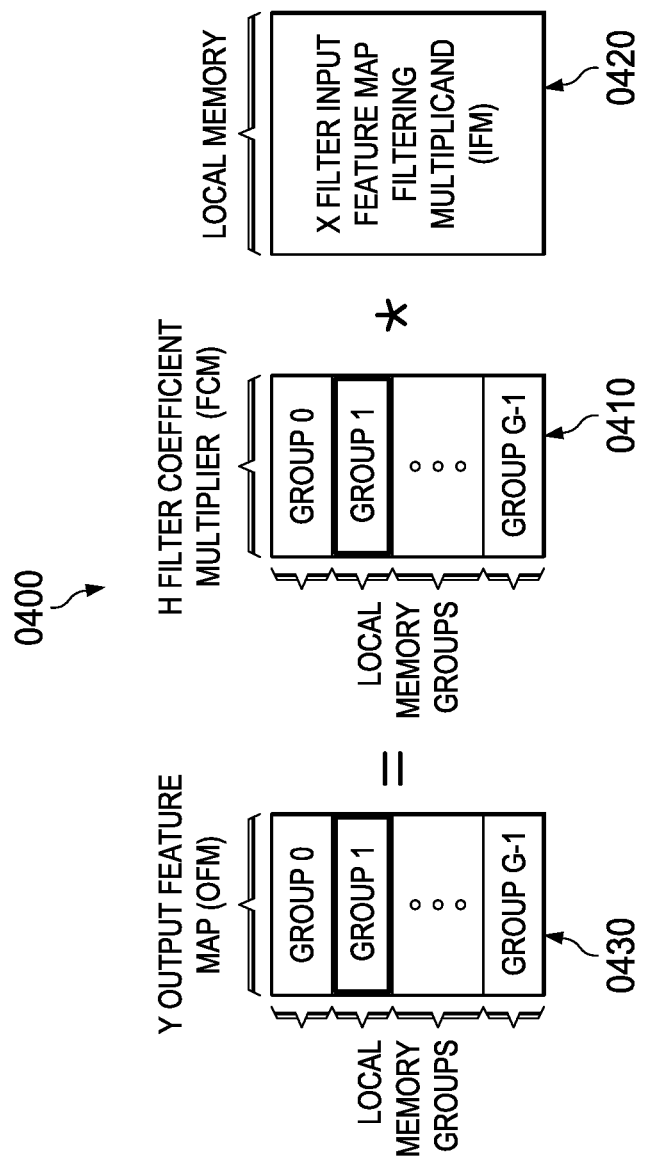
FIG. 4 illustrates a CNN matrix product calculation wherein the H filter coefficient multiplier (FCM) and Y output feature map (OFM) are processed as groups contained in local data memory (LDM) and the X input feature map filtering matrix multiplicand (IFM) is totally contained within local data memory (LDM)

Another variation of this situation is depicted in FIG. 4 (0400) wherein the FCM (0410) is larger than available LDM storage, resulting in a large OFM (0430) product that is also larger than available LDM storage. If all of the input feature maps IFM (0420) fits into local memory then output feature map grouping can be used to reduce the LDM requirements of the FCM (0410). This grouping technique is useful for small IFM (0420) datasets with many channels as this permits FCM (0410) groups to be sequentially loaded from EDM and overlap computation cycles associated with the MMU and production of the OFM (0430) product groups.

Issues Processing Large Feature Map Tiles (0500)-(0800)

Figure 5:
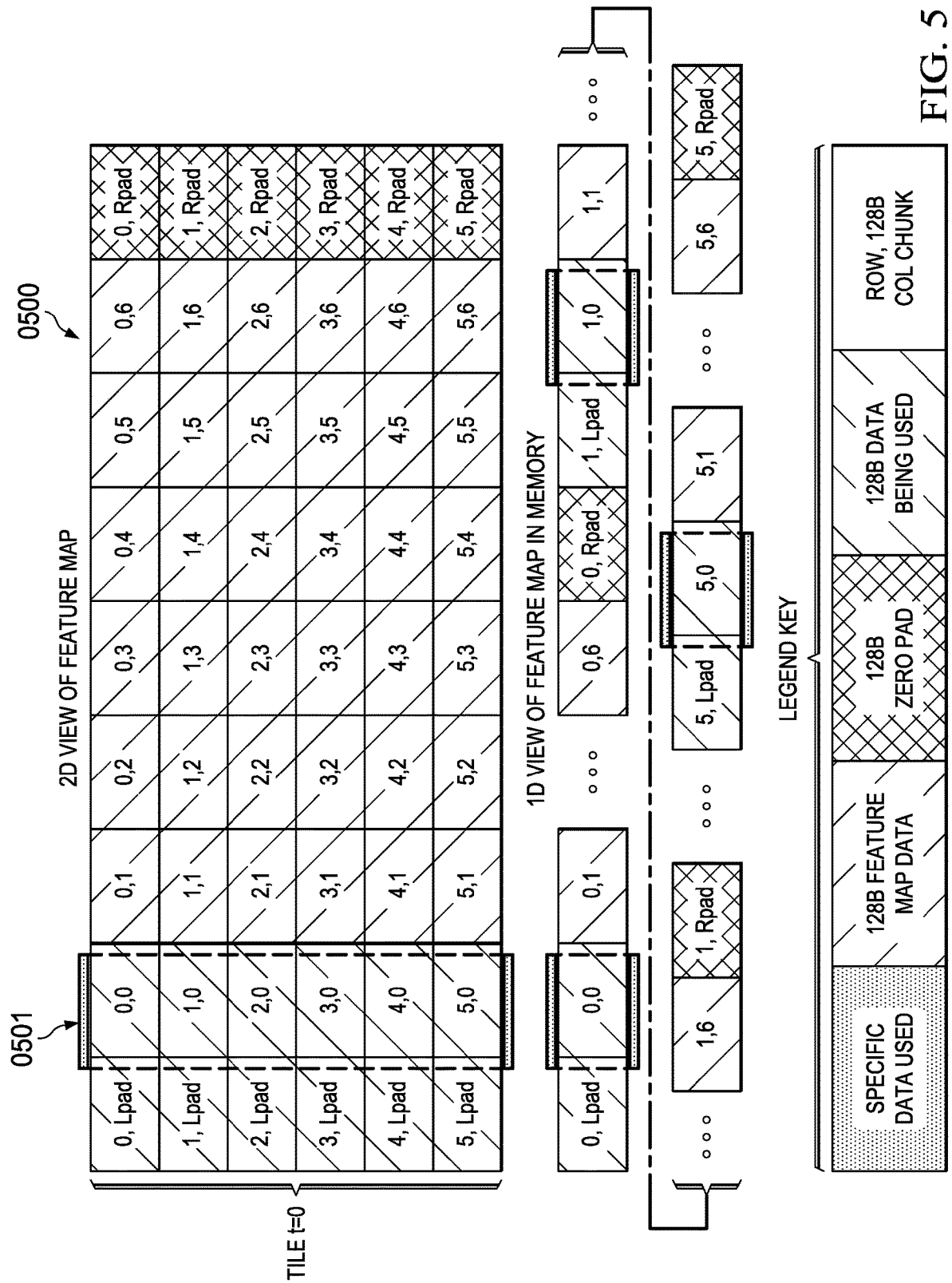
FIG. 5 illustrates a time t=0 view of large feature map tiles wherein a 2D conceptual view of a feature map is also depicted as a 1D storage of a feature map in memory (complete large feature map with side column padding depicting 128 B block storage in local memory with 128 B alignment for efficient DRAM to/from local memory data movement)
Figure 6:
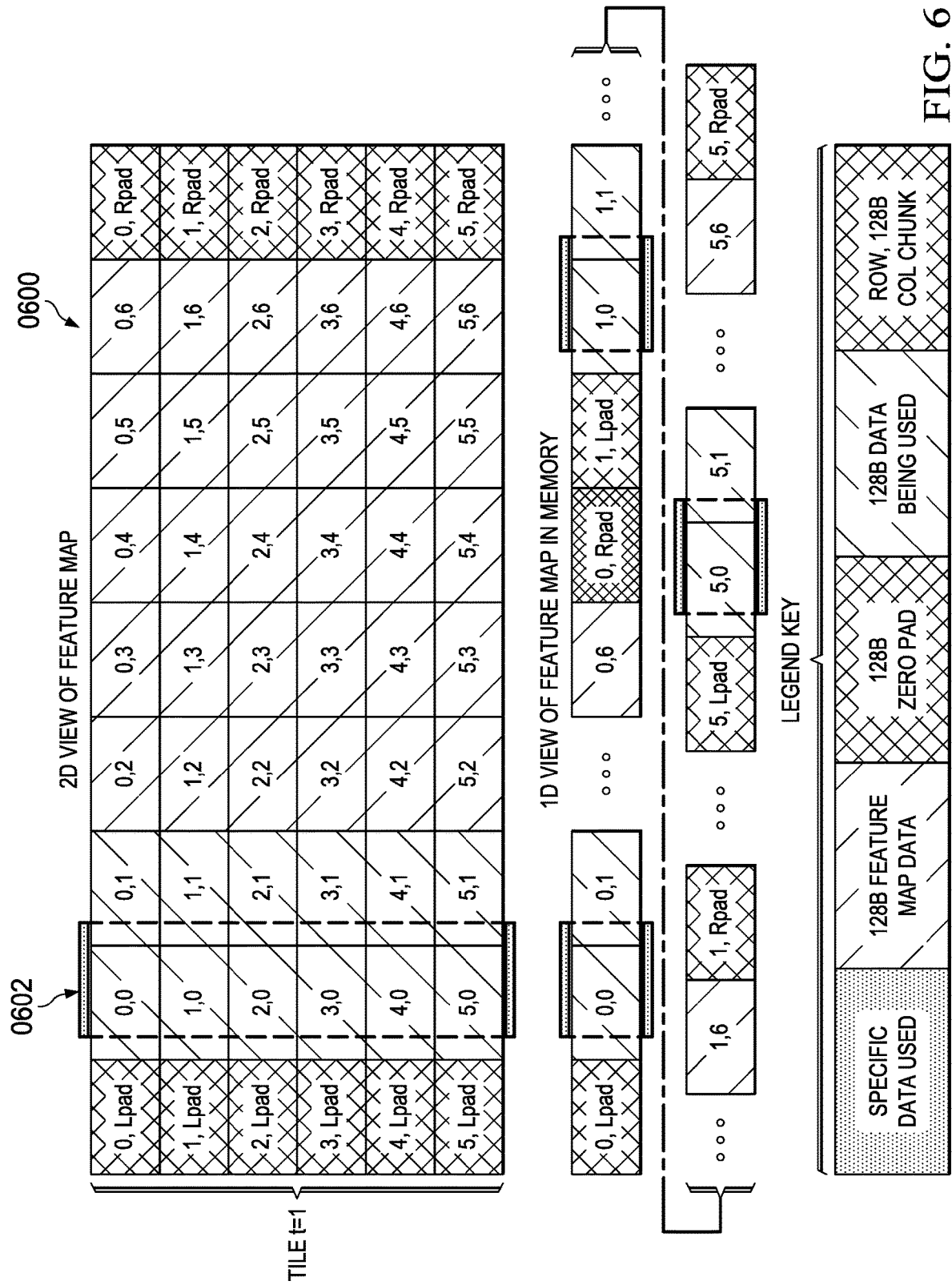
FIG. 6 illustrates a time t=1 view of large feature map tiles wherein a 2D conceptual view of a feature map is also depicted as a 1D storage of a feature map in memory (complete large feature map with side column padding depicting 128 B block storage in local memory with 128 B alignment for efficient DRAM to/from local memory data movement)
Figure 7:
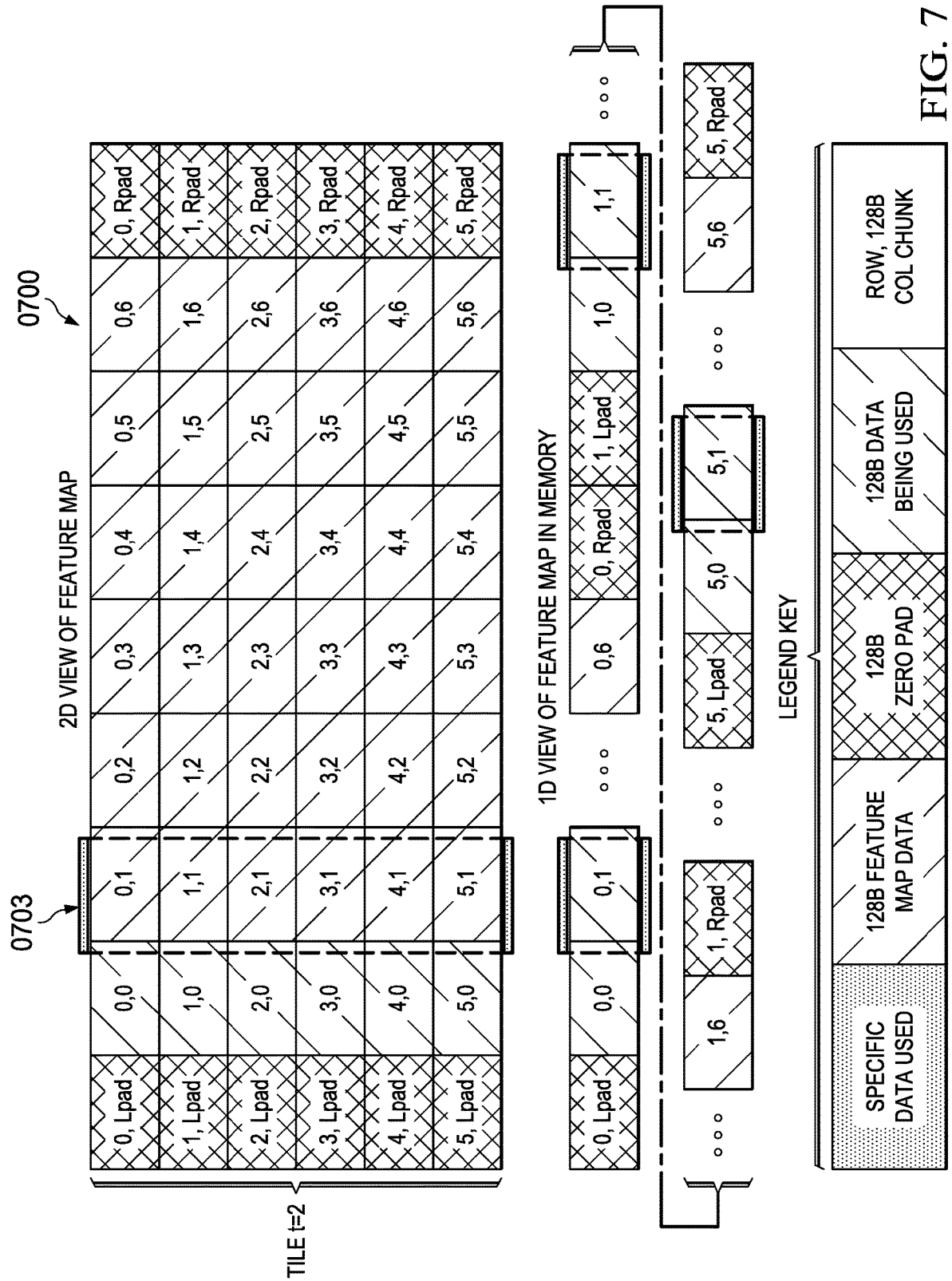
FIG. 7 illustrates a time t=2 view of large feature map tiles wherein a 2D conceptual view of a feature map is also depicted as a 1D storage of a feature map in memory (complete large feature map with side column padding depicting 128 B block storage in local memory with 128 B alignment for efficient DRAM to/from local memory data movement)
Figure 8:
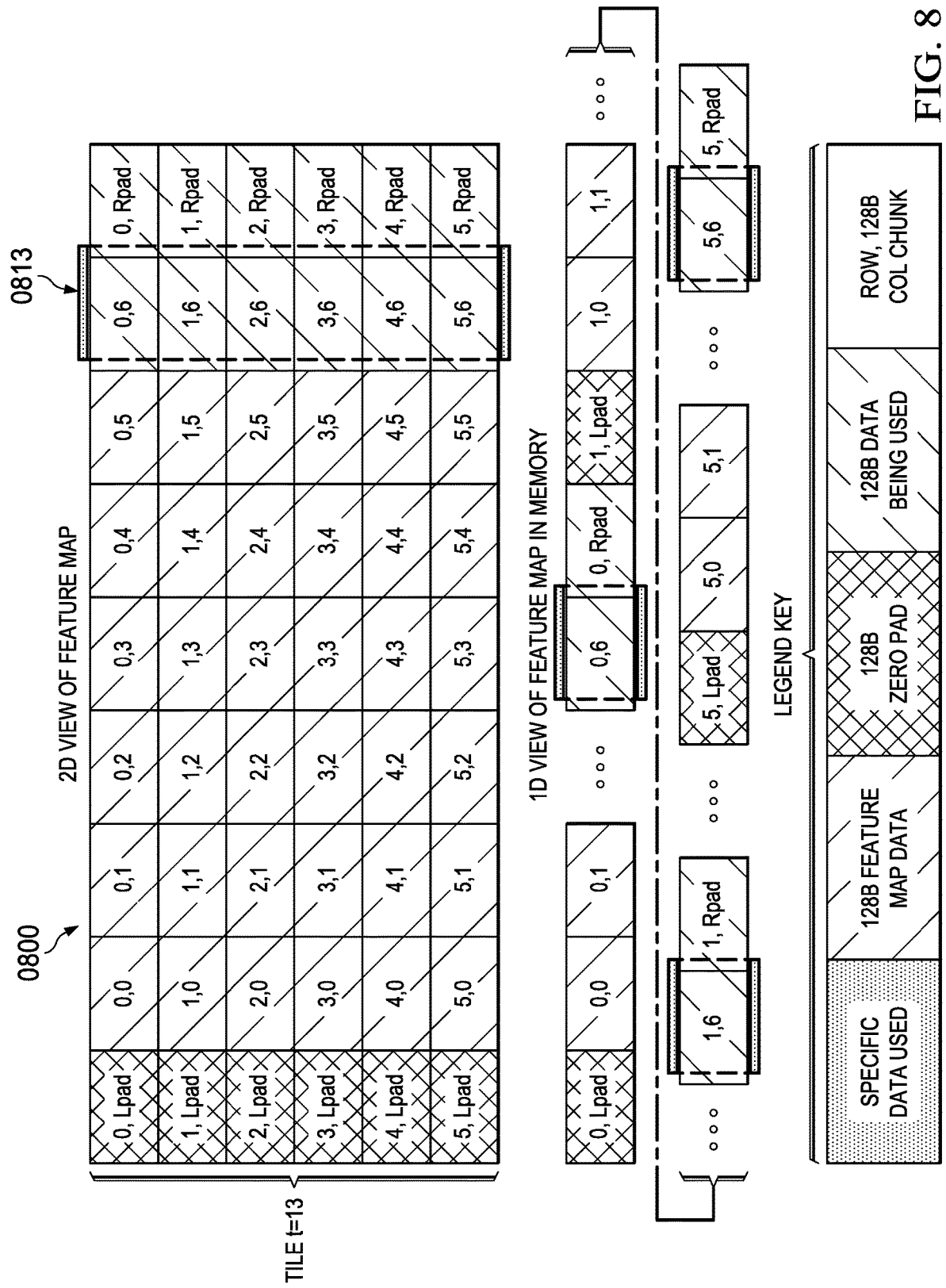
FIG. 8 illustrates a time t=13 view of large feature map tiles wherein a 2D conceptual view of a feature map is also depicted as a 1D storage of a feature map in memory (complete large feature map with side column padding depicting 128 B block storage in local memory with 128 B alignment for efficient DRAM to/from local memory data movement)

The data transfer inefficiencies generally associated with processing large feature map tiles in a feature map matrix (FMM) may be observed by inspection of the data transfer diagrams provided in FIG. 5 (0500)—FIG. 8 (0800), wherein data transfers associated with tile processing for time t=0 (FIG. 5 (0500)), t=1 (FIG. 6 (0600)), t=2 (FIGS. 7 (0700)), and t=13 (FIG. 8 (0800)) are presented. In each of these examples the FMM has been augmented with left zero padding (Lpad) and right zero padding (Rpad) columns of zero entries. Equivalent padding using other non-zero data values is also possible in some circumstances. It should be noted that at time t=0 (FIGS. 5 (0500)) and t=13 (FIG. 8 (0800)) in this example the Lpad column and Rpad column are accessed as part of specific data used in the MCE calculation.

Here it can be seen that the EDM data accesses of columns (0501, 0602, 0703, 0814) representing time stamps of t=0, t=1, t=2, and t=13 respectively are such that they cross row/column 128 B chunks of data stored within the EDM. This will cause double the EMB bus accesses for each datum retrieved from the EDM and thus severely penalize the overall performance of the MCE as the predominance of data transfer over compute operations means that the MCE compute function will be dominated by data transfer to/from EDM. While the examples provided assume an EMB data width of 128 bytes (128 B), this is just exemplary of a number of possible EMB bus data widths.

Small Feature Maps/No Pad Insertion (0900)-(1000)

Figure 9:
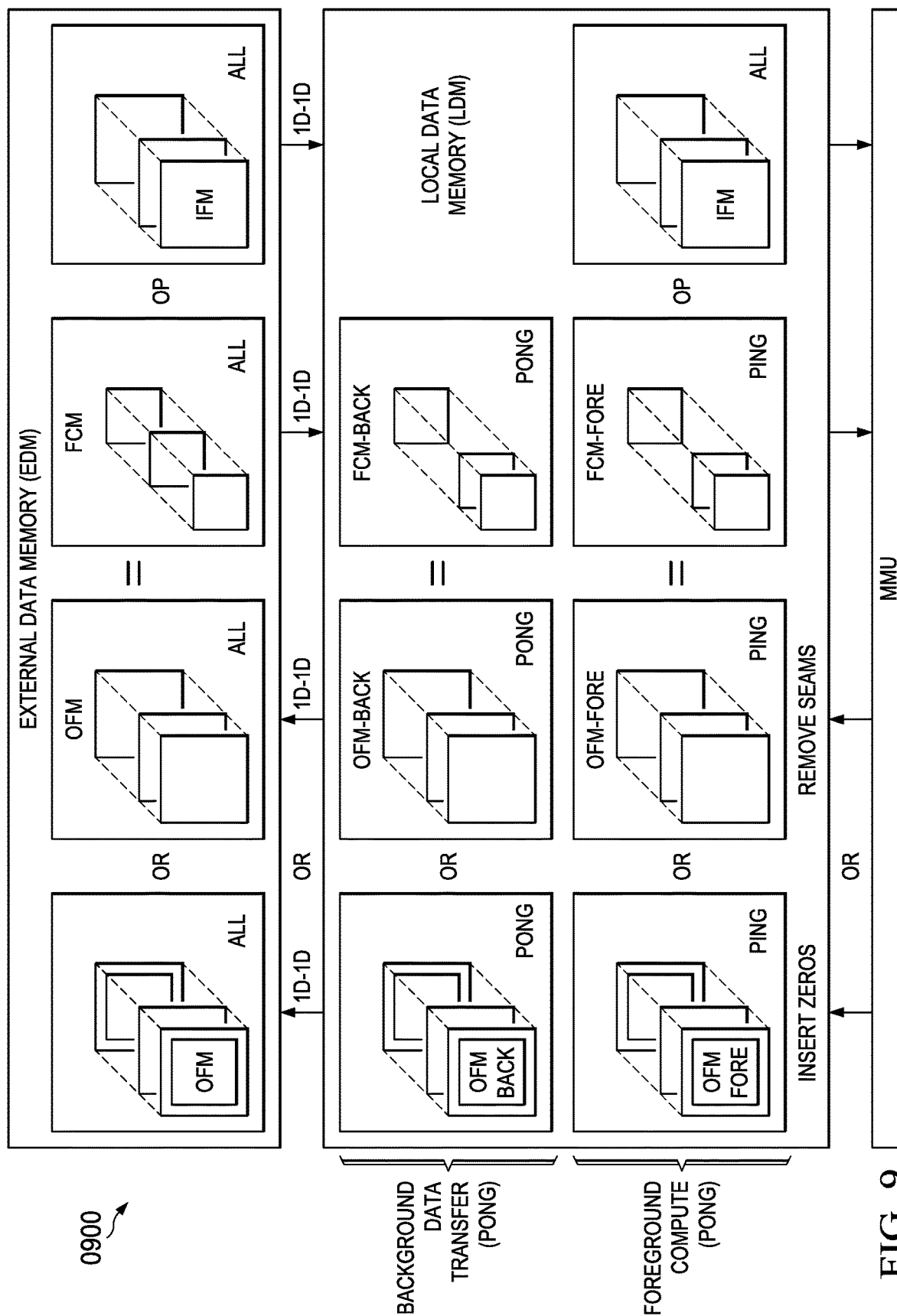
FIG. 9 illustrates a data flow diagram depicting operation of an small feature map with no pad insertion MTA system embodiment.

FIG. 9 (0900) details a data flow diagram depicting an example operation implementing small feature maps with no pad insertion. In this MTA embodiment the IFM may or may not already have a pad. In this sequence data and functions operate as follows. A 1D-to-1D transfer of all input feature maps (IFMs) from the EDM to LDM is executed so as to load all IFM data into LDM.

The output feature map (OFM) matrix product and filter coefficient matrix multiplier (FCM) are stored in foreground/background ping/pong fashion in LDM such that when OFM-fore is being filled with the computation product of FCM-fore*IFM, the prior matrix multiplication product OFM-back is being stored in EDM and the next tile of FCM data is being read from EDM and stored in FCM-back. Once the calculation OFM-fore=FCM-fore*IFM is completed, memory pointers to OFM-fore/OFM-back and FCM-fore/FCM-back are swapped in ping-pong fashion to allow the compute/data transfer operations to overlap during the next MMU machine cycle. In this manner, there is no wasted time waiting for storage or retrieval to/from the EDM memory after a MMU compute cycle is completed.

Once the MMU product is generated, the OFM product produced will have seams that need to be removed or alternatively zeros must be inserted around the boundaries of the OFM matrix data. The insertion of zeros may eliminate any pre-processing required during the next computation cycle if the resulting data is used in a future computation. Depending on which condition occurs, the OFM data is modified/augmented before being written back to the EDM using a 1D-to-1D ping/pong transfer of the OFM from LDM to EDM. There exists a small drawback to inserting zeros in that this increases the amount of data that needs to be moved from LDM to EDM (this layer) and EDM to LDM (next layer). However, this approach is potentially more efficient than having to do zero insertion if there is no efficient method for that within the MMU architecture or supervisory ACL/CPU.

Figure 10:
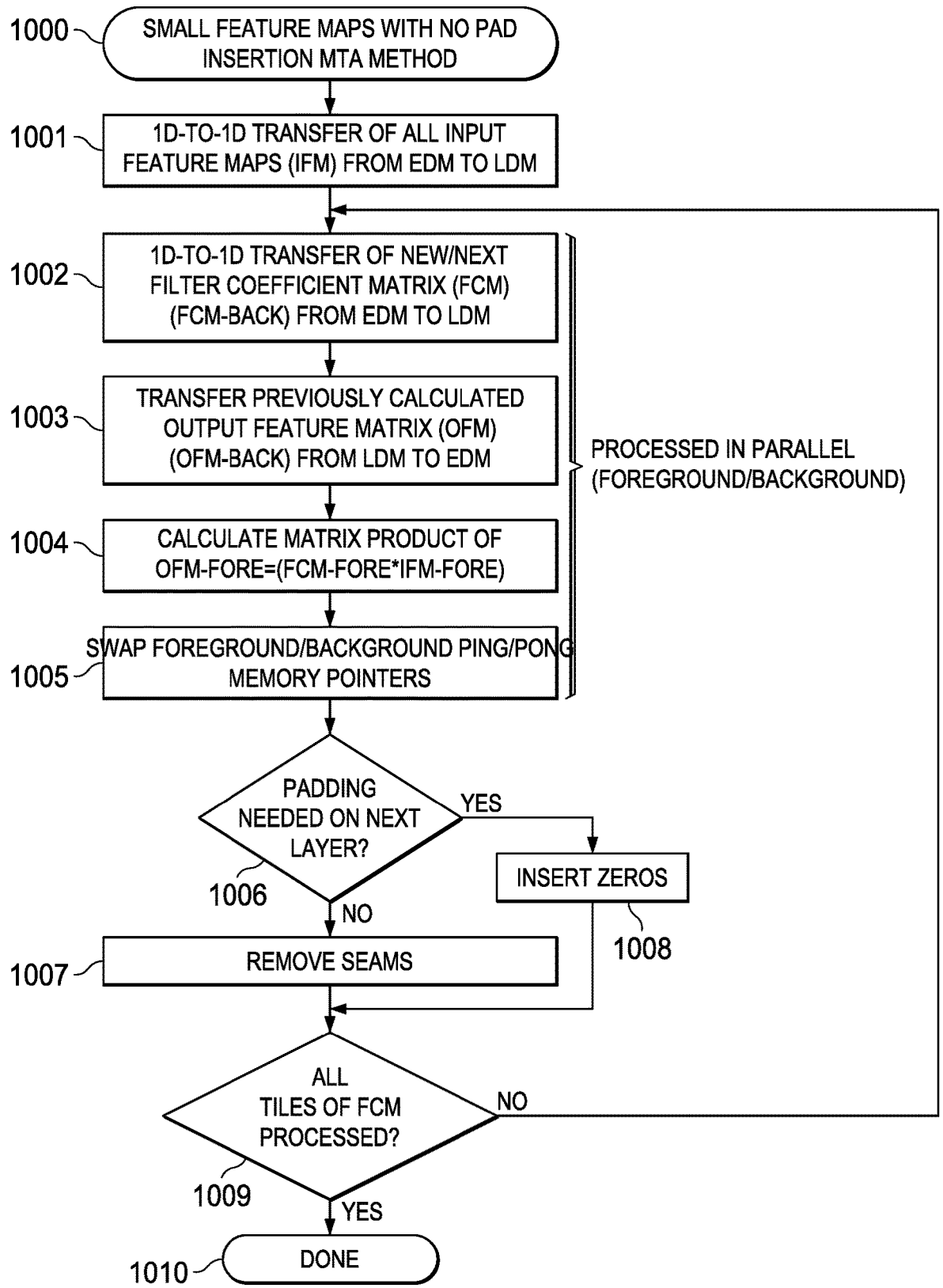
FIG. 10 illustrates a flowchart depicting a small feature map with no pad insertion MTA method embodiment.

As generally depicted in the flowchart of FIG. 10 (1000) and consistent with the above system data flow description in FIG. 9 (0900), an example method may be broadly generalized as a small feature map with no pad insertion MTA method comprising:
(1) Executing a 1D-to-1D data transfer of all input feature maps (IFM) from EDM to LDM (1001);
(2) Concurrent with steps (2)-(5), executing a 1D-to-1D data transfer of a new or next filter coefficient matrix (FCM) from EDM to LDM (1002);
(3) Concurrent with steps (2)-(5), transferring a previously calculated output feature map matrix (OFM) (OFM-back) from LDM to EDM (1003);
(4) Concurrent with steps (2)-(5), with a matrix multiplier unit (MMU), calculating the matrix product of OFM-fore=FCM-fore*IFM-fore (1004);
(5) swapping foreground/background ping/pong memory pointers (1005);
(6) Determining if padding is needed on the next OFM layer, and if so, proceeding to step (8) (1006);
(7) Removing seams from the OFM and proceeding to step (9) (1007);
(8) Inserting zeros in the OFM (1008);
(9) Determining if all FCM tiles have been processed, and if not, proceeding to step (2) (1009); and
(10) Terminating the MTA method (1010).

This general method may be modified heavily depending on a number of factors, with rearrangement and/or addition/deletion of steps anticipated by the scope of the present disclosure. Note, that in alternative embodiments the swapping of memory pointers can be performed concurrently with steps 2-5. Integration of this and other embodiment methods in conjunction with a variety of embodiment systems described herein is within the scope of the present disclosure.

First Small Feature Maps with Pad Insertion (1100)-(1200)

Figure 11:
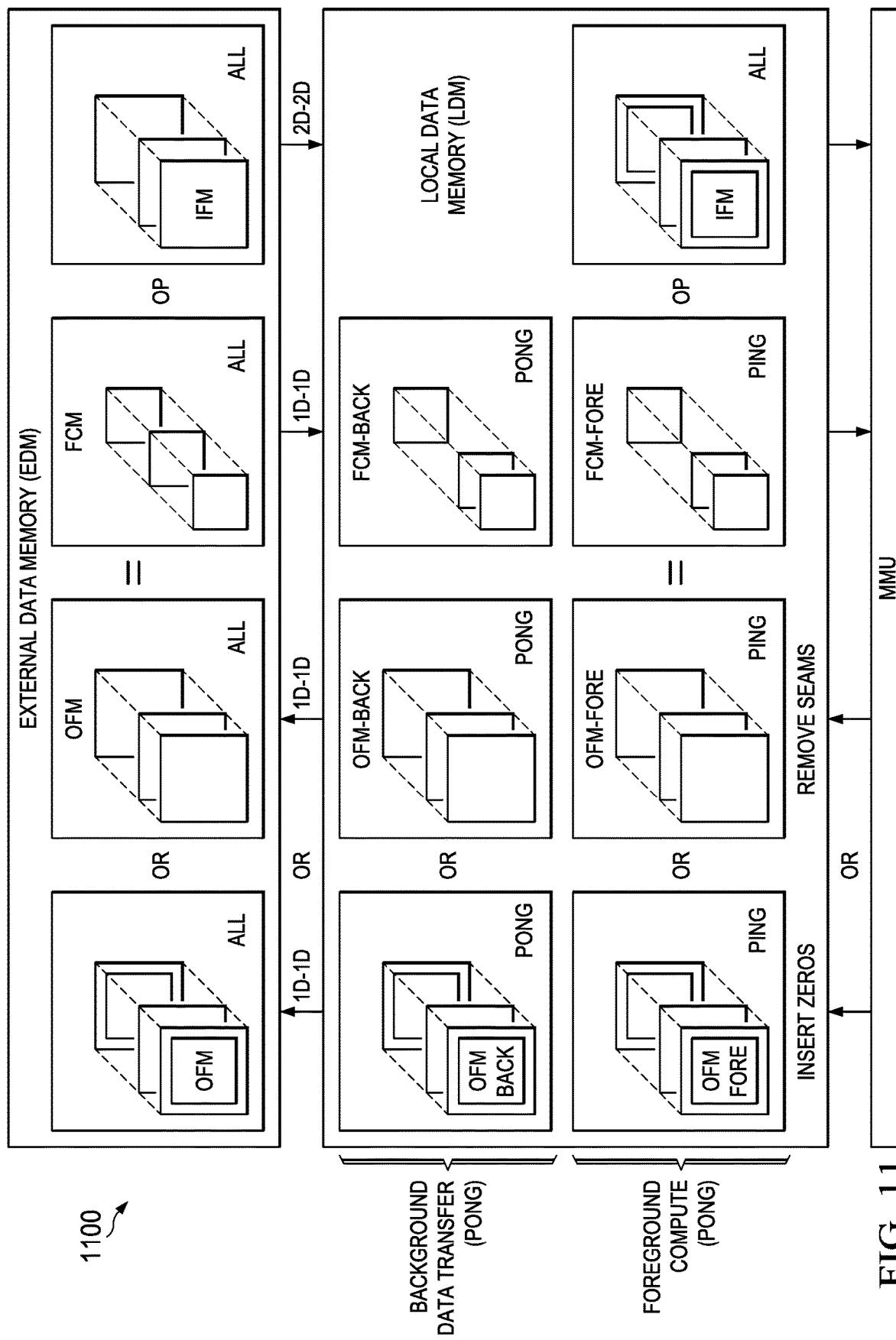
FIG. 11 illustrates a data flow diagram depicting operation of a first small feature map with pad insertion MTA system embodiment.

FIG. 11 (1100) details a data flow diagram depicting a first disclosure operation implementing small feature maps with pad insertion. In this MTA embodiment the IFM may or may not already have a pad. In this sequence data and functions operate as follows. A 2D-to-2D transfer of all input feature maps (IFMs) from the EDM to LDM is executed so as to load all IFM data into LDM leaving space in the LDM for zero filling which is accomplished either using a direct memory access (DMA) controller and/or functions within the MMU.

The output feature map (OFM) matrix product and filter coefficient matrix multiplier (FCM) are stored in foreground/background ping/pong fashion in LDM such that when OFM-fore is being filled with the computation product of FCM-fore*IFM, the prior matrix multiplication product OFM-back is being stored in EDM and the next tile of FCM data is being read from EDM and stored in FCM-back. Once the calculation OFM-fore=FCM-fore*IFM is completed, memory pointers to OFM-fore/OFM-back and FCM-fore/FCM-back are swapped in ping-pong fashion to allow the compute/data transfer operations to overlap during the next MMU machine cycle. In this manner, there is no wasted time waiting for storage or retrieval to/from the EDM memory after a MMU compute cycle is completed.

Once the MMU product is generated, the OFM product produced will have seams, which may need to be removed or alternatively zeros must be inserted around the boundaries of the OFM matrix data. The insertion of zeros may eliminate any pre-processing required during the next computation cycle if the resulting data is used in a future computation. Depending on which condition occurs, the OFM data is modified/augmented before being written back to the EDM using a 1D-to-1D ping/pong transfer of the OFM from LDM to EDM. There exists a small drawback to inserting zeros in that this increases the amount of data that needs to be moved from LDM to EDM (this layer) and EDM to LDM (next layer). However, this approach is potentially more efficient than having to do zero insertion if there is no efficient method for that within the MMU architecture or supervisory ACL/CPU. Note also that in some circumstances the 2D-2D transfer of the IFM from EDM to LDM may be inefficient due to boundary crossings in the EDM during read accesses.

Figure 12:
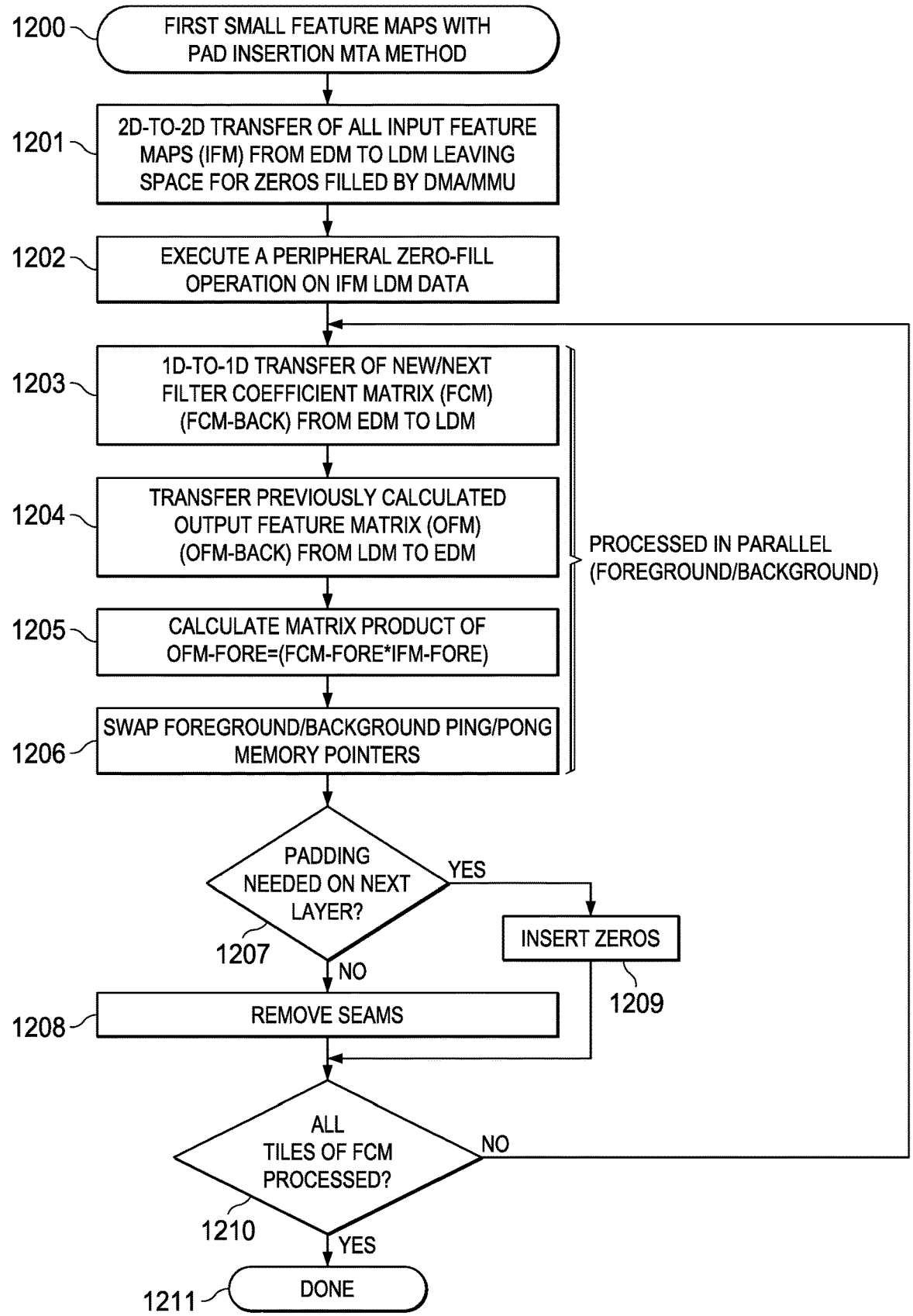
FIG. 12 illustrates a flowchart depicting a first small feature map with pad insertion MTA method embodiment.

As generally depicted in the flowchart of FIG. 12 (1200) and consistent with the above system data flow description in FIG. 11 (1100), an example method may be broadly generalized as a second small feature map with pad insertion MTA method comprising:
(1) Executing a 2D-to-2D data transfer of all input feature maps (IFM) from EDM to LDM leaving space in the LDM for zero filling that is accomplished using a DMA controller or MMU function (1201);
(2) Concurrent with steps (2)-(5), executing a 1D-to-1D data transfer of a new or next filter coefficient matrix (FCM) from EDM to LDM (1202);
(3) Concurrent with steps (2)-(5), transferring a previously calculated output feature map matrix (OFM) (OFM-back) from LDM to EDM (1203);
(4) Concurrent with steps (2)-(5), with a matrix multiplier unit (MMU), calculating the matrix product of OFM-fore=FCM-fore*IFM-fore (1204);
(5) swapping foreground/background ping/pong memory pointers (1205);
(6) Determining if padding is needed on the next OFM layer, and if so, proceeding to step (8) (1206);
(7) Removing seams from the OFM and proceeding to step (9) (1207);
(8) Inserting zeros in the OFM (1208);
(9) Determining if all FCM tiles have been processed, and if not, proceeding to step (2) (1209); and
(10) Terminating the MTA method (1210).

This general method may be modified heavily depending on a number of factors, with rearrangement and/or addition/deletion of steps anticipated by the scope of the present disclosure. Note, that in alternative embodiments the swapping of memory pointers can be performed concurrently with steps 2-5. Integration of this and other embodiment methods in conjunction with a variety of embodiment systems described herein is within the scope of the present disclosure.

Second Small Feature Maps with Pad Insertion (1300)-(1400)

Figure 13:
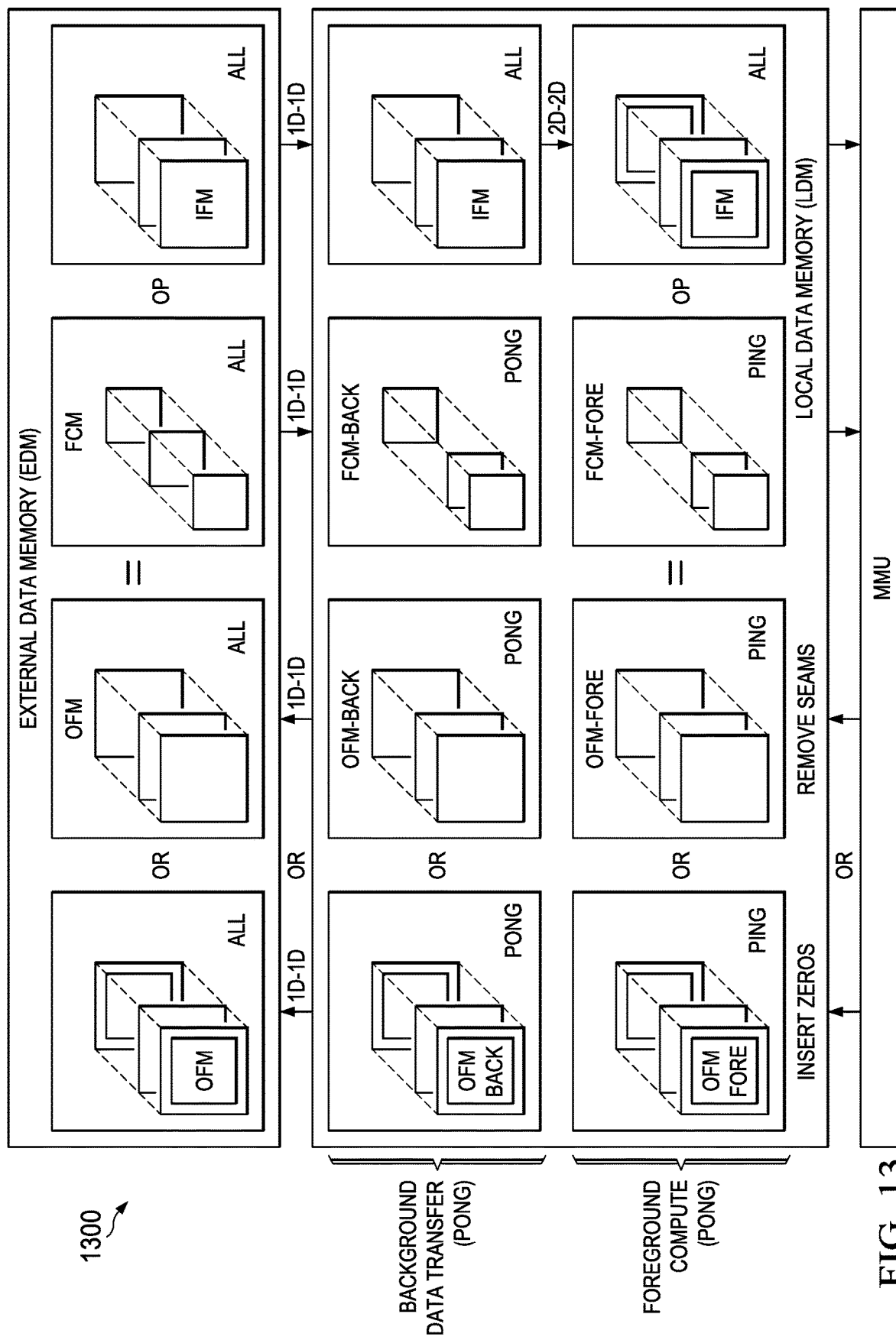
FIG. 13 illustrates a data flow diagram depicting operation of a second small feature map with pad insertion MTA system embodiment.

FIG. 13 (1300) details a data flow diagram depicting a second disclosure operation implementing small feature maps with pad insertion. In this MTA embodiment the IFM may or may not already have a pad. In this sequence data and functions operate as follows. A 1D-to-1D data transfer of all input feature maps (IFMs) is executed between EDM and LDM. A subsequent 2D-to-2D transfer of all input feature maps (IFMs) from LDM to LDM is executed so as to load all IFM data into LDM leaving space in the LDM for zero filling which is accomplished either using a direct memory access (DMA) controller and/or functions within the MMU.

The output feature map (OFM) matrix product and filter coefficient matrix multiplier (FCM) are stored in foreground/background ping/pong fashion in LDM such that when OFM-fore is being filled with the computation product of FCM-fore*IFM, the prior matrix multiplication product OFM-back is being stored in EDM and the next tile of FCM data is being read from EDM and stored in FCM-back. Once the calculation OFM-fore=FCM-fore*IFM is completed, memory pointers to OFM-fore/OFM-back and FCM-fore/FCM-back are swapped in ping-pong fashion to allow the compute/data transfer operations to overlap during the next MMU machine cycle. In this manner, there is no wasted time waiting for storage or retrieval to/from the EDM memory after a MMU compute cycle is completed.

Once the MMU product is generated, the OFM product produced will have seams that need to be removed or alternatively zeros must be inserted around the boundaries of the OFM matrix data. The insertion of zeros may eliminate any pre-processing required during the next computation cycle if the resulting data is used in a future computation. Depending on which condition occurs, the OFM data is modified/augmented before being written back to the EDM using a 1D-to-1D ping/pong transfer of the OFM from LDM to EDM. There exists a small drawback to inserting zeros in that this increases the amount of data that needs to be moved from LDM to EDM (this layer) and EDM to LDM (next layer). However, this approach is potentially more efficient than having to do zero insertion if there is no efficient method for that within the MMU architecture or supervisory ACL/CPU. Note also that in some circumstances the 2D-2D transfer of the IFM from LDM to LDM may be inefficient due to boundary crossings in the LDM during read/write accesses.

Figure 14:
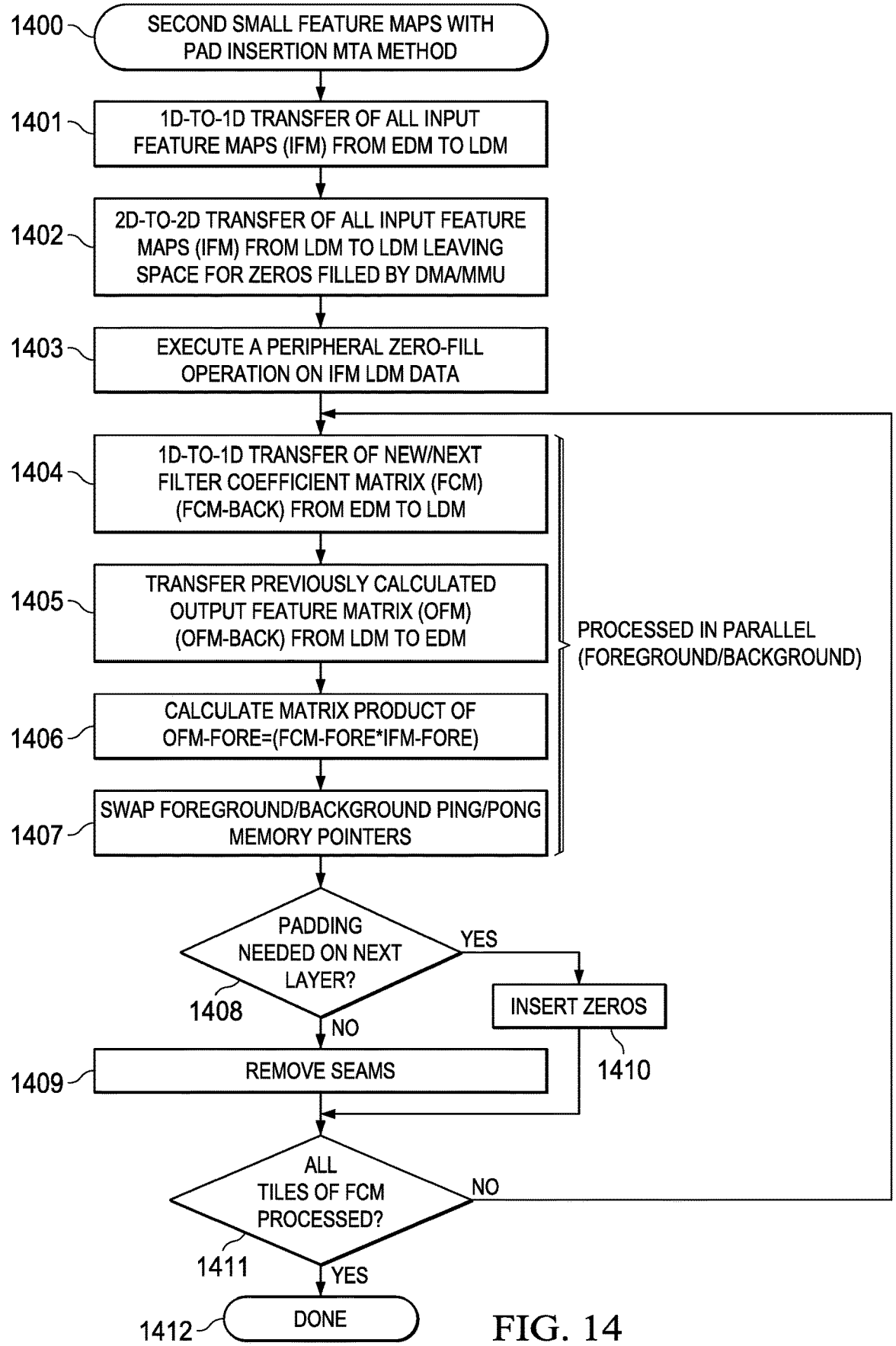
FIG. 14 illustrates a flowchart depicting a second small feature map with pad insertion MTA method embodiment.

As generally depicted in the flowchart of FIG. 14 (1400) and consistent with the above system data flow description in FIG. 13 (1300), an example method may be broadly generalized as a second small feature map with pad insertion MTA method comprising:

(1) Executing a 1D-to-1D data transfer of all input feature maps (IFM) from EDM to LDM (1401);
(2) Executing a 2D-to-2D data transfer of all input feature maps (IFM) from LDM to LDM leaving space in the LDM for zero filling that is accomplished using a DMA controller or MMU function (1402);
(3) Concurrent with steps (3)-(6), executing a 1D-to-1D data transfer of a new or next filter coefficient matrix (FCM) from EDM to LDM (1403);
(4) Concurrent with steps (3)-(6), transferring a previously calculated output feature map matrix (OFM) (OFM-back) from LDM to EDM (1404);
(5) Concurrent with steps (3)-(6), with a matrix multiplier unit (MMU), calculating the matrix product of OFM-fore=FCM-fore*IFM-fore (1405);
(6) swapping foreground/background ping/pong memory pointers (1406);
(7) Determining if padding is needed on the next OFM layer, and if so, proceeding to step (9) (1407);
(8) Removing seams from the OFM and proceeding to step (10) (1408);
(9) Inserting zeros in the OFM (1409);
(10) Determining if all FCM tiles have been processed, and if not, proceeding to step (3) (1410); and
(11) Terminating the MTA method (1411).

This general method may be modified heavily depending on a number of factors, with rearrangement and/or addition/deletion of steps anticipated by the scope of the present disclosure. Note, that in alternative embodiments the swapping of memory pointers can be performed concurrently with steps 3-6. Integration of this and other embodiment methods in conjunction with a variety of embodiment systems described herein is within the scope of the present disclosure.

Third Small Feature Maps With Pad Insertion (1500)-(1600)

Figure 15:
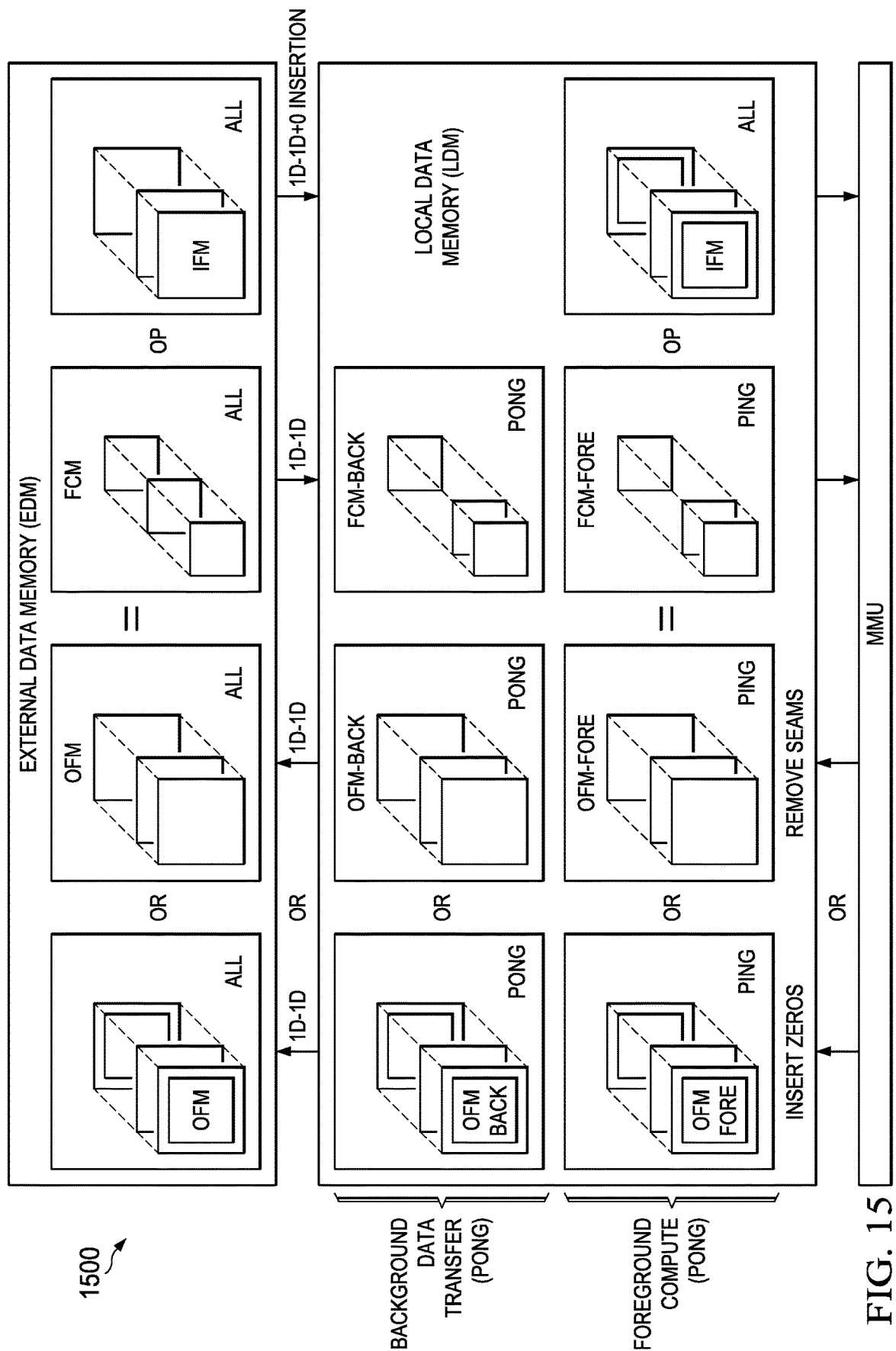
FIG. 15 illustrates a data flow diagram depicting operation of a third small feature map with pad insertion MTA system embodiment.

FIG. 15 (1500) details a data flow diagram depicting a second disclosure operation implementing small feature maps with pad insertion. In this MTA embodiment the IFM may or may not already have a pad. In this sequence data and functions operate as follows. A 1D-to-1D transfer of all input feature maps (IFMs) from the EDM to LDM is executed so as to load all IFM data into LDM. This data transfer is augmented by an automated zero-filling DMA controller that automatically provides for remapping of IFM target LDM addresses and zero-filling of IFM boundaries when IFM data is stored in LDM.

The output feature map (OFM) matrix product and filter coefficient matrix multiplier (FCM) are stored in foreground/background ping/pong fashion in LDM such that when OFM-fore is being filled with the computation product of FCM-fore*IFM, the prior matrix multiplication product OFM-back is being stored in EDM and the next tile of FCM data is being read from EDM and stored in FCM-back. Once the calculation OFM-fore=FCM-fore*IFM is completed, memory pointers to OFM-fore/OFM-back and FCM-fore/FCM-back are swapped in ping-pong fashion to allow the compute/data transfer operations to overlap during the next MMU machine cycle. In this manner, there is no wasted time waiting for storage or retrieval to/from the EDM memory after a MMU compute cycle is completed.

Once the MMU product is generated, the OFM product produced will have seams that need to be removed or alternatively zeros must be inserted around the boundaries of the OFM matrix data. The insertion of zeros may eliminate any pre-processing required during the next computation cycle if the resulting data is used in a future computation. Depending on which condition occurs, the OFM data is modified/augmented before being written back to the EDM using a 1D-to-1D ping/pong transfer of the OFM from LDM to EDM. There exists a small drawback to inserting zeros in that this increases the amount of data that needs to be moved from LDM to EDM (this layer) and EDM to LDM (next layer). However, this approach is potentially more efficient than having to do zero insertion if there is no efficient method for that within the MMU architecture or supervisory ACL/CPU. Note also that in some circumstances the 2D-2D transfer of the IFM from EDM to LDM may be inefficient due to boundary crossings in the EDM during read accesses.

Figure 16:
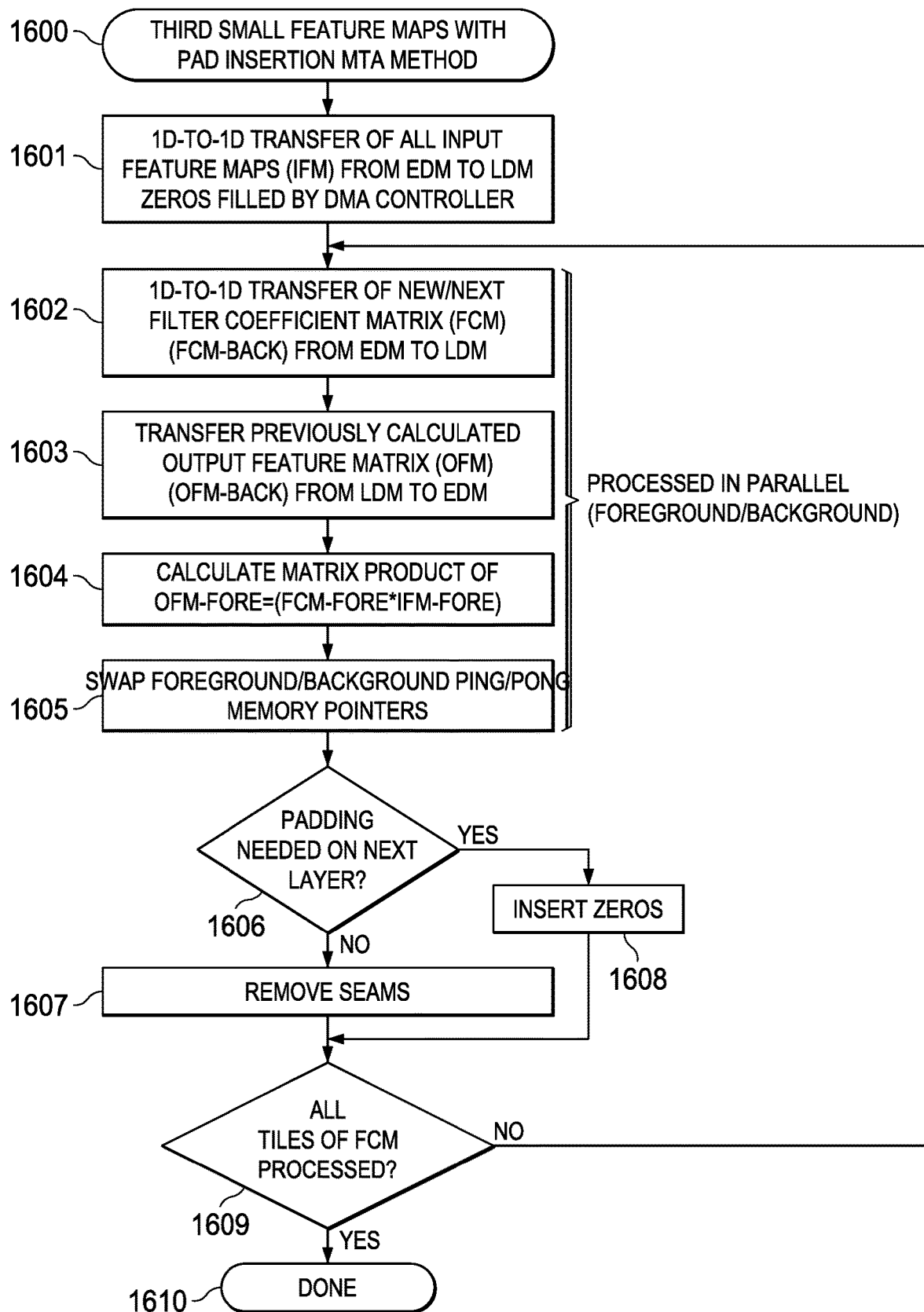
FIG. 16 illustrates a flowchart depicting a third small feature map with pad insertion MTA method embodiment.

As generally depicted in the flowchart of FIG. 16 (1600) and consistent with the above system data flow description in FIG. 15 (1500), an example method may be broadly generalized as a third small feature map with pad insertion MTA method comprising:
  (1) Executing a 1D-to-1D data transfer of all input feature maps (IFM) from EDM to LDM wherein the data transfer is augmented by an automated zero-filling DMA controller that automatically provides for remapping of IFM target LDM addresses and zero-filling of IFM boundaries when IFM data is stored in LDM (1601);
  (2) Concurrent with steps (2)-(5), executing a 1D-to-1D data transfer of a new or next filter coefficient matrix (FCM) from EDM to LDM (1602);
  (3) Concurrent with steps (2)-(5), transferring a previously calculated output feature map matrix (OFM) (OFM-back) from LDM to EDM (1603);
  (4) Concurrent with steps (2)-(5), with a matrix multiplier unit (MMU), calculating the matrix product of OFM-fore=FCM-fore*IFM-fore (1604);
  (5) swapping foreground/background ping/pong memory pointers (1605);
  (6) Determining if padding is needed on the next OFM layer, and if so, proceeding to step (8) (1606);
  (7) Removing seams from the OFM and proceeding to step (9) (1607);
  (8) Inserting zeros in the OFM (1608);
  (9) Determining if all FCM tiles have been processed, and if not, proceeding to step (2) (1609); and
  (10) Terminating the MTA method (1610).

This general method may be modified heavily depending on a number of factors, with rearrangement and/or addition/deletion of steps anticipated by the scope of the present disclosure. Note, that in alternative embodiments the swapping of memory pointers can be performed concurrently with steps 2-5. Integration of this and other embodiment methods in conjunction with a variety of embodiment systems described herein is within the scope of the present disclosure.

Large Feature Map Tiles/No Pad Insertion (1700)-(2400)

Figure 17:
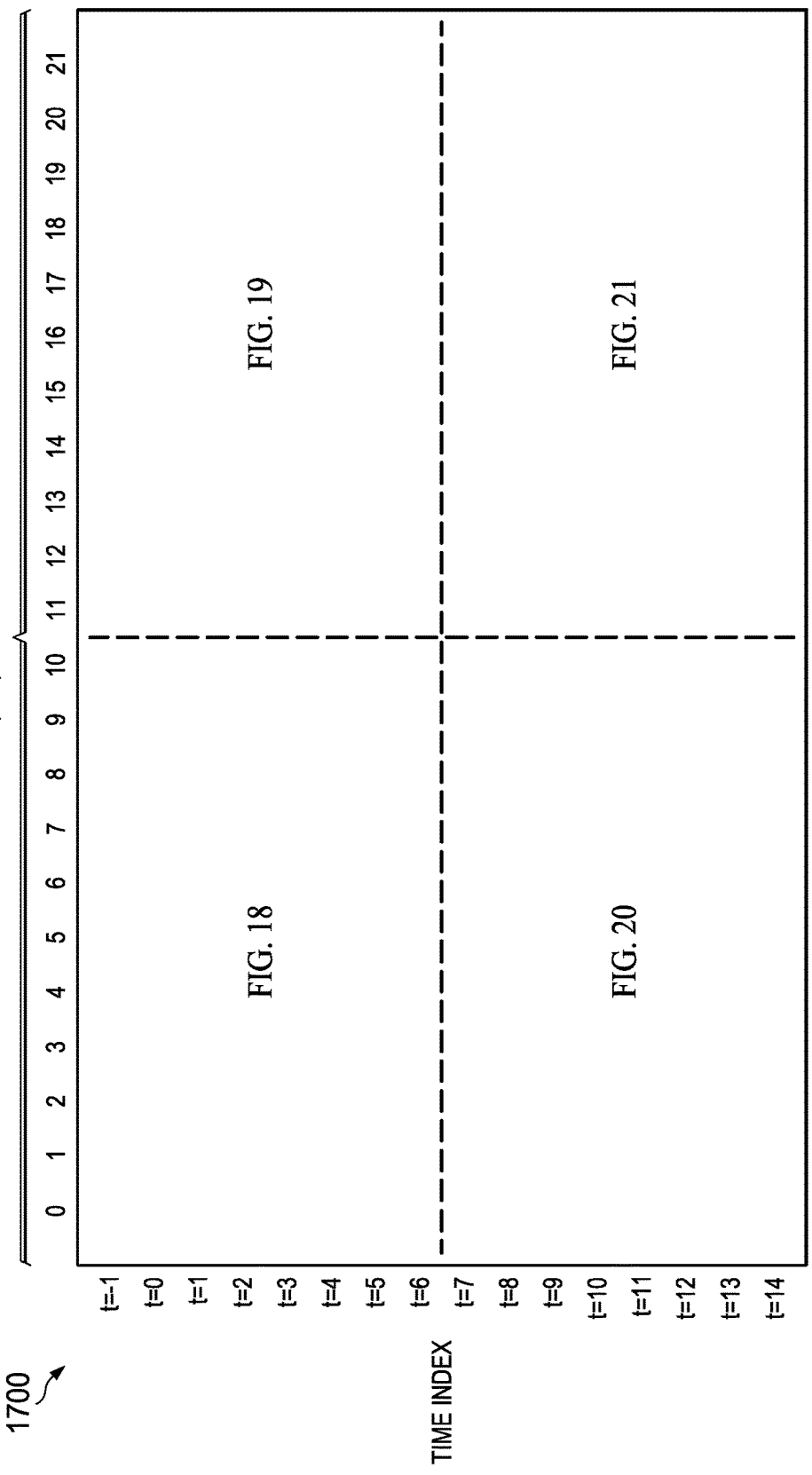
FIG. 17 illustrates an input feature map (IFM) data movement example pattern for large feature map tiles with no pad insertion incorporating partial storage in LDM with 128 B alignment for efficient EDM-to-LDM data movement that reduces local memory requirements and incorporates foreground/background data movement/compute cycles (four data movement quadrant map referencing FIG. 18-FIG. 21)
Figure 18:
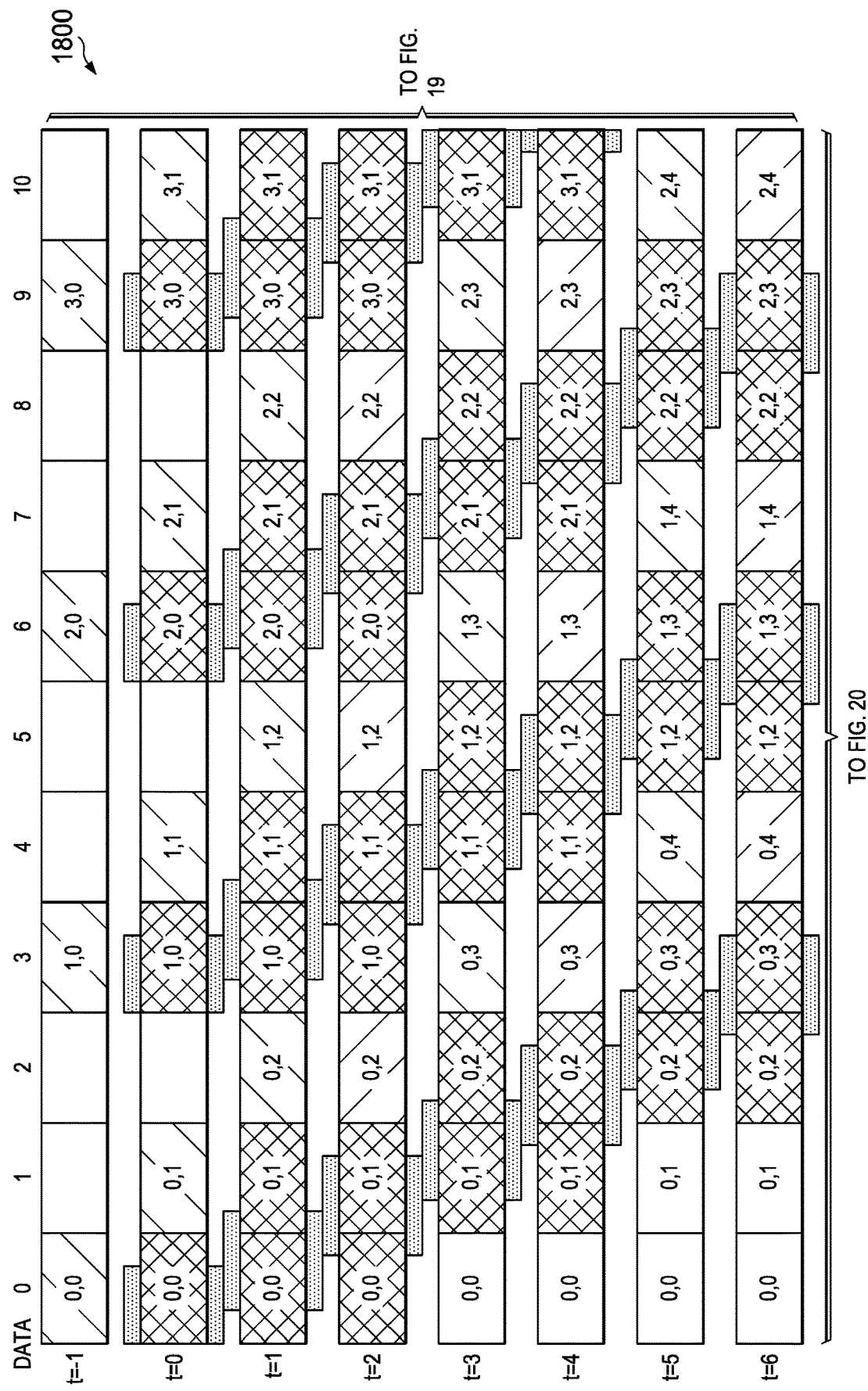
FIG. 18 illustrates an input feature map (IFM) data movement example pattern for large feature map tiles with no pad insertion incorporating partial storage in LDM with 128 B alignment for efficient EDM-to-LDM data movement that reduces local memory requirements and incorporates foreground/background data movement/compute cycles (upper left data movement quadrant—page 1 of 4)
Figure 19:
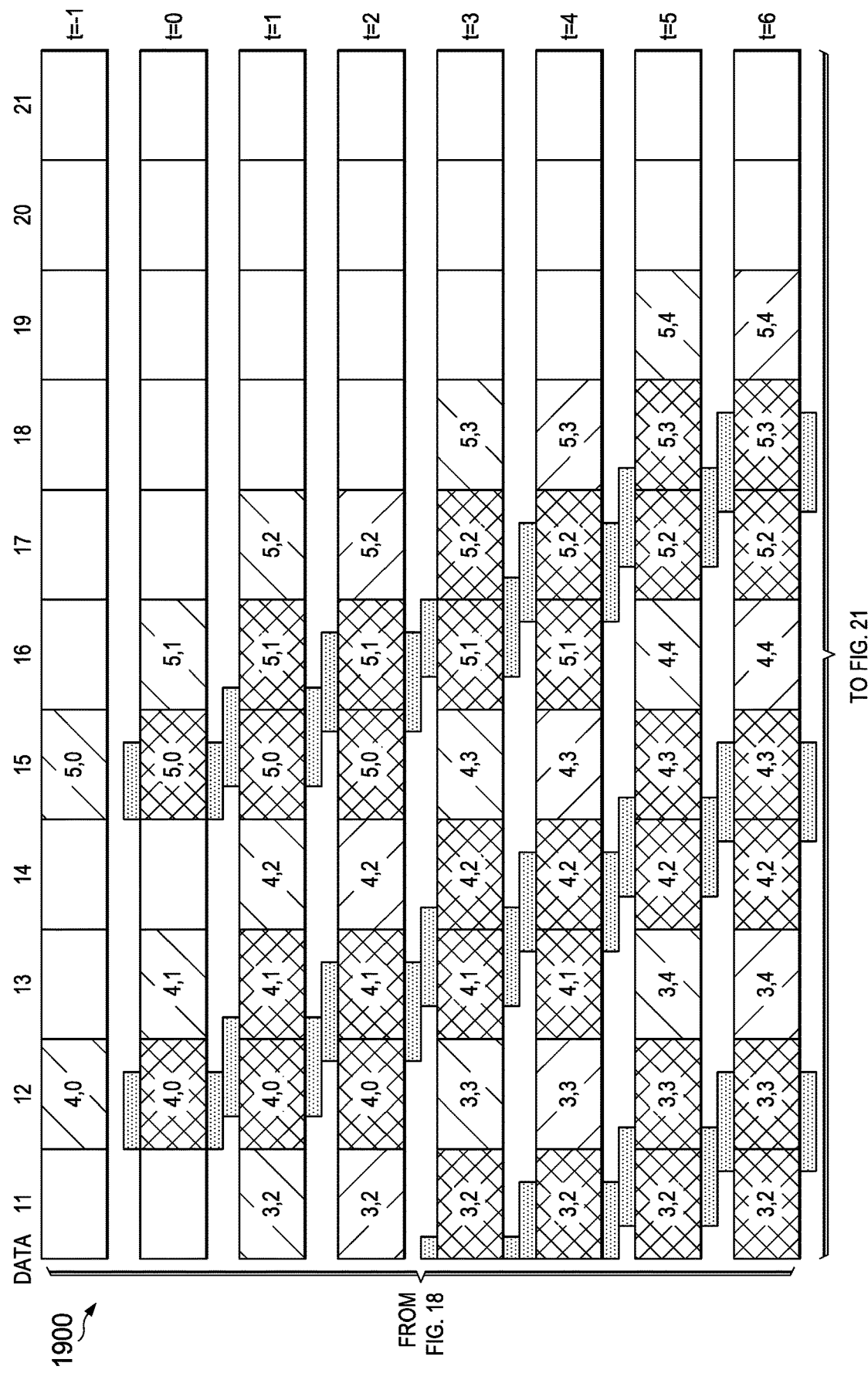
FIG. 19 illustrates an input feature map (IFM) data movement example pattern for large feature map tiles with no pad insertion incorporating partial storage in LDM with 128 B alignment for efficient EDM-to-LDM data movement that reduces local memory requirements and incorporates foreground/background data movement/compute cycles (upper right data movement quadrant—page 2 of 4)
Figure 24:
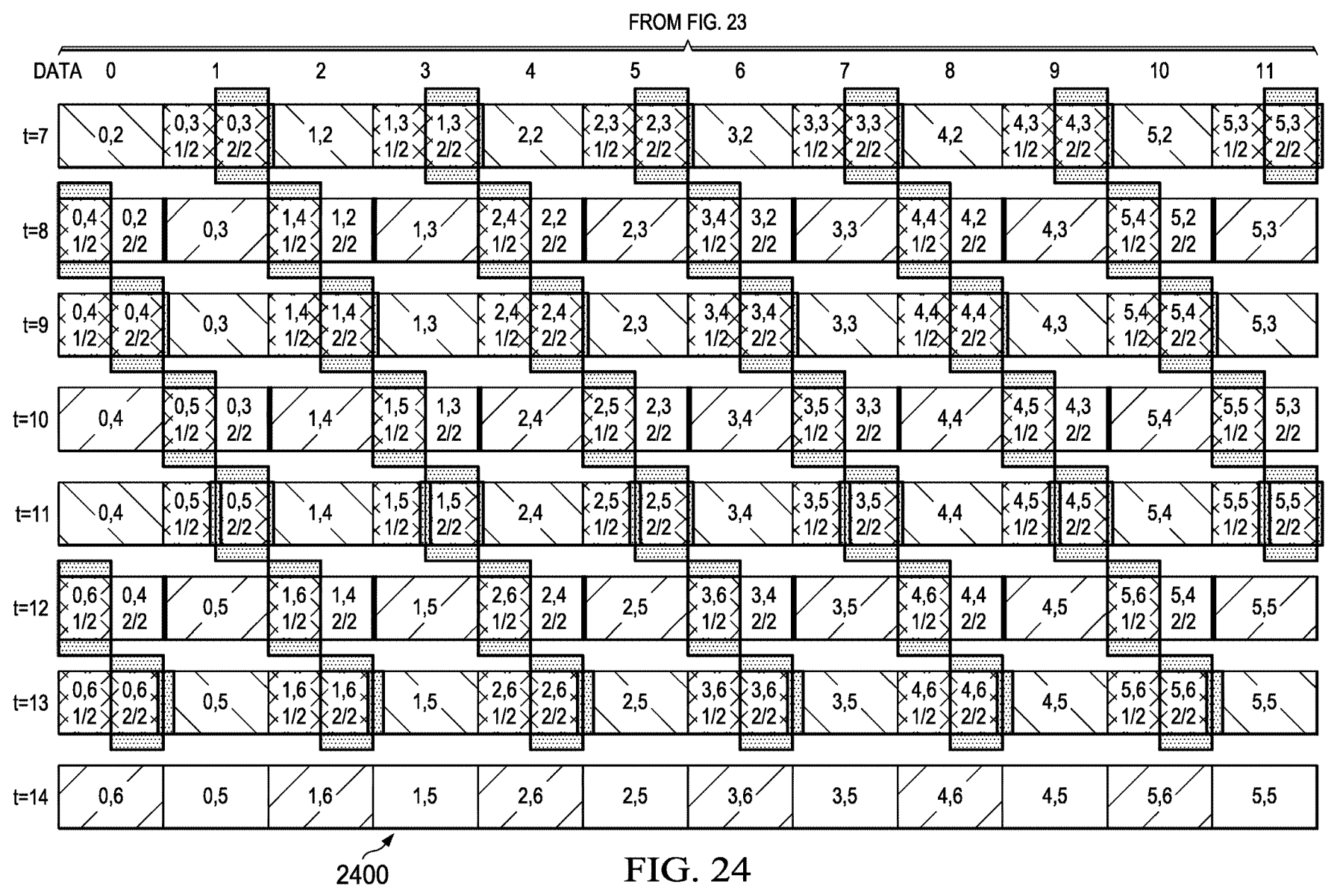

An optimized data movement pattern for large feature map tiles with no pad insertion and partial storage in local memory using 128 B alignment for efficient EDM to LDM data movement is generally depicted in FIG. 17 (1700)—FIG. 24 (2400). FIG. 17 (1700)—FIG. 21 (2100) depict an optimized input feature map data movement example and FIG. 22 (2200)—FIG. 24 (2400) depict an optimized output feature map data movement example. This matrix transfer architecture provides for reduced LDM requirements and overlapped compute/data transfer functions in the MCE. Note that the depicted data transfer maps target 128-byte data transfers between EDM and LDM but may be applied to any size of data transfer or EDM/LDM data bus widths.

Large Feature Map Tiles With Pad Insertion (2500)-(3200)

Figure 25:
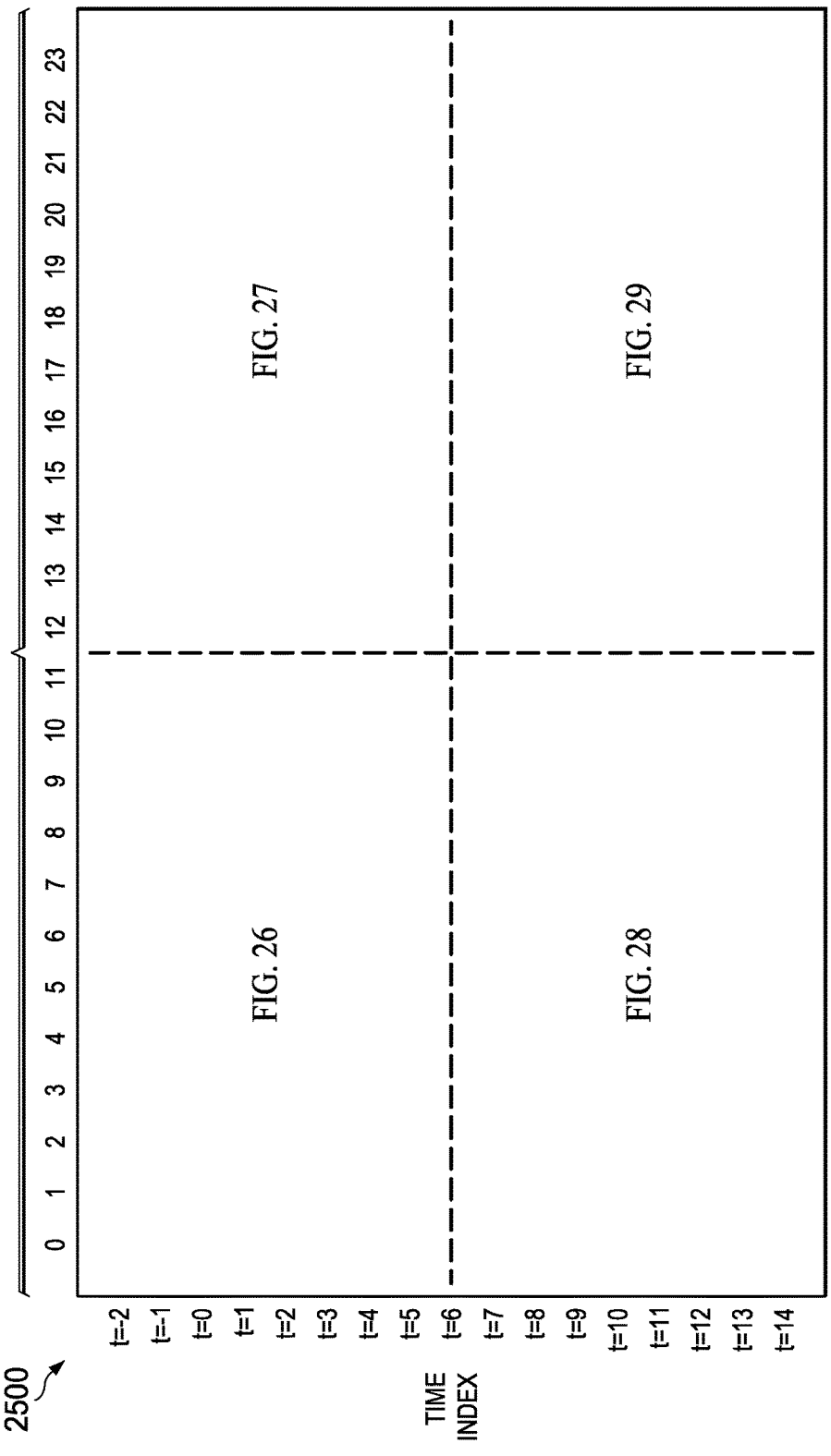
FIG. 25 illustrates an input feature map (IFM) data movement example pattern for large feature map tiles with pad insertion incorporating partial storage in LDM with 128 B alignment for efficient EDM-to-LDM data movement that reduces local memory requirements and incorporates foreground/background data movement/compute cycles (four data movement quadrant map referencing FIG. 26—FIG. 29)
Figure 26:
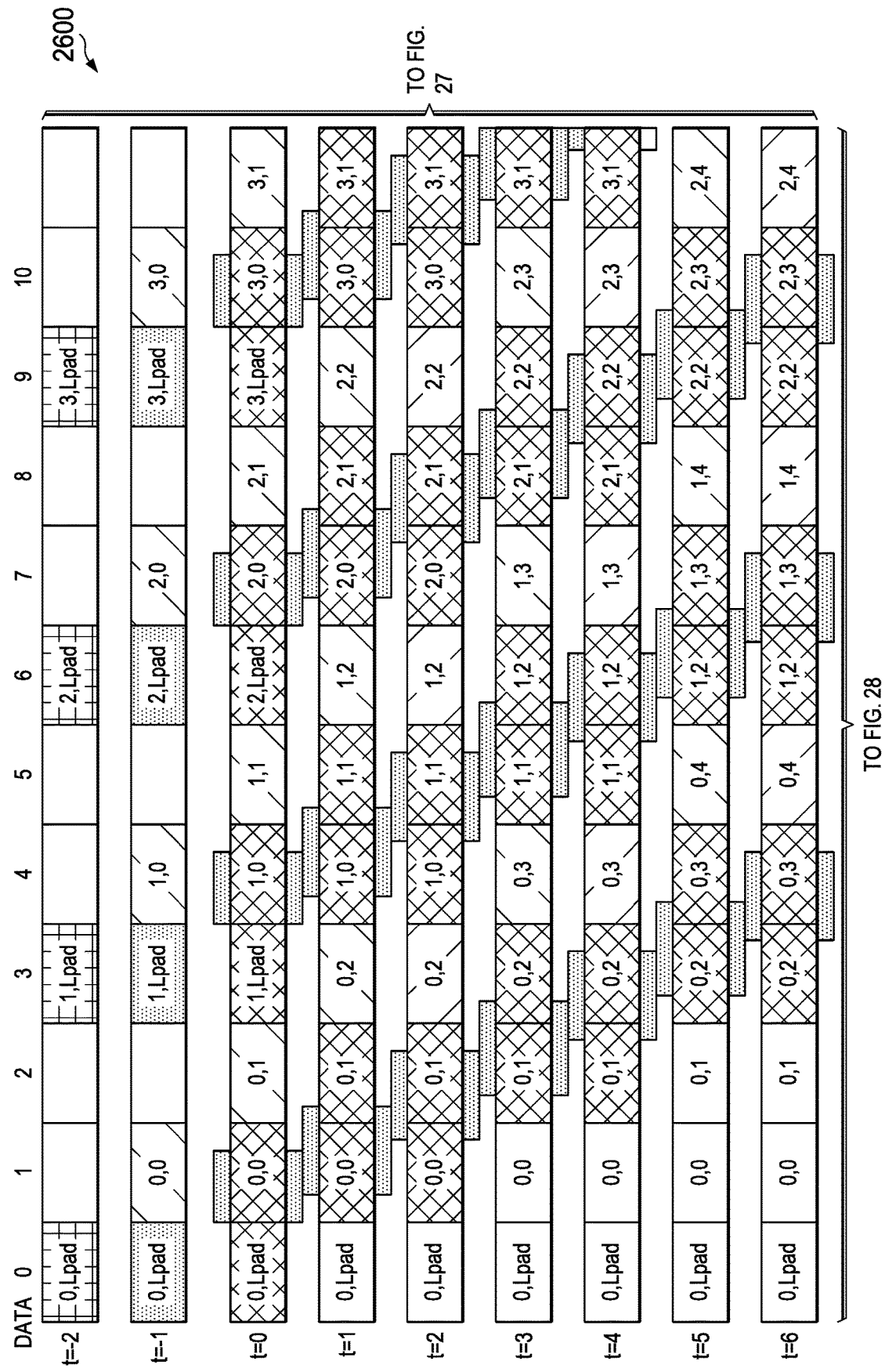
FIG. 26 illustrates an input feature map (IFM) data movement example pattern for large feature map tiles with pad insertion incorporating partial storage in LDM with 128 B alignment for efficient EDM-to-LDM data movement that reduces local memory requirements and incorporates foreground/background data movement/compute cycles (upper left data movement quadrant—page 1 of 4)
Figure 27:
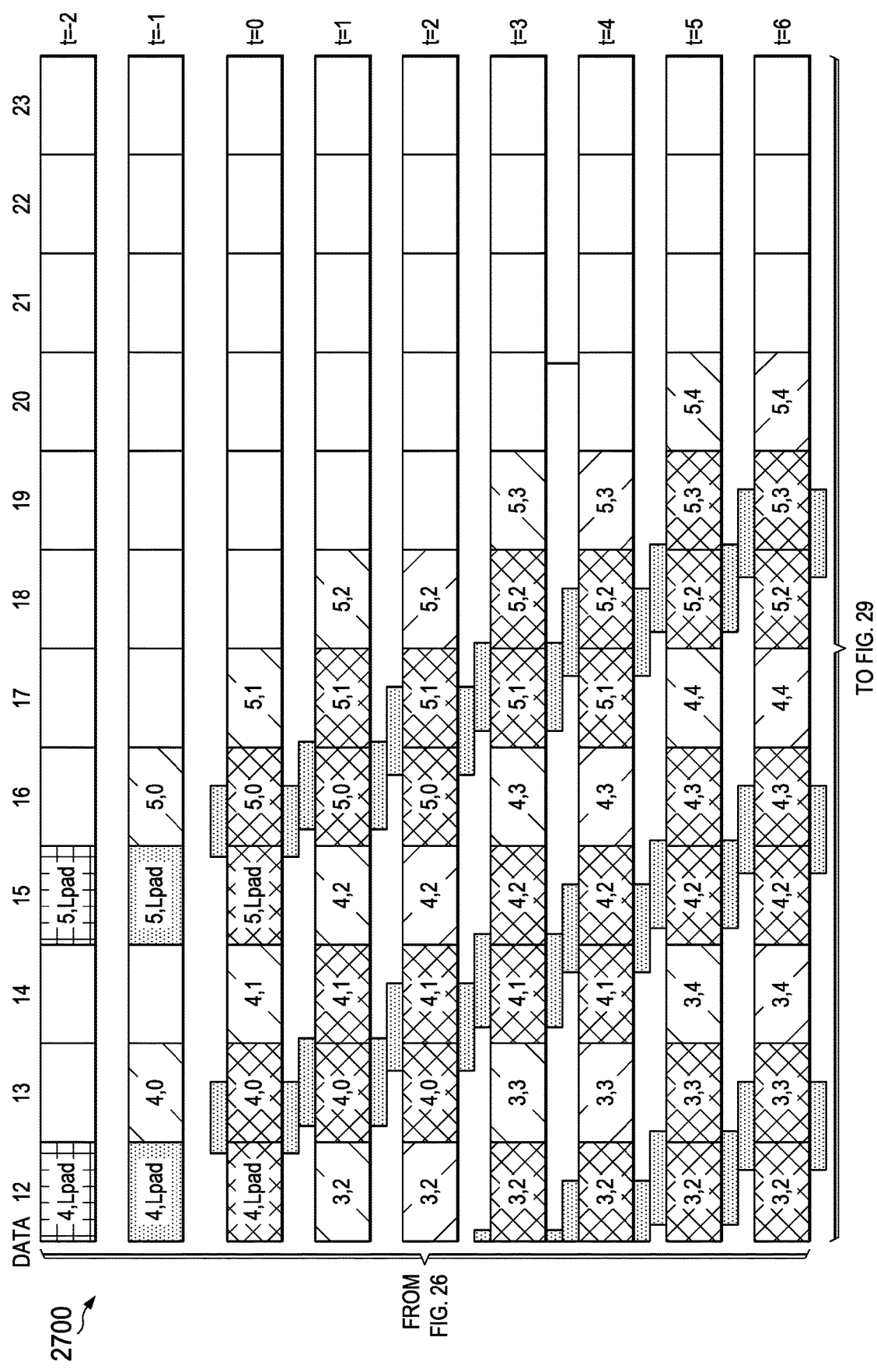
FIG. 27 illustrates an input feature map (IFM) data movement example pattern for large feature map tiles with pad insertion incorporating partial storage in LDM with 128 B alignment for efficient EDM-to-LDM data movement that reduces local memory requirements and incorporates foreground/background data movement/compute cycles (upper right data movement quadrant—page 2 of 4)
Figure 32:
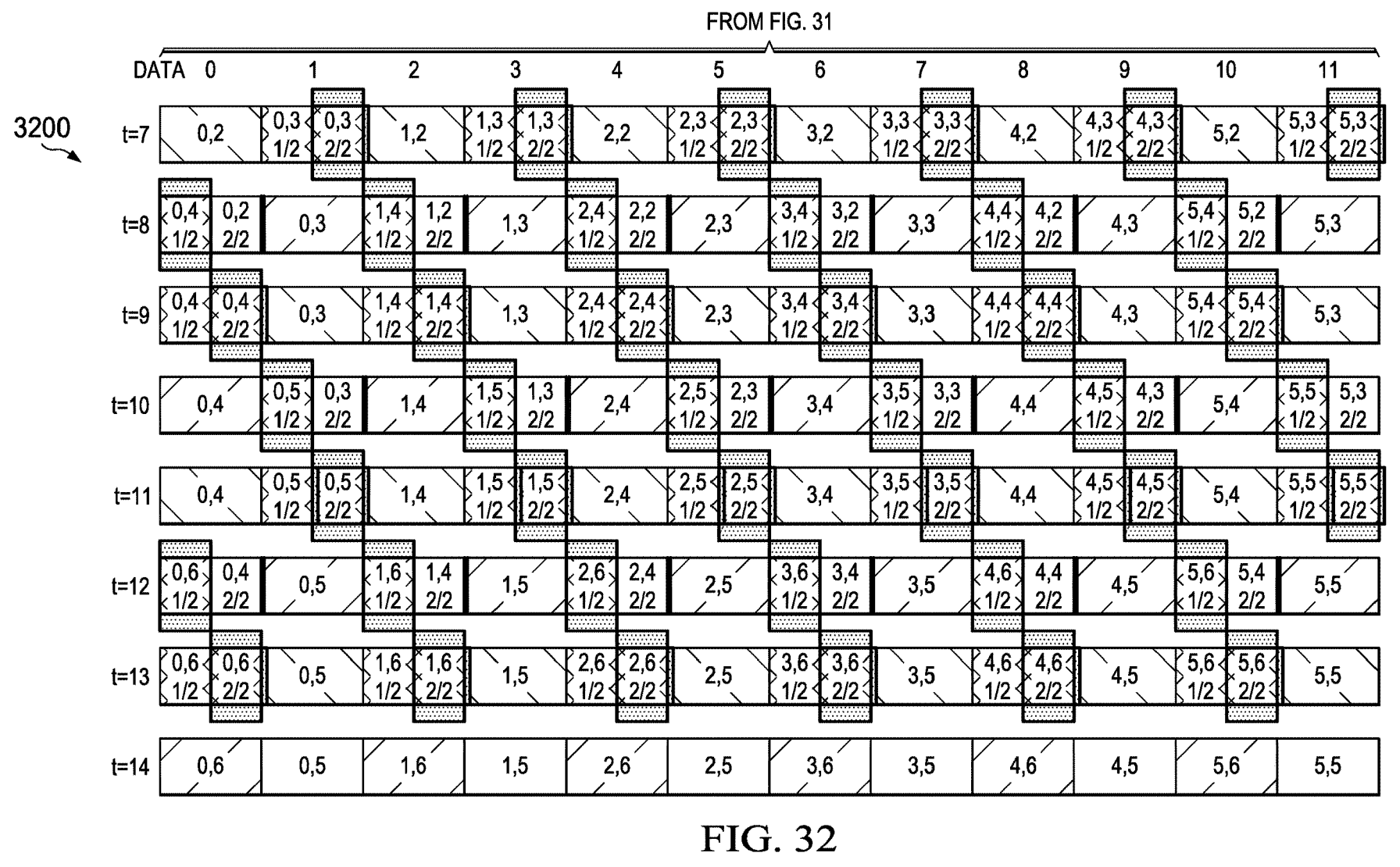
Figure 31:
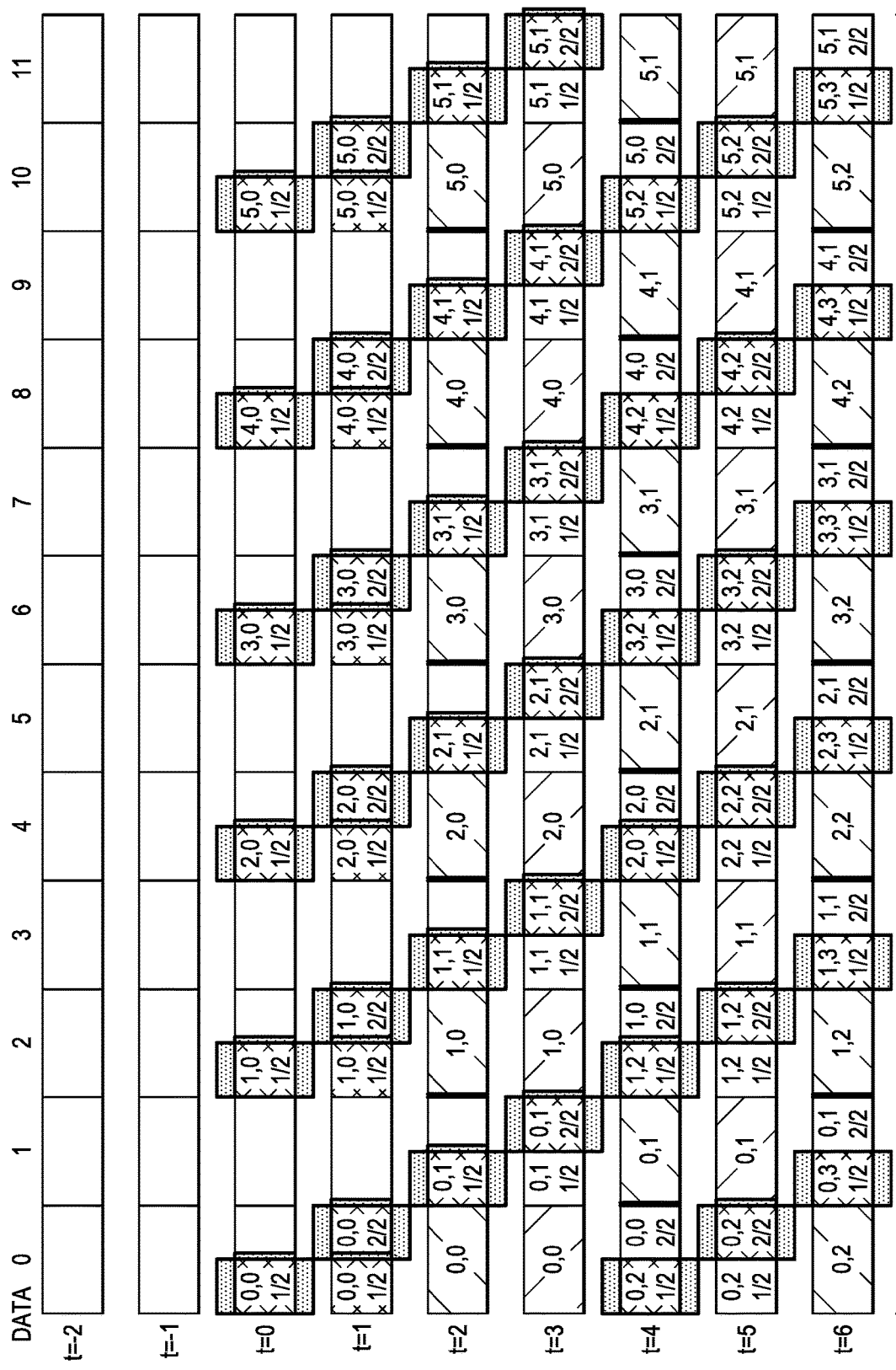
FIG. 31 illustrates an output feature map (OFM) data movement example pattern for large feature map tiles with pad insertion incorporating partial storage in LDM with 128 B alignment for efficient EDM-to-LDM data movement that reduces local memory requirements and incorporates foreground/background data movement/compute cycles (upper section data movement map—page 1 of 2)

An optimized data movement pattern for large feature map tiles with pad insertion and partial storage in local memory using 128 B alignment for efficient EDM to LDM data movement is generally depicted in FIG. 25 (2500)—FIG. 32 (3200). FIG. 25 (1700)—FIG. 29 (2900) depict an optimized input feature map data movement example and FIG. 30 (3000)—FIG. 32 (3200) depict an optimized output feature map data movement example. This matrix transfer architecture provides for reduced LDM requirements and overlapped compute/data transfer functions in the MCE. Note that the depicted data transfer maps target 128-byte data transfers between EDM and LDM but may be applied to any size of data transfer or EDM/LDM data bus widths.

LFM Data Transfers with No Pad Insertion (3300)-(3600)

Figure 33:
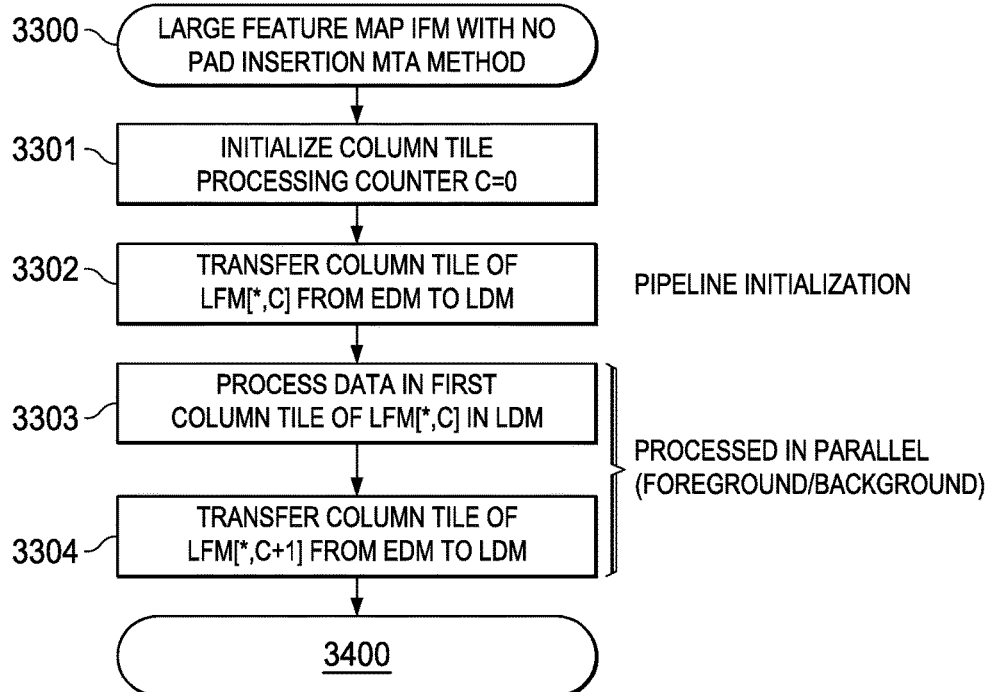
FIG. 33 illustrates a flowchart of a large feature map (LFM) input feature map (IFM) with no pad insertion matrix transfer accelerator (MTA) operational sequence (page 1 of 2)
Figure 36:
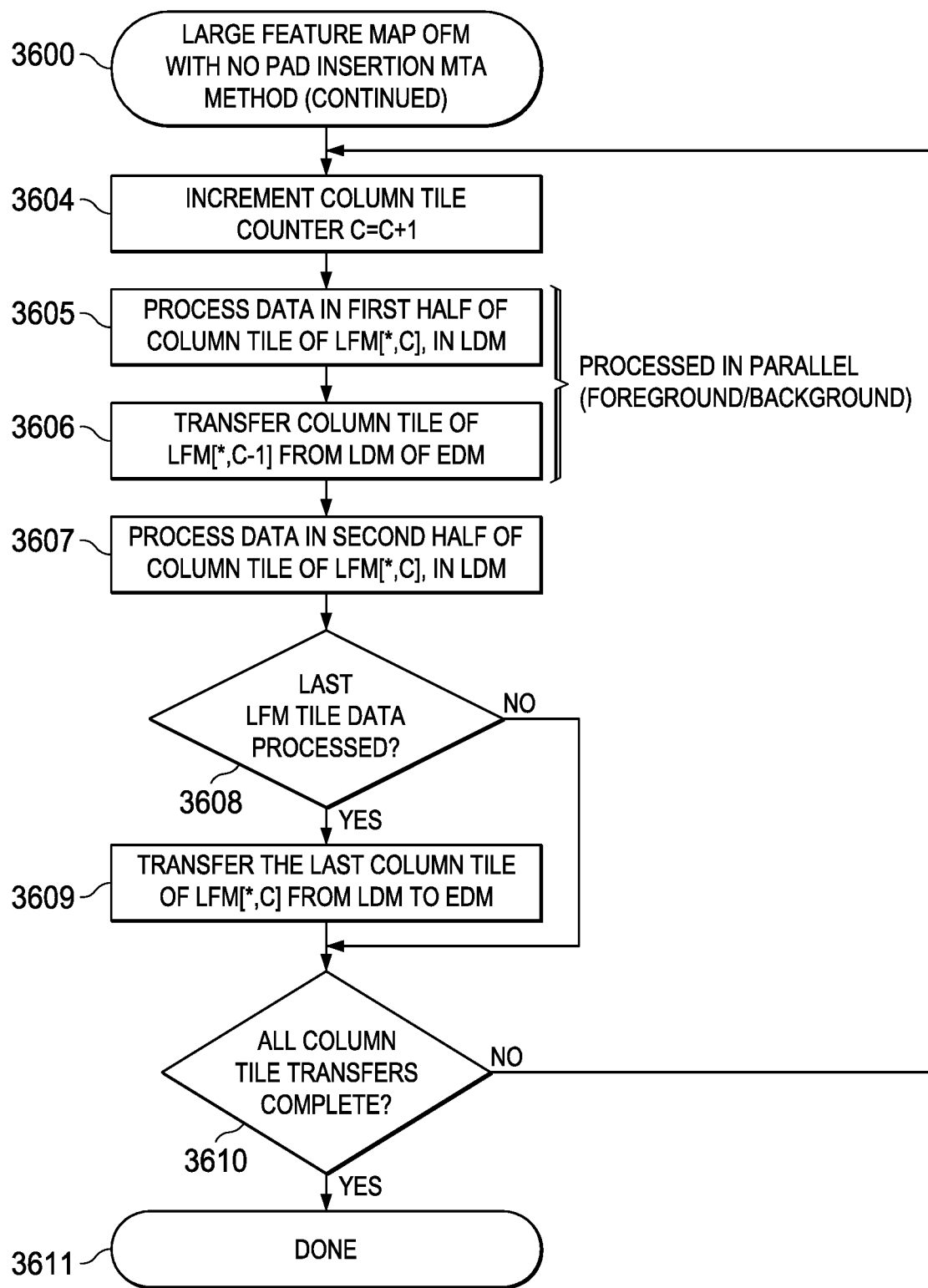
FIG. 36 illustrates a flowchart of n large feature map (LFM) output feature map (OFM) with no pad insertion matrix transfer accelerator (MTA) operational sequence (page 2 of 2)

FIG. 33 (3300)—FIG. 36 (3600) depict additional implementation details regarding general large feature map (LFM) data transfers with no pad insertion. These operational flowcharts may be preferably implemented within the matrix compute/transfer control (MCT) logic (0117) as generally depicted in FIG. 1 (0100) using traditional hardware finite state machine (FSM) logic as is well known to those skilled in the electrical arts.

IFM Data Movement With No Pad Insertion (3300)-(3400)

Figure 21:
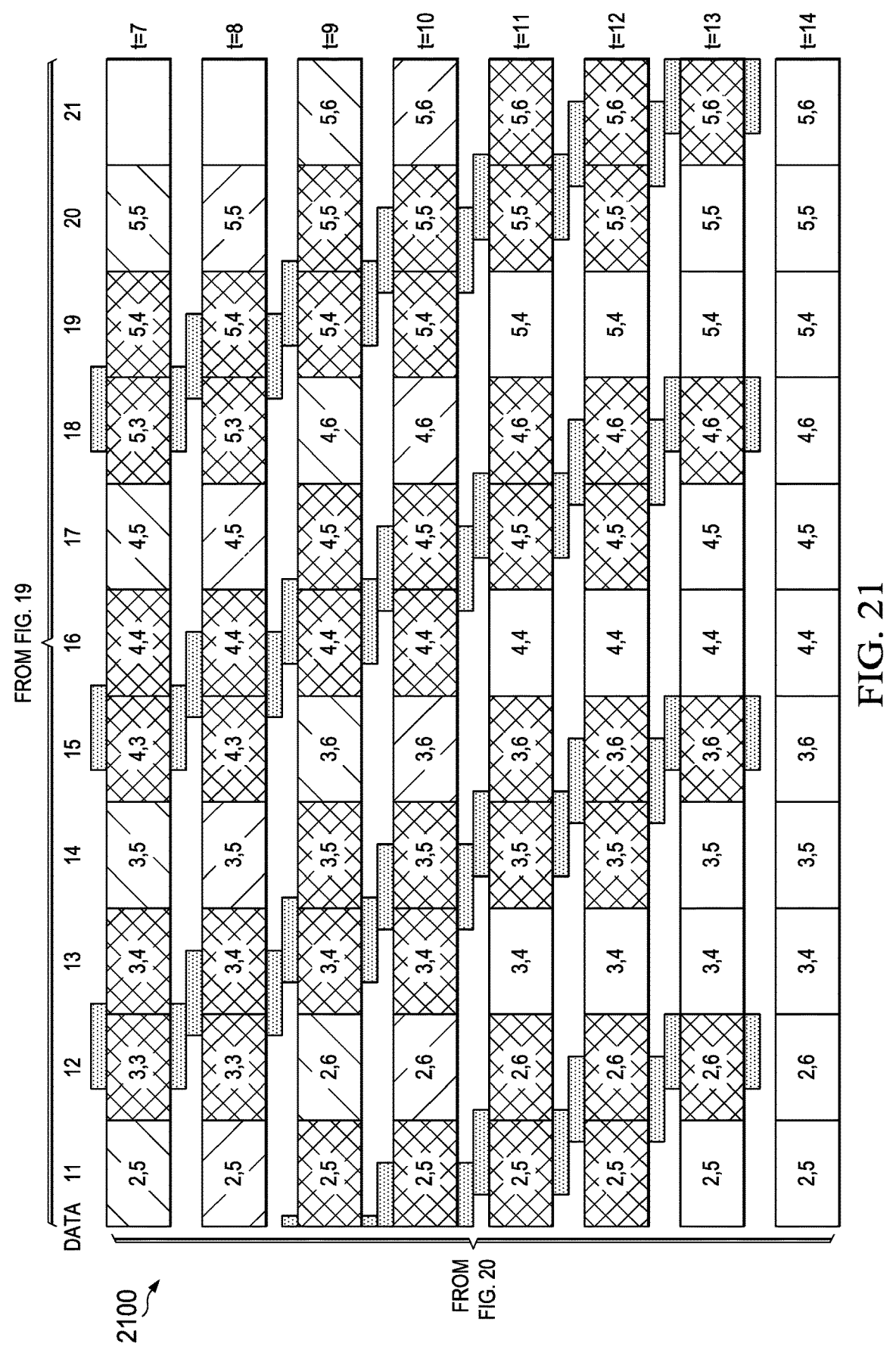
Figure 34:
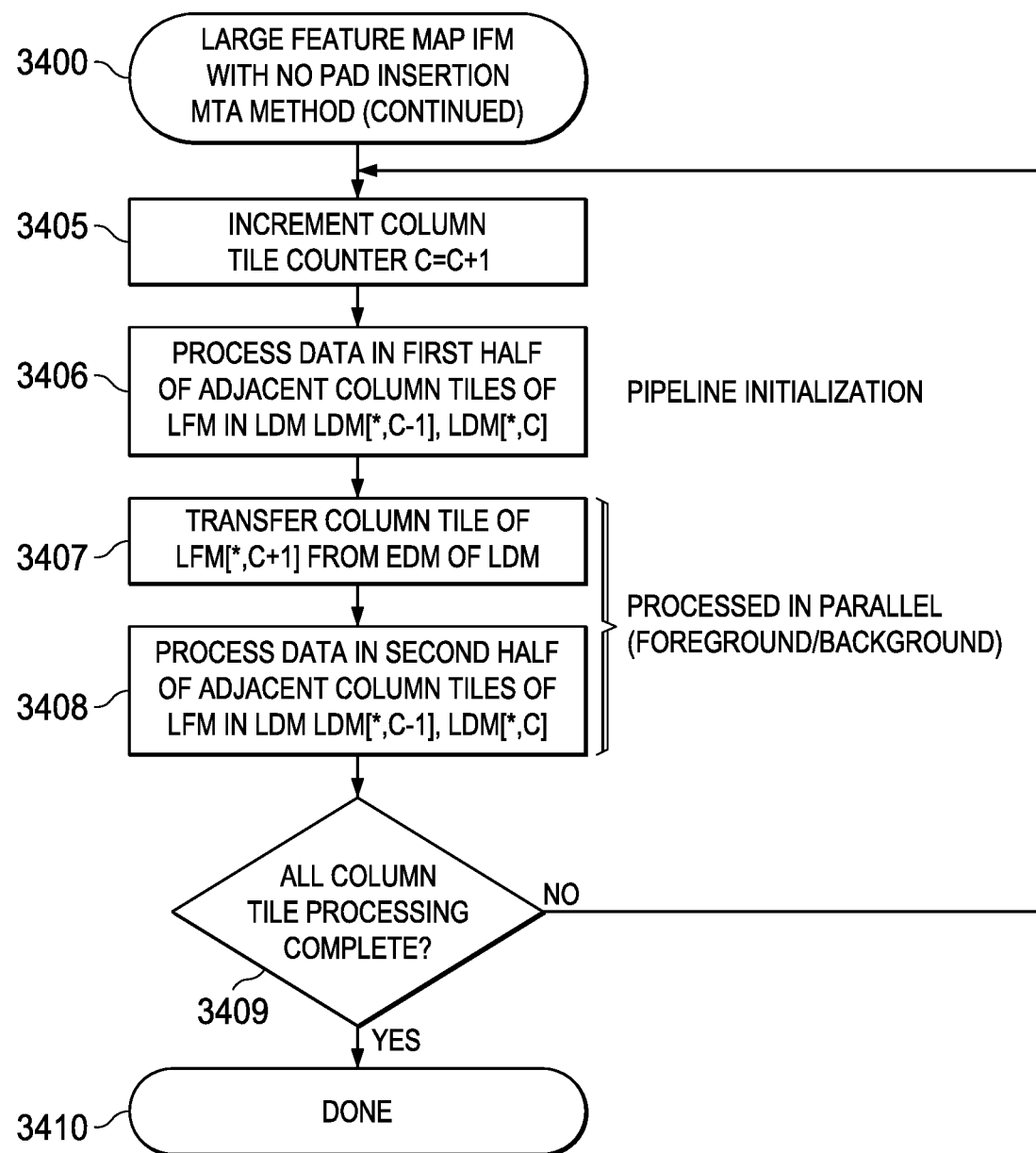
FIG. 34 illustrates a flowchart of a large feature map (LFM) input feature map (IFM) with no pad insertion matrix transfer accelerator (MTA) operational sequence (page 2 of 2)

FIG. 33 (3300)—FIG. 34 (3400) depict a typical method associated with optimized input feature map (IFM) data movement with no pad insertion corresponding to the data movement diagrams depicted in FIG. 17 (1700)—FIG. 21 (2100). This MTA method generally includes the following operations that may be implemented via hardware logic or via method steps in appropriately configured FSM logic hardware:
  (1) Initializing a column tile processing counter (C=0) (3301);
  (2) Transferring a column tile of LFM[*,C] from EDM to LDM (3302);
  (3) Processing data in the first column tile of LFM[*,C] stored in LDM (3303);
  (4) Transferring a column tile of LFM[*,C+1] from EDM to LDM (3304);
  (5) Incrementing the column tile counter (C=C+1) (3405);
  (6) Concurrent with operation step (7), processing data in first half of adjacent column tiles of LFM stored in LDM (LDM[*,C−1] and LDM[*,C]) (3406);
  (7) Concurrent with operation step (6), transferring a column tile of LFM[*,C+1] from EDM to LDM (3407);
  (8) Processing data in second half of adjacent column tiles of LFM stored in LDM (LDM[*,C−1] and LDM[*,C]) (3408);
  (9) Determining if all column tile processing is complete, and if not, proceeding to step (5) (3409); and
  (10) Terminating the MTA-controlled matrix data transfer (3410).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure.

OFM Data Movement with No Pad Insertion (3500)-(3600)

Figure 22:
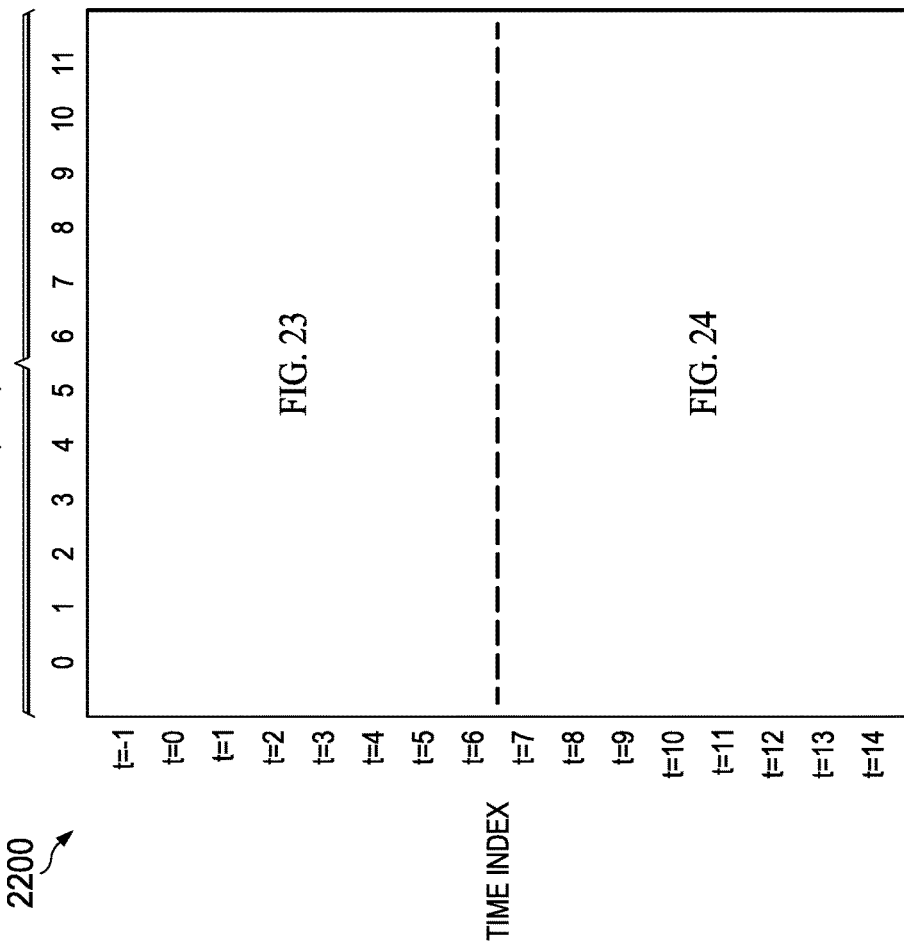
FIG. 22 illustrates an output feature map (OFM) data movement example pattern for large feature map tiles with no pad insertion incorporating partial storage in LDM with 128 B alignment for efficient EDM-to-LDM data movement that reduces local memory requirements and incorporates foreground/background data movement/compute cycles (two section data movement map referencing FIG. 23-FIG. 24)
Figure 23:
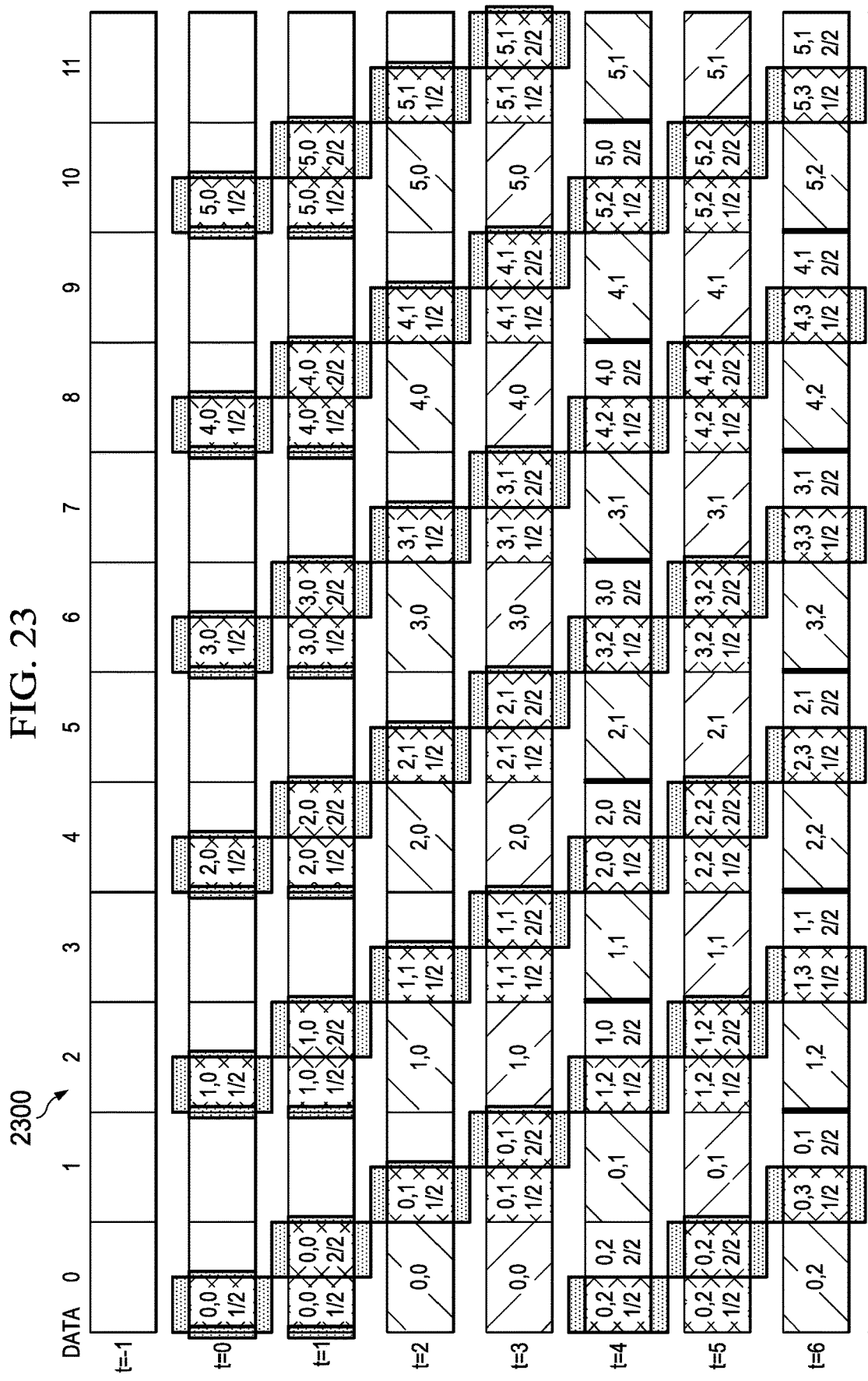
FIG. 23 illustrates an output feature map (OFM) data movement example pattern for large feature map tiles with no pad insertion incorporating partial storage in LDM with 128 B alignment for efficient EDM-to-LDM data movement that reduces local memory requirements and incorporates foreground/background data movement/compute cycles (upper section data movement map—page 1 of 2)
Figure 35:
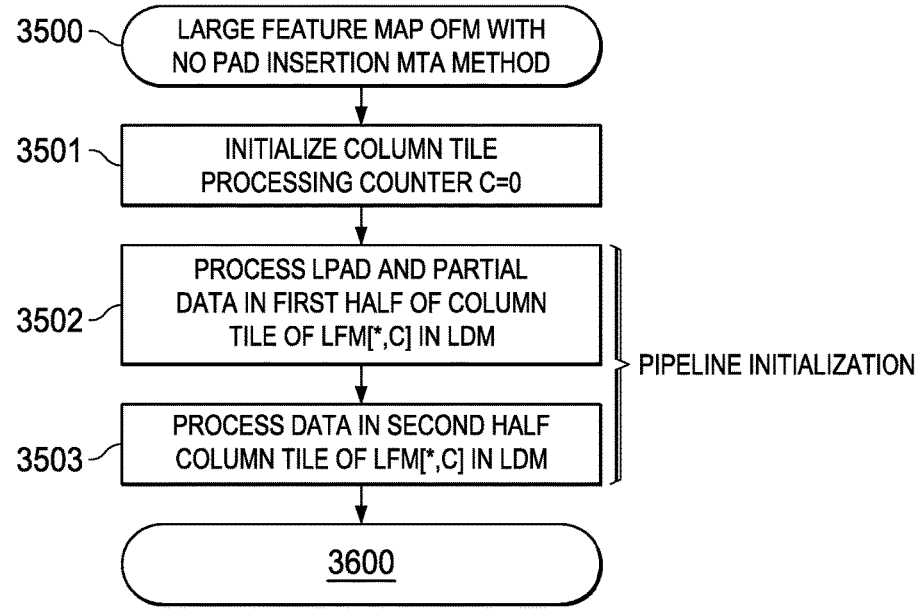
FIG. 35 illustrates a flowchart of a large feature map (LFM) output feature map (OFM) with no pad insertion matrix transfer accelerator (MTA) operational sequence (page 1 of 2)

FIG. 35 (3500)—FIG. 36 (3600) depict a typical method associated with optimized output feature map (OFM) data movement with no pad insertion corresponding to the data movement diagrams depicted in FIG. 22 (2200)—FIG. 24 (2400). This MTA method generally includes the following operations that may be implemented via hardware logic or via method steps in appropriately configured FSM logic hardware:

(1) Initializing a column tile processing counter (C=0) (3501);
(2) Processing Lpad and partial data in the first half of the first column tile of LFM[*,C] stored in LDM (3502);
(3) Processing data in the second half of the first column tile of LFM[*,C] stored in LDM (3503);
(4) Incrementing the column tile counter (C=C+1) (3604);
(5) Concurrent with operation step (6), processing data in the first half of a column tile of LFM[*,C] stored in LDM (3605);
(6) Concurrent with operation step (5), transferring column tile of LFM[*,C−1] from LDM to EDM (3606);
(7) Processing data in the second half of a column tile of LFM[*,C] stored in LDM (3607);
(8) Determining if all LFM tile data in the LDM has been processed (including the partial tile data adjacent to Rpad), and if not, proceeding to step (10) (3808);
(9) Transferring the last column tile of LFM[*,C] from LDM to EDM (3809);
(10) Determining if all column tile processing is complete, and if not, proceeding to step (4) (3610); and
(11) Terminating the MTA-controlled matrix data transfer (3611).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure.

LFM Data Transfers with Pad Insertion (3700)-(4000)

Figure 37:
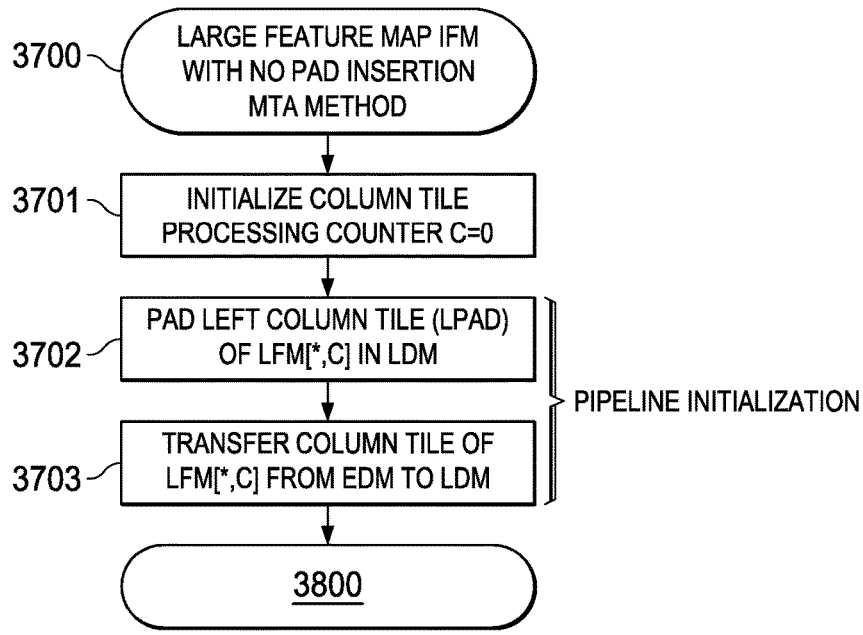
FIG. 37 illustrates a flowchart of a large feature map (LFM) input feature map (IFM) with pad insertion matrix transfer accelerator (MTA) operational sequence (page 1 of 2)
Figure 40:
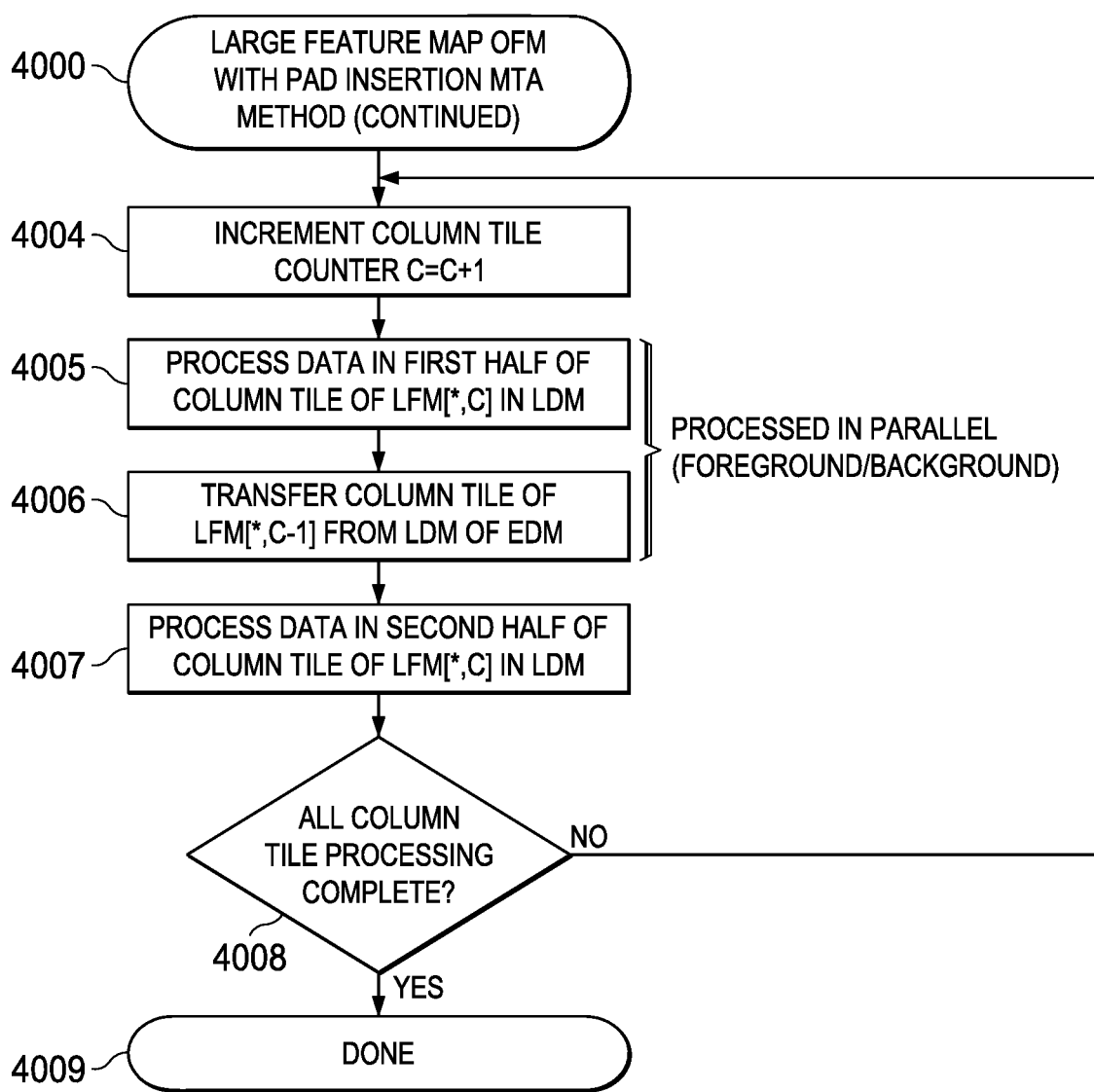
FIG. 40 illustrates a flowchart of n large feature map (LFM) output feature map (OFM) with pad insertion matrix transfer accelerator (MTA) operational sequence (page 2 of 2)

FIG. 37 (3700)—FIG. 40 (4000) depict additional implementation details regarding general large feature map (LFM) data transfers with pad insertion. These operational flowcharts may be preferably implemented within the matrix compute/transfer control (MCT) logic (0117) as generally depicted in FIG. 1 (0100) using traditional hardware finite state machine (FSM) logic as is well known to those skilled in the electrical arts.

IFM Data Movement with Pad Insertion (3700)-(3800)

Figure 29:
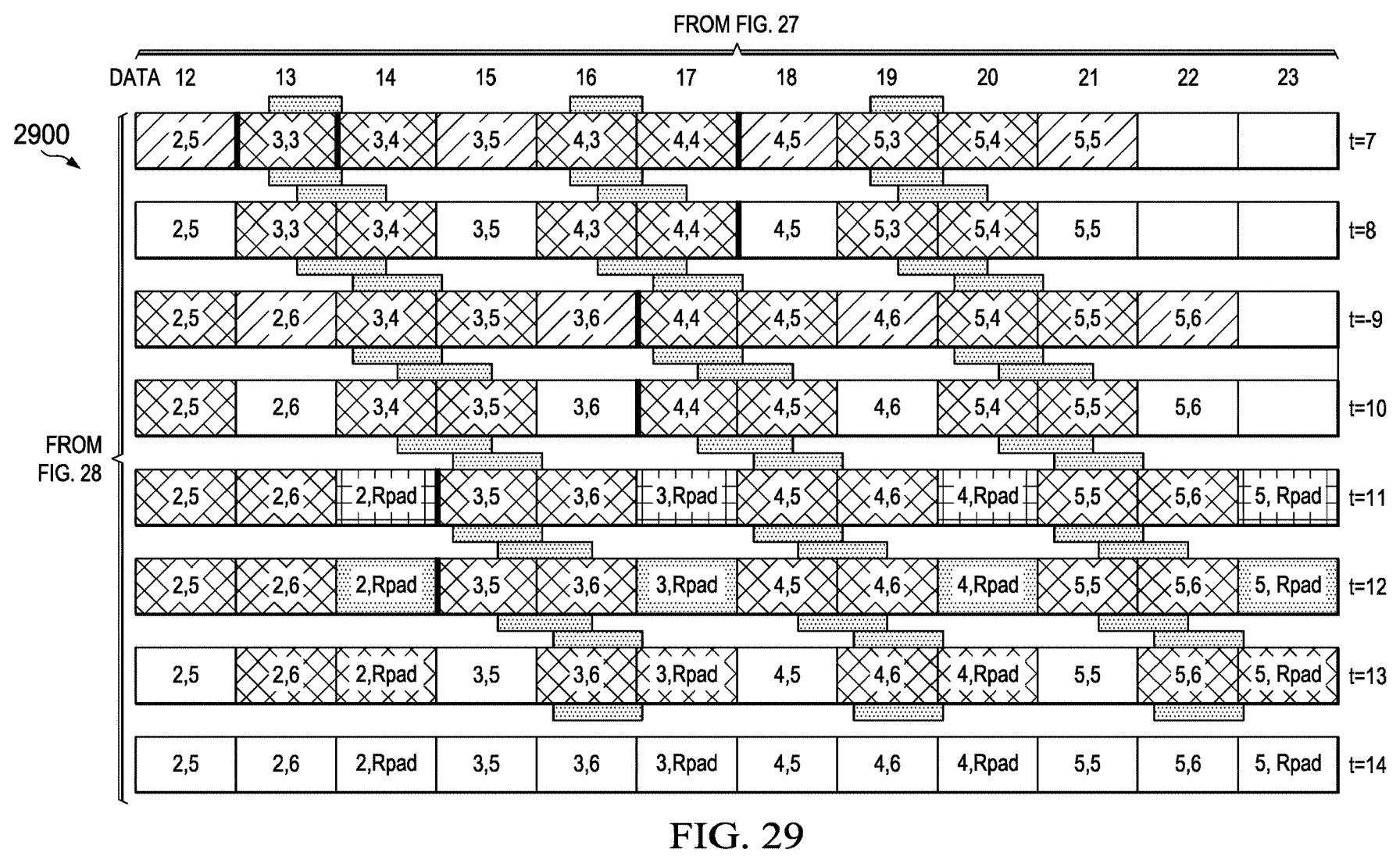
Figure 38:
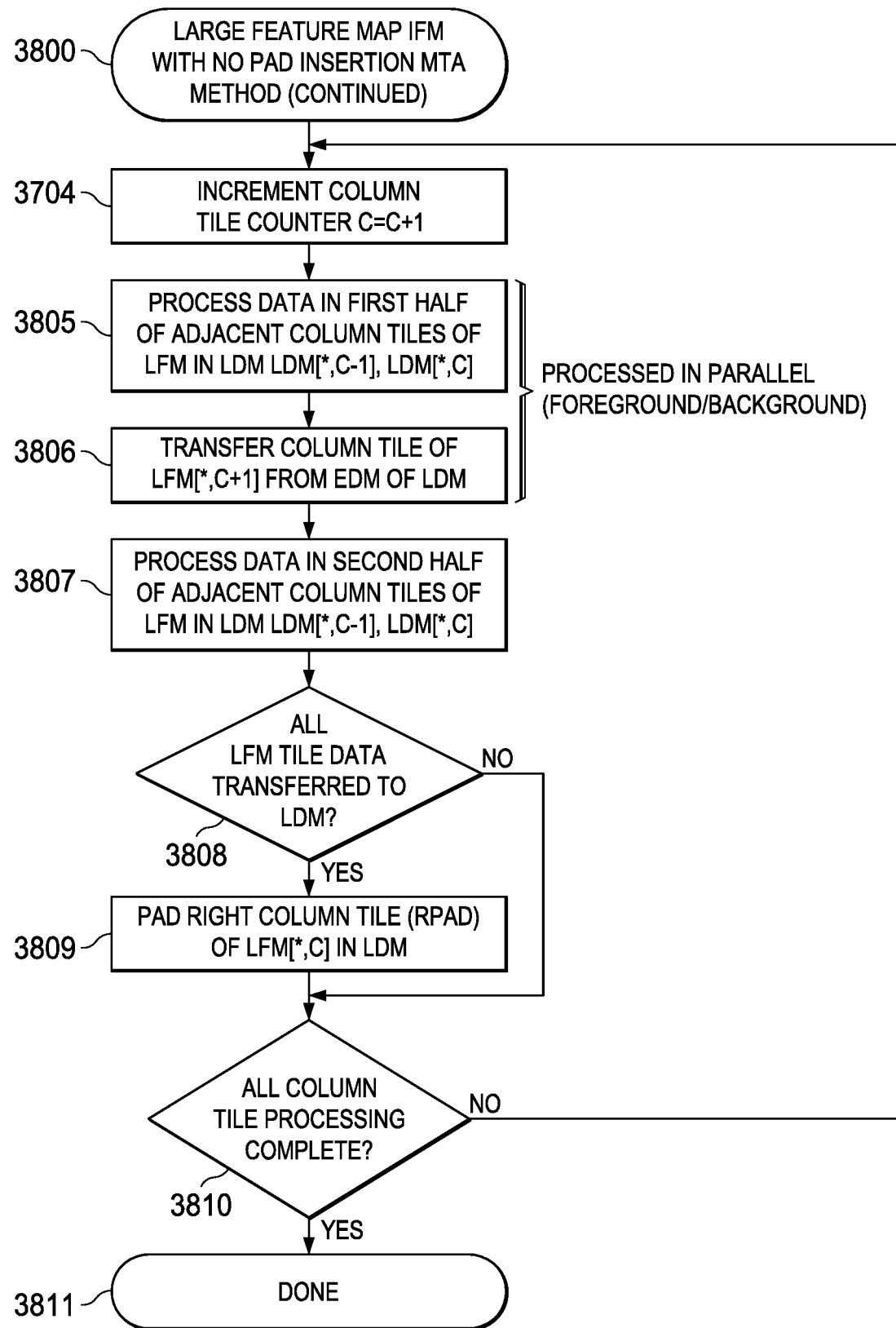
FIG. 38 illustrates a flowchart of a large feature map (LFM) input feature map (IFM) with pad insertion matrix transfer accelerator (MTA) operational sequence (page 2 of 2)

FIG. 37 (3700)—FIG. 38 (3800) depict a typical method associated with optimized input feature map (IFM) data movement with pad insertion corresponding to the data movement diagrams depicted in FIG. 25 (2500)—FIG. 29 (2900). This MTA method generally includes the following operations that may be implemented via hardware logic or via method steps in appropriately configured FSM logic hardware:

(1) Initializing a column tile processing counter (C=0) (3701);
(2) Padding the left column tile (Lpad) of LFM[*,C] stored in LDM (3702);
(3) Transferring a column tile of LFM[*,C] from EDM to LDM (3703);
(4) Incrementing the column tile counter (C=C+1) (3804);
(5) Concurrent with operation step (6), processing data in first half of adjacent column tiles of LFM stored in LDM (LDM[*,C−1] and LDM[*,C]) (3805);
(6) Concurrent with operation step (5), transferring a column tile of LFM[*,C+1] from EDM to LDM (3806);
(7) Processing data in second half of adjacent column tiles of LFM stored in LDM (LDM[*,C−1] and LDM[*,C]) (3807);
(8) Determining if all LFM tile data has been transferred to the LDM, and if not, proceeding to step (10) (3808);
(9) Padding the right column tile (Rpad) of LFM[*,C] stored in LDM (3809);
(10) Determining if all column tile processing is complete, and if not, proceeding to step (4) (3810); and
(11) Terminating the MTA-controlled matrix data transfer (3811).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure.

OFM Data Movement With Pad Insertion (3900)-(4000)

Figure 39:
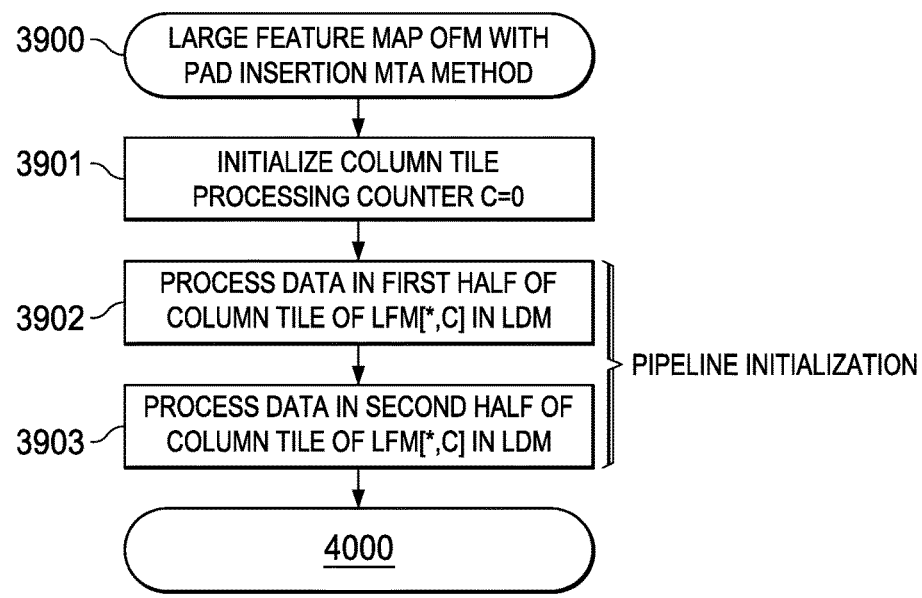
FIG. 39 illustrates a flowchart of a large feature map (LFM) output feature map (OFM) with pad insertion matrix transfer accelerator (MTA) operational sequence (page 1 of 2)

FIG. 39 (3900)—FIG. 40 (4000) depict a typical method associated with optimized output feature map (OFM) data movement with pad insertion corresponding to the data movement diagrams depicted in FIG. 30 (3000)—FIG. 32 (3200). This MTA method generally includes the following operations that may be implemented via hardware logic or via method steps in appropriately configured FSM logic hardware:

(1) Initializing a column tile processing counter (C=0) (3901);
(2) Processing data in the first half of the first column tile of LFM[*,C] stored in LDM (3902);
(3) Processing data in the second half of the first column tile of LFM[*,C] stored in LDM (3903);
(4) Incrementing the column tile counter (C=C+1) (4004);
(5) Concurrent with operation step (6), processing data in the first half of a column tile of LFM[*,C] stored in LDM (4005);
(6) Concurrent with operation step (5), transferring column tile of LFM[*,C−1] from LDM to EDM (4006);
(7) Processing data in the second half of a column tile of LFM[*,C] stored in LDM (4007);
(8) Determining if all column tile processing is complete, and if not, proceeding to step (4) (4008); and
(9) Terminating the MTA-controlled matrix data transfer (4009).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure.

Zero-Fill DMA Controller (ZDC) (4100)-(4800)

Overview

In example embodiments an automated zero-fill DMA controller (ZDC) may be implemented to allow rapid transfer of data from the EDM to the LDM (or between the LDM and the LDM) such that data may be transferred from a source EDM address (or alternatively a LDM address) to a target LDM address such that the source matrix in EDM/LDM storage is augmented with fill data (which is typically zero fill, but may be any fixed data pattern) around its matrix periphery when eventually stored in LDM.

It should be noted that in the following discussion and in the accompanying FIG. 41 (4100)—FIG. 48 (4800), the systems/methods described may equally be applied to situations where a matrix is stored in LDM and is then transferred to another address within LDM and augmented with a zero-fill periphery. As such, variations of any of the discussed systems/methods below may be implemented and are anticipated by the present disclosure in which the EDM/EMB are replaced by LDM/LMB such that all data transfers and zero-fills occur within LDM.

Furthermore, while the ZDC is primarily implemented using zero-filling of the LDM matrix periphery, some disclosure embodiments may utilize non-zero or other defined fill values, and these variants will be termed pad-filled or pad-filling embodiments implemented using a pad-fill DMA controller (PDC). These pad-filling techniques may be applied to any of the disclosure embodiments described below.

System Function (4100)

Figure 41:
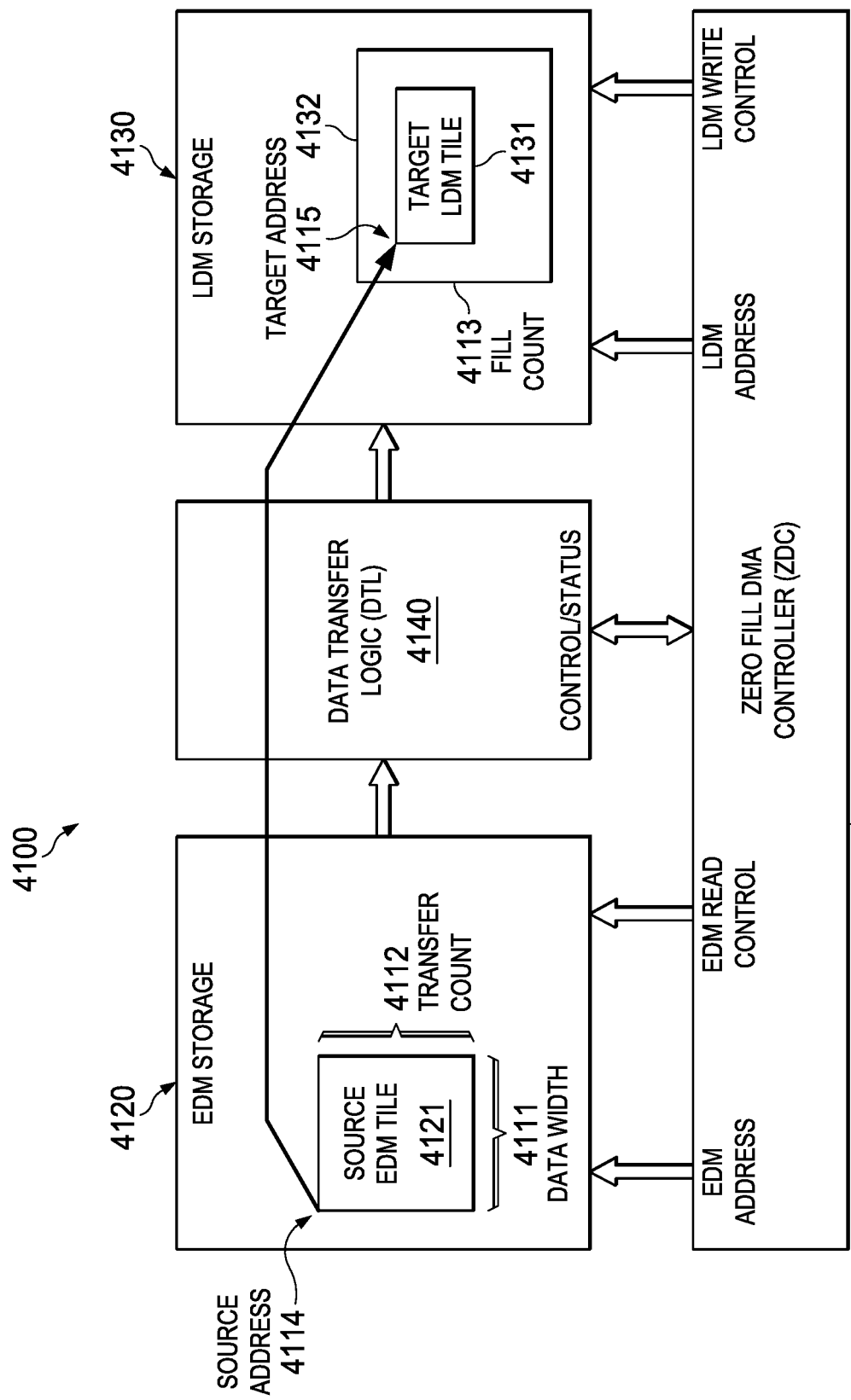
FIG. 41 illustrates a system block diagram detailing an automated zero-fill DMA controller (ZDC) useful in some disclosure embodiments.

An exemplary system block diagram of such a ZDC is generally depicted in FIG. 41 (4100) wherein the zero-fill DMA controller (ZDC) (4110) interfaces EDM storage (4120) to LDM storage (4130) via data transfer interface logic (DTL) (4140) under control of the ZDC (4110). Here it can be seen that a source EDM tile (4121) is transferred from the EDM storage (4120) through the DTL (4140) and placed in the LDM storage (4130) as a target LDM memory segment (4131) that is surrounded with a zero-fill (or other fixed fill) boundary (4132).

The source EDM tile (4121) is described in terms of a data width (4111) and a transfer count (4112) that relate to a source EDM address (4114). The data transfer from EDM (4120) to LDM (4130) transfers data from the source EDM address (4114) in terms of a given data width (4111) (data row width in bytes) and transfer count (4112) (number of data rows) to the LDM (4130) in terms of a LDM target address (4115) with identical data width (4111) and transfer count (4112). As the source EDM tile (4121) is transferred from the EDM (4120) to the LDM (4130), a fill count (4112) of zero fill (or other fixed value) data is also written to the LDM (4130) to create a bounding box (4132) of fixed-filled data surrounding the target LDM tile (4131).

Logic Implementation (4200)

Figure 42:
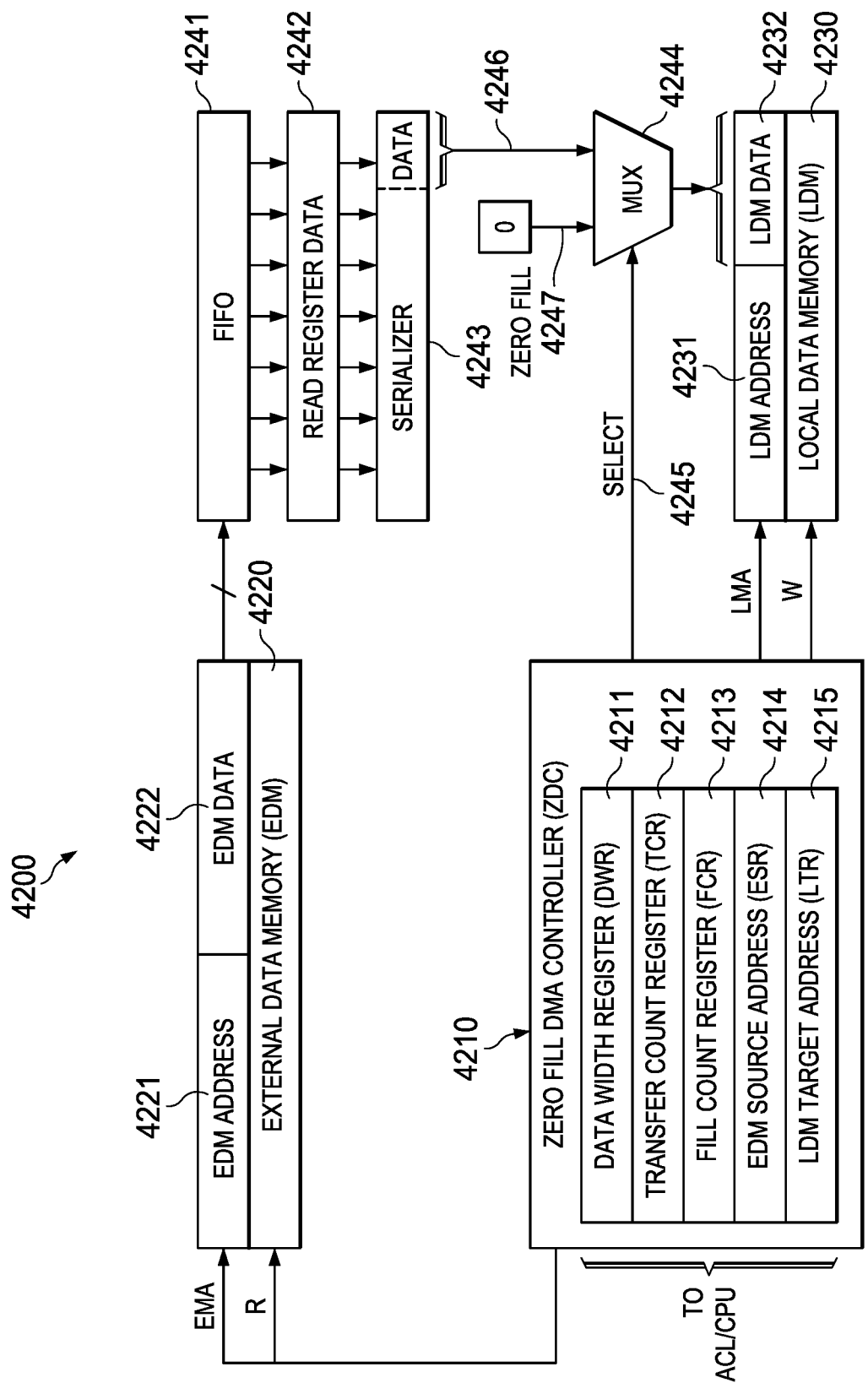
FIG. 42 illustrates a logic diagram detailing an automated zero-fill DMA controller (ZDC) useful in some disclosure embodiments.

A logic block diagram of a typical implementation of the functionality illustrated in FIG. 41 (4100) is generally depicted in FIG. 42 (4200). Here it can be seen that the zero-fill DMA controller (ZDC) (4210) is configured with a data width register (DWR) (4211), transfer count register (TCR) (4212), fill count register (FCR) (4213), EDM source address register (ESR) (4214), and LDM target address register (LTR) (4215) that are accessible via the ACL/CPU such that writes to the TCR (4212) trigger interpretation of the DWR (4211), TCR (4212), FCR (4213), ESR (4214), and LTR (4215) to automatically transfer data from the EDM (4220) to the LDM (4230).

The ZDC (4210) maintains internal logic to force reads of the EDM (4220) data at specific EDM addresses (4221) that produce EDM bus data (4222) that are fed to a FIFO (4241) and/or a register latch (4242). This registered data may be optionally serialized (4243) (using a parallel-to-serial shift register) and window inspected by a multiplexer (4244) depending on a ZDC (4210) multiplexer selection control (4245) that determines whether data from the EDM (4220) tile data (4246) is to be written to the LDM (4230) tile or alternatively zero fill (or other fixed value) data (4247).

Alternative Logic Implementation (4300)

Figure 43:
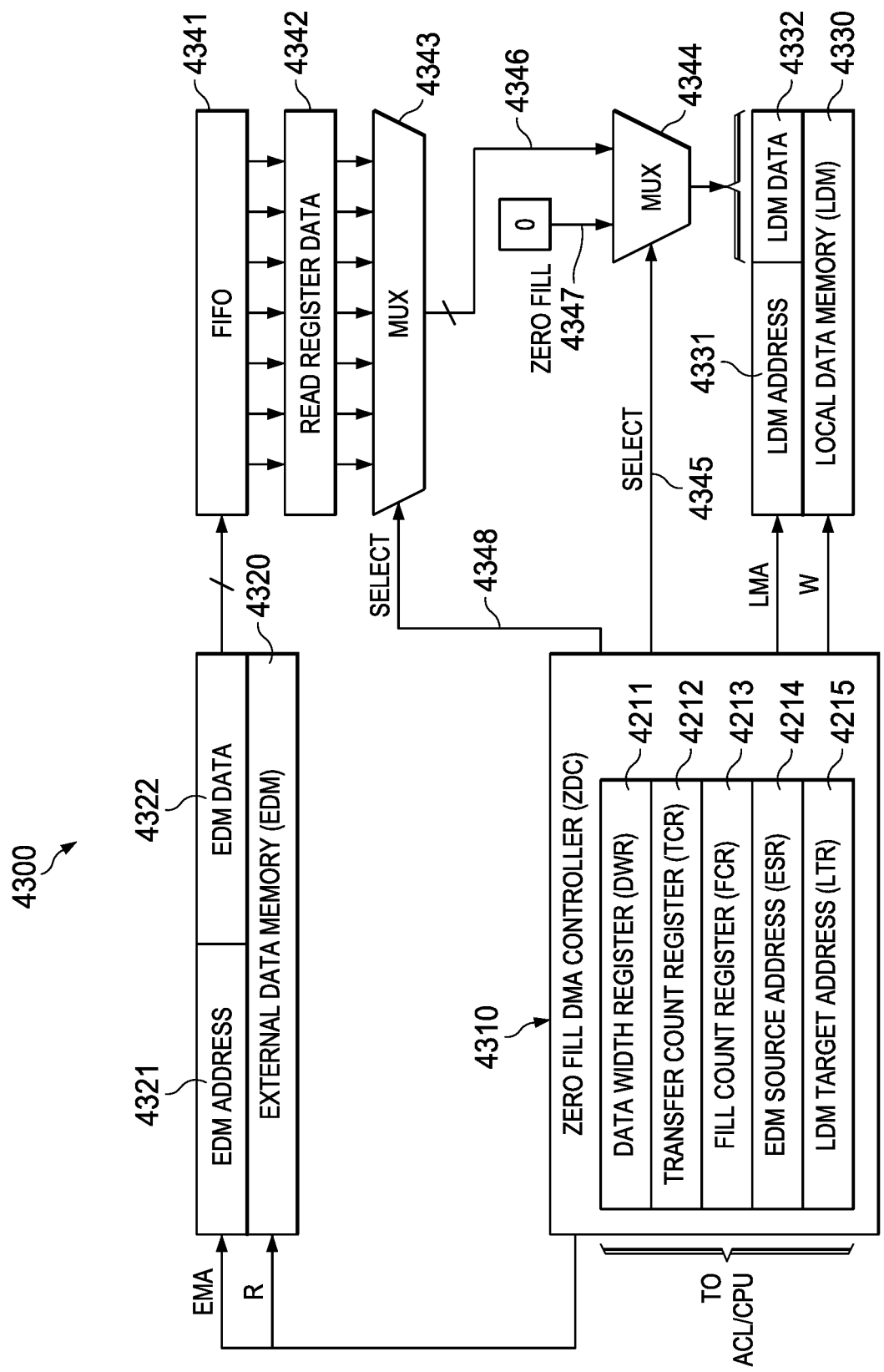
FIG. 43 illustrates a logic diagram detailing an alternative automated zero-fill DMA controller (ZDC) useful in some disclosure embodiments.

An alternative embodiment of the ZDC is generally depicted in FIG. 43 (4300) and incorporates a data multiplexer (4343) that operates in conjunction with data selection input (4348) from the ZDC (4310) to select a portion of the data bits stored in the read data register (4342) for presentation to the zero/data selection multiplexer (4344) that determines if EDM data (4346) should be written to the LDM or alternatively zero/fixed data (4347).

General Zero-Fill Method (4400)

Figure 44:
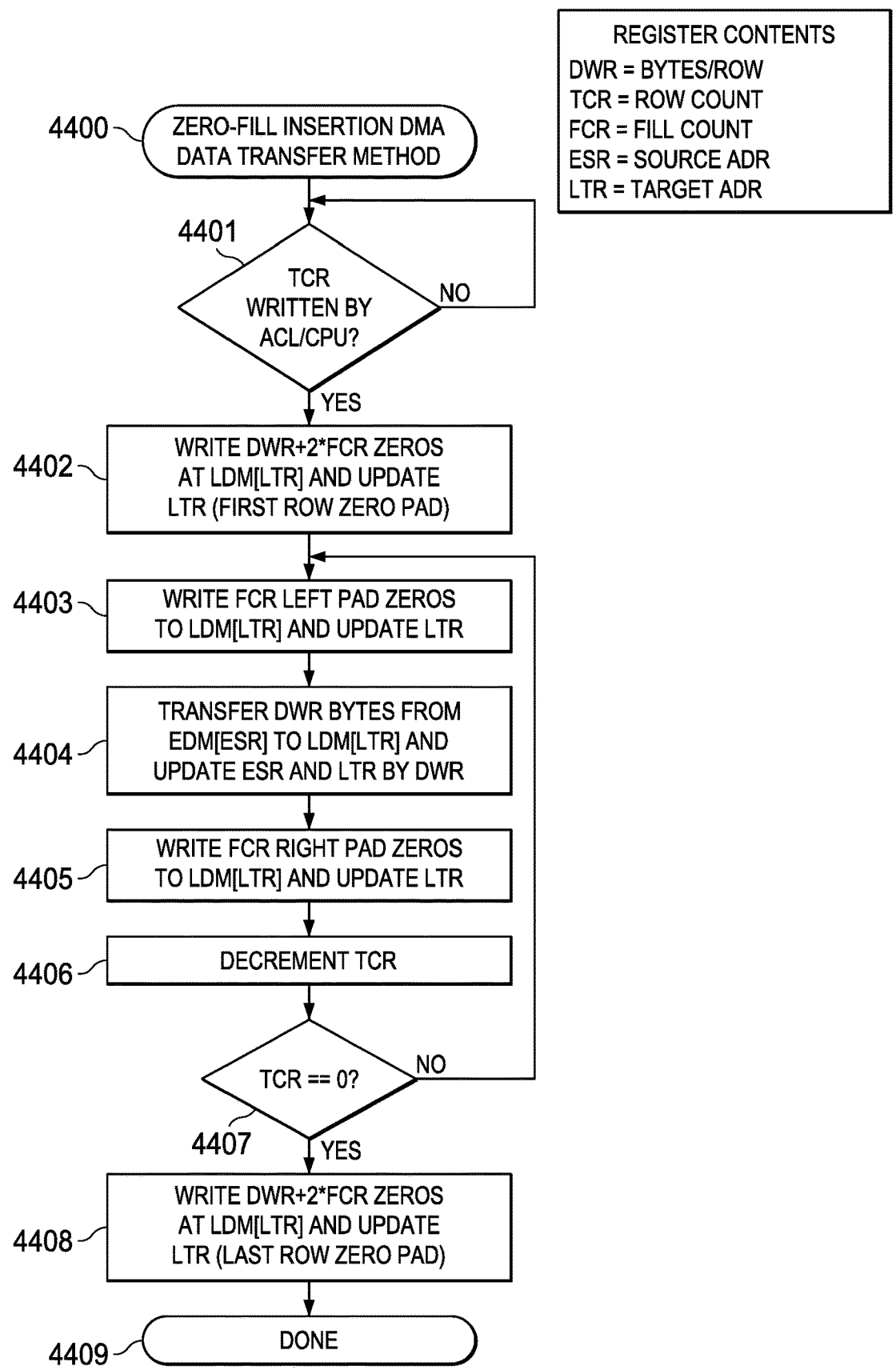
FIG. 44 illustrates a flowchart depicting a zero-fill DMA controller (ZDC) method.

As generally depicted in the flowchart of FIG. 44 (4400) and consistent with the above system descriptions in FIG. 41 (4100)—FIG. 43 (4300), an example method associated with creating the zero-fill data patterns in the LDM may be broadly generalized as a zero-fill insertion DMA data transfer method comprising:

(1) Waiting for a write to the transfer count register (TCR) by the ACL/CPU (4401);
(2) Zero fill the first row of the local data memory (LDM) output matrix at the local target register address (LTR) based on the data width register (DWR) count by writing DWR+2*FCR zeros at LDM[LTR] and updating LTR by DWR+2*FCR (4402);
(3) Zero fill the left pad of the LDM output matrix by writing FCR left pad zeros to LDM[LTR] and updating LTR by FCR (4403);
(4) Transferring DWR bytes from EDM[ESR] to LDM[LTR] and update ESR and LTR by DWR (4404);
(5) Zero fill the right pad of the LDM output matrix by writing FCR left pad zeros to LDM[LTR] and updating LTR by FCR (4405);
(6) Decrementing TCR (4406);
(7) Determining if the TCR register is zero, and if not, proceeding to step (3) (4407); and
(8) Zero fill the last row of the local data memory (LDM) output matrix at the local target register address (LTR) based on the data width register (DWR) count by writing DWR+2*FCR zeros at LDM[LTR] and updating LTR by DWR+2*FCR (4408).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure. In some circumstances the zero-fill steps described above may be overlapped with data transfer operations from EDM to LDM. The method listed above assumes that only one zero-fill row will be inserted at the top and bottom of the LDM output matrix. This single row of zero-fill may be augmented with other zero-fill rows in some disclosure embodiments.

ZDC Parallel Circular Write Buffer Data Flow Implementation (4500)

Figure 45:
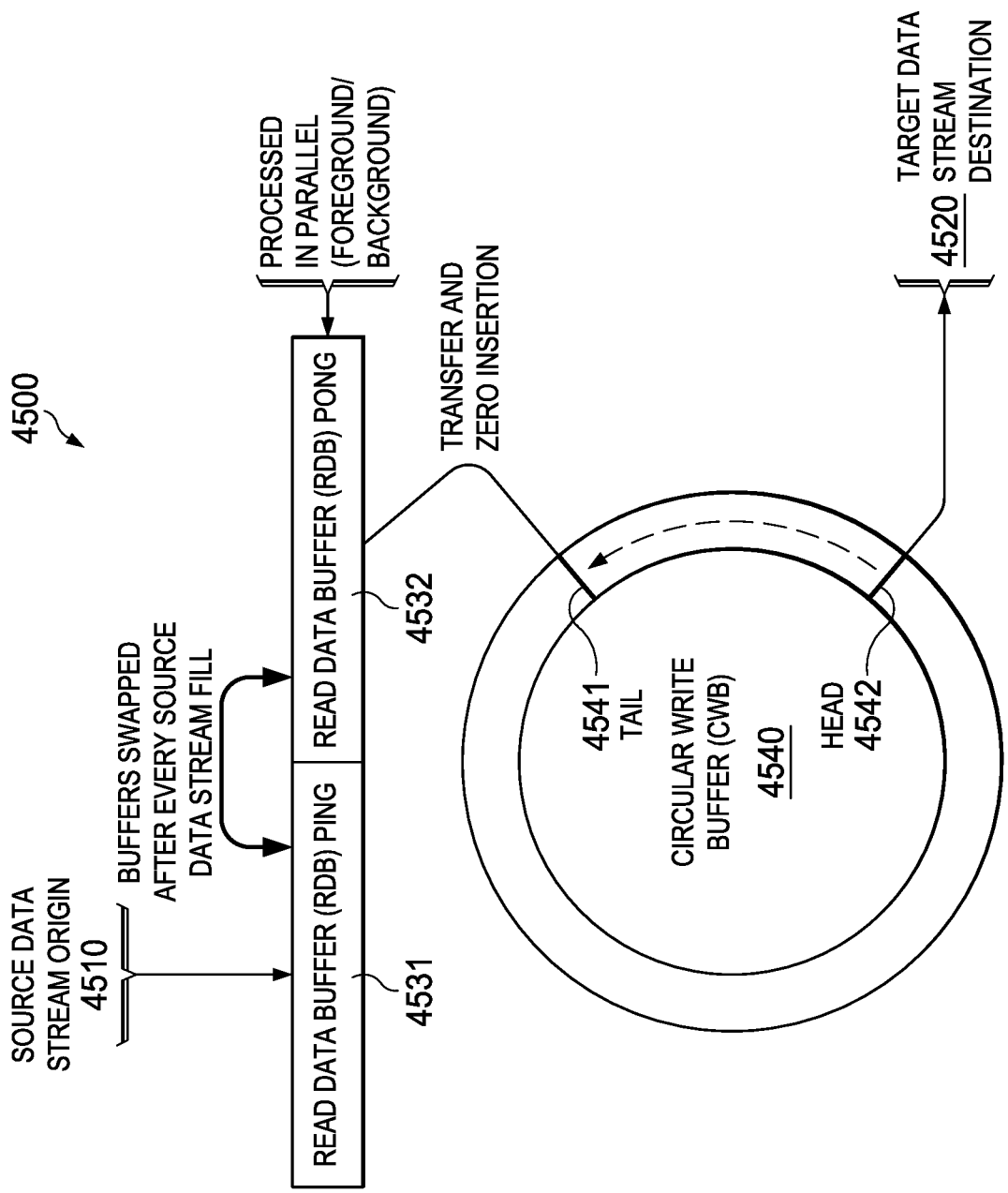
FIG. 45 illustrates a data flow diagram of a construction of an integrated zero-fill insertion DMA controller useful in some disclosure embodiments.

As generally depicted in FIG. 45 (4500), the ZDC may be implemented as depicted in scenarios where a source data stream (EDM/LDM) (4510) is transferred to a target data stream (LDM) (4520) using read data buffers (4531, 4532) configured in a ping-pong fashion such that one read buffer (4521) is being loaded from the source data stream (4510) while the other read buffer (4532) is being written to the circular write buffer (CWB) (4540) based on the tail pointer (4541). The overlap of data transfer from the source data stream (4510) to the first read data buffer (4531) and simultaneous data transfer from the second read data buffer (4532) permits maximum EDM bus utilization and maximum data transfer in the system. Since the data transfer and zero-fill operations that occur from the second read data buffer (4532) to the CWB (4540) occur at a faster speed than that of the source data stream (4510) to the first read data buffer (4531) (due to slower EDM memory access than LDM memory access), the zero-fill operation can be implemented without additional data transfer speed penalty. Additionally, this speed differential ensures that once data is transferred from the source data stream (4531) to the first read data buffer (4531), the addresses of the first read data buffer (4531) and second read data buffer (4532) may be swapped in a ping-pong fashion and data can immediately be transferred to from the source data stream (4510) to the second read data buffer (4532) while data is being transferred from the first read data buffer (4531) to the CWB (4540).

Associated with the CWB (4540) are a write tail pointer (4541) used to determine where source data and/or zero fill data is to be written next and a read head pointer (4542) that is used by a separate parallel process that takes data from the CWB (4540) and transfers it to the target data stream destination (4520).

ZDC Parallel Circular Write Buffer Method (4600)-(4800)

Figure 46:
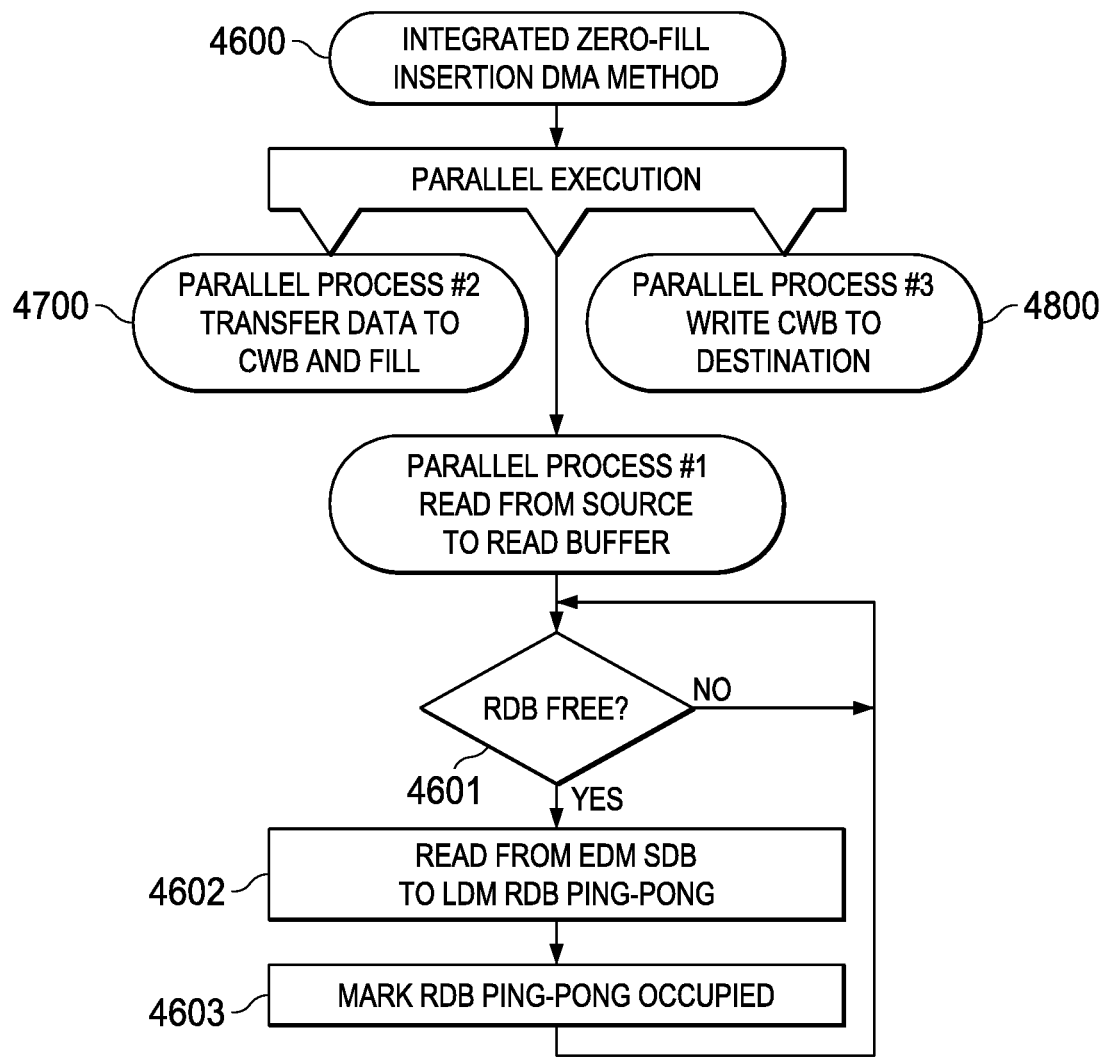
FIG. 46 illustrates a flowchart depicting an automated parallel zero-fill DMA controller (ZDC) method (parallel process 1 of 3)
Figure 47:
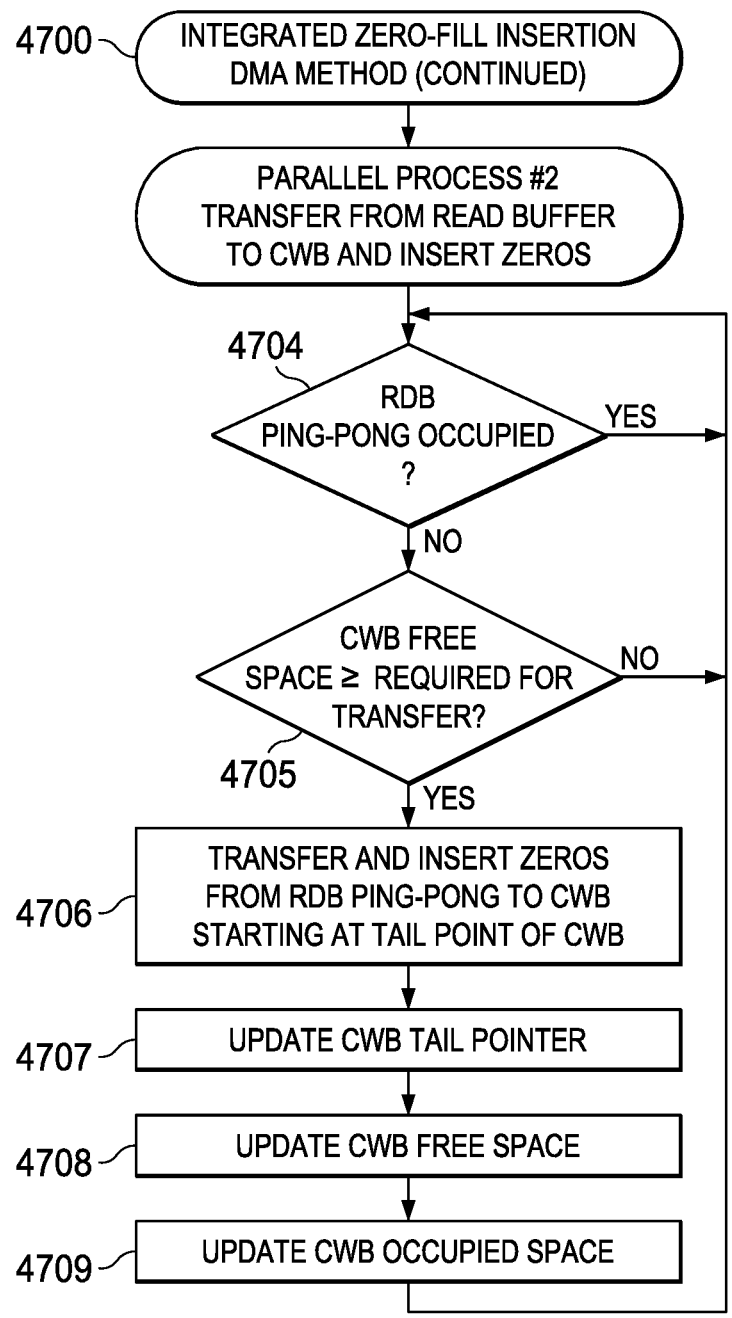
FIG. 47 illustrates a flowchart depicting an automated parallel zero-fill DMA controller (ZDC) method (parallel process 2 of 3)
Figure 48:
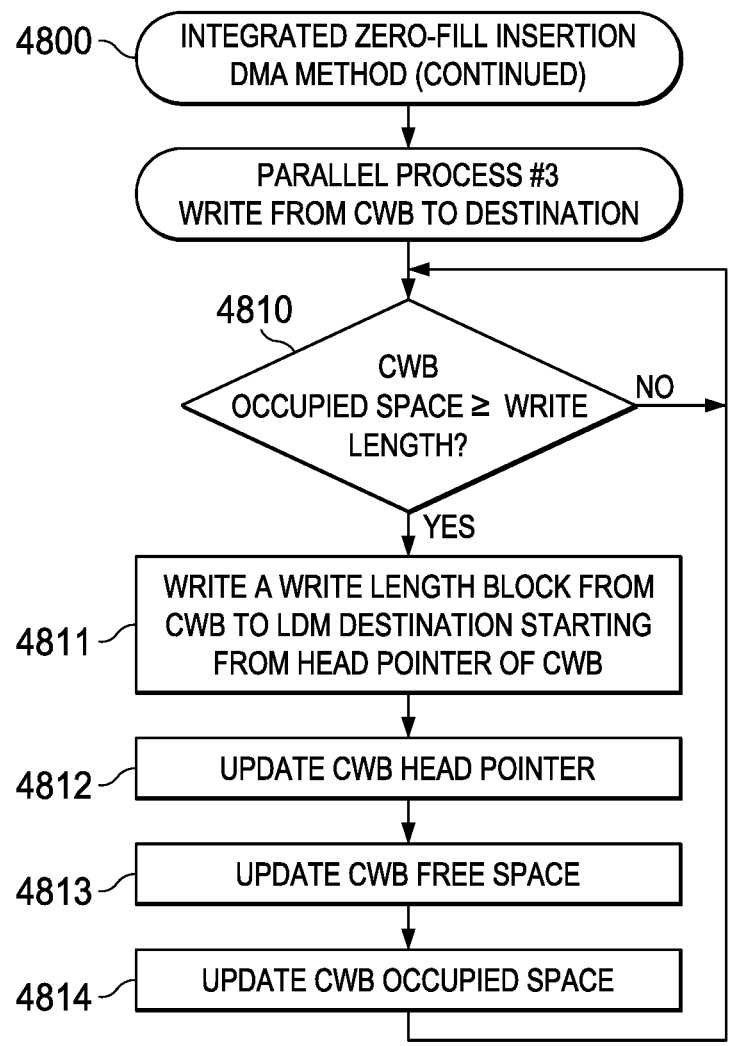
FIG. 48 illustrates a flowchart depicting an automated parallel zero-fill DMA controller (ZDC) method (parallel process 3 of 3).

The data flow generally depicted in FIG. 46 (4600) may be implemented as a number of parallel method processes as generally depicted in FIG. 46 (4600)—FIG. 48 (4800) which may be implemented by one skilled in the art using registered logic and an associated finite state machine (FSM). The method as depicted in these flowcharts implements three parallel processes. The first parallel process depicted in FIG. 46 (4600) as steps (4601)-(4603) reads data from the source to one of the available ping-pong read data buffers. The second parallel process depicted in FIG. 47 (4700) as steps (4704)-(4709) transfers data from the background read data buffer (the read data buffer currently not being loaded from the source data stream) to the circular write buffer (CWB) while simultaneously inserting zeros to account for a zero-fill target matrix periphery. The third parallel process depicted in FIG. 48 (4800) as steps (4810)-(4814) writes data from the CWB to the destination target address. All of these three processes may operate in parallel so that the zero-fill operations associated with the CWB may overlap slower data transfers that occur from the source data stream to one of the selected read data buffers.

MTA System Summary—Large IFM No Pad

Example embodiments may be broadly generalized in some embodiments as a large IFM no pad matrix transfer accelerator (MTA) system comprising:
(a) external data memory (EDM);
(b) local data memory (LDM); and
(c) data transfer processor (DTP);
wherein:
the EDM includes one or more input feature map (IFM) storage elements;
the IFM include one or more large feature map (LFM) storage elements;
the DTP is configured to transfer data between the EDM and the LDM by sequentially executing the following operations:
(1) Initializing a column tile processing counter (C=0) (3301);
(2) Transferring a column tile of LFM[*,C] from the EDM to the LDM (3302);
(3) Processing data in a first column tile of the LFM [*,C] stored in the LDM (3303);
(4) Transferring a column tile of the LFM[*,C+1] from the EDM to the LDM (3304);
(5) Incrementing the column tile counter (C=C+1) (3405);
(6) Concurrent with operation step (7), processing data in first half of adjacent column tiles of the LFM stored in the LDM (LDM[*,C−1] and LDM[*,C]) (3406);
(7) Concurrent with operation step (6), transferring a column tile of the LFM[*,C+1] from the EDM to the LDM (3407);
(8) Processing data in second half of adjacent column tiles of the LFM stored in the LDM (LDM[*,C−1] and LDM[*,C]) (3408); and
(9) Determining if all column tile processing is complete, and if not, proceeding to the step (5) (3409).

This general system summary may be augmented by the various elements described herein to produce a wide variety of disclosure embodiments consistent with this overall design description.

MTA System Summary—Large OFM No Pad

Example embodiments may be broadly generalized in some embodiments as a large IFM no pad matrix transfer accelerator (MTA) system comprising:
(a) external data memory (EDM);
(b) local data memory (LDM); and
(c) data transfer processor (DTP);
wherein:
the LDM includes one or more output feature map (OFM) storage elements;
the OFM include one or more large feature map (LFM) storage elements;
the DTP is configured to transfer data between the EDM and the LDM by sequentially executing the following operations:
(1) Initializing a column tile processing counter (C=0) (3501);
(2) Processing left padding (Lpad) and partial data in a first half of a first column tile of the LFM[*,C] stored in the LDM (3502);
(3) Processing data in a second half of a first column tile of the LFM[*,C] stored in the LDM (3503);
(4) Incrementing the column tile counter (C=C+1) (3604);
(5) Concurrent with operation step (6), processing data in a first half of a column tile of the LFM[*,C] stored in the LDM (3605);
(6) Concurrent with operation step (5), transferring a column tile of the LFM[*,C−1] from the LDM to the EDM (3606);
(7) Processing data in a second half of a column tile of the LFM[*,C] stored in the LDM (3607);
(8) Determining if all the LFM tile data in the LDM has been processed (including partial tile data adjacent to right padding (Rpad) data), and if not, proceeding to step (10) (3808);

(9) Transferring a last column tile of LFM[*,C] from the LDM to the EDM (3809); and
(10) Determining if all column tile processing is complete, and if not, proceeding to the step (4) (3810).

This general system summary may be augmented by the various elements described herein to produce a wide variety of disclosure embodiments consistent with this overall design description.

MTA System Summary—Large IFM with Pad

Example embodiments may be broadly generalized in some embodiments as a large IFM with pad matrix transfer accelerator (MTA) system comprising:
(a) external data memory (EDM);
(b) local data memory (LDM); and
(c) data transfer processor (DTP);
wherein:
the EDM includes one or more input feature map (IFM) storage elements;
the IFM include one or more large feature map (LFM) storage elements; the DTP is configured to transfer data between the EDM and the LDM by sequentially executing the following operations:
(1) Initializing a column tile processing counter (C=0) (3701);
(2) Padding a left column tile (Lpad) of the LFM[*,C] stored in the LDM (3702);
(3) Transferring a column tile of the LFM[*,C] from the EDM to the LDM (3703);
(4) Incrementing the column tile counter (C=C+1) (3804);
(5) Concurrent with operation step (6), processing data in first half of adjacent column tiles of the LFM stored in the LDM (LDM[*,C−1] and LDM[*,C]) (3805);
(6) Concurrent with operation step (5), transferring a column tile of the LFM[*,C+1] from the EDM to the LDM (3806);
(7) Processing data in second half of adjacent column tiles of the LFM stored in the LDM (LDM[*,C−1] and LDM[*,C]) (3807);
(8) Determining if all the LFM tile data has been transferred to the LDM, and if not, proceeding to step (10) (3808);
(9) Padding a right column tile (Rpad) of the LFM[*,C] stored in the LDM (3809); and
(10) Determining if all column tile processing is complete, and if not, proceeding to the step (4) (3810).

This general system summary may be augmented by the various elements described herein to produce a wide variety of disclosure embodiments consistent with this overall design description.

MTA System Summary—Large OFM with Pad

Example embodiments may be broadly generalized in some embodiments as a large IFM with pad matrix transfer accelerator (MTA) system comprising:
(a) external data memory (EDM);
(b) local data memory (LDM); and
(c) data transfer processor (DTP);
wherein:
the LDM includes one or more output feature map (OFM) storage elements;
the OFM include one or more large feature map (LFM) storage elements;

the DTP is configured to transfer data between the EDM and the LDM by sequentially executing the following operations:
(1) Initializing a column tile processing counter (C=0) (3901);
(2) Processing data in a first half of a first column tile of the LFM[*,C] stored in the LDM (3902);
(3) Processing data in a second half of the first column tile of the LFM[*,C] stored in the LDM (3903);
(4) Incrementing the column tile counter (C=C+1) (4004);
(5) Concurrent with operation step (6), processing data in a first half of a column tile of the LFM[*,C] stored in the LDM (4005);
(6) Concurrent with operation step (5), transferring a column tile of the LFM[*,C−1] from the LDM to the EDM (4006);
(7) Processing data in a second half of a column tile of the LFM[*,C] stored in the LDM (4007); and
(8) Determining if all column tile processing is complete, and if not, proceeding to the step (4) (4008).

This general system summary may be augmented by the various elements described herein to produce a wide variety of disclosure embodiments consistent with this overall design description.

MTA System Summary—Small IFM No Pad

Example embodiments may be broadly generalized in some embodiments as a small IFM no pad matrix transfer accelerator (MTA) system comprising:
(a) external data memory (EDM);
(b) local data memory (LDM); and
(c) data transfer processor (DTP);
wherein:
the EDM includes one or more output feature map (OFM) storage elements;
the EDM includes one or more filter coefficient multiplier (FCM) storage elements;
the EDM includes one or more input feature map (IFM) storage elements;
the LDM further includes a foreground output feature map (OFM-fore) storage element;
the LDM further includes a background output feature map (OFM-back) storage element;
the LDM further includes a foreground filter coefficient multiplier (FCM-fore) storage element;
the LDM further includes a background filter coefficient multiplier (FCM-back) storage element;
the LDM further includes a foreground input feature map (IFM-fore) storage element;
the DTP is configured to transfer small feature maps (SFM) with no pad insertion between the EDM and the LDM by sequentially:
(1) executing a 1D-to-1D data transfer of all the IFM from the EDM to the LDM (1001);
(2) concurrent with steps (2)-(5), executing a 1D-to-1D data transfer of the FCM to the FCM-back via a data transfer from the EDM to the LDM (1002);
(3) concurrent with steps (2)-(5), transferring a previously calculated output feature matrix (OFM) (OFM-back) from the LDM to the EDM (1003);
(4) concurrent with steps (2)-(5), calculating an output matrix product (OMP) and storing the OMP in the OFM-fore via the relation OFM-fore=(FCM-fore*IFM-fore) (1004);

(5) swapping foreground/background ping/pong memory pointers (fore/back) for OFM-fore/OFM-back and FCM-fore/FCM-back (1005); and
(6) removing seams or inserting zero padding in the OMP based on whether output padding is enabled for the OMP (1006, 1007, 1008).

This general system summary may be augmented by the various elements described herein to produce a wide variety of disclosure embodiments consistent with this overall design description. Note, that in alternative embodiments the swapping of memory pointers can be performed concurrently with steps 2-5.

MTA System Summary—First Small IFM With Pad

Example embodiments may be broadly generalized in some embodiments as a first small IFM with pad matrix transfer accelerator (MTA) system comprising:
(a) external data memory (EDM);
(b) local data memory (LDM); and
(c) data transfer processor (DTP);
wherein:
the EDM includes one or more output feature map (OFM) storage elements;
the EDM includes one or more filter coefficient multiplier (FCM) storage elements;
the EDM includes one or more input feature map (IFM) storage elements;
the LDM further includes a foreground output feature map (OFM-fore) storage element;
the LDM further includes a background output feature map (OFM-back) storage element;
the LDM further includes a foreground filter coefficient multiplier (FCM-fore) storage element;
the LDM further includes a background filter coefficient multiplier (FCM-back) storage element;
the LDM further includes a foreground input feature map (IFM-fore) storage element;
the DTP is configured to transfer small feature maps (SFM) with pad insertion between the EDM and the LDM by sequentially:
(1) executing a 2D-to-2D data transfer of all the IFM from the EDM to the LDM leaving space in the LDM for zero filling (1201);
(2) executing a peripheral zero-fill operation on the 2D-to-2D data stored in the LDM (1202);
(3) concurrent with steps (3)-(6), executing a 1D-to-1D data transfer of the FCM to the FCM-back via a data transfer from the EDM to the LDM (1203);
(4) concurrent with steps (3)-(6), transferring a previously calculated output feature matrix (OFM) (OFM-back) from the LDM to the EDM (1204);
(5) concurrent with steps (3)-(6), calculating an output matrix product (OMP) and storing the OMP in the OFM-fore via the relation OFM-fore=(FCM-fore*IFM-fore) (1205);
(6) swapping foreground/background ping/pong memory pointers (fore/back) for OFM-fore/OFM-back and FCM-fore/FCM-back (1206); and
(7) removing seams or inserting zero padding in the OMP based on whether output padding is enabled for the OMP (1207, 1208, 1209).

This general system summary may be augmented by the various elements described herein to produce a wide variety of disclosure embodiments consistent with this overall design description. Note, that in alternative embodiments the swapping of memory pointers can be performed concurrently with steps 3-6.

MTA System Summary—Second IFM with Pad

Example embodiments may be broadly generalized in some embodiments as a second IFM with pad matrix transfer accelerator (MTA) system comprising:
(a) external data memory (EDM);
(b) local data memory (LDM); and
(c) data transfer processor (DTP);
wherein:
the EDM includes one or more output feature map (OFM) storage elements;
the EDM includes one or more filter coefficient multiplier (FCM) storage elements;
the EDM includes one or more input feature map (IFM) storage elements;
the LDM further includes a foreground output feature map (OFM-fore) storage element;
the LDM further includes a background output feature map (OFM-back) storage element;
the LDM further includes a foreground filter coefficient multiplier (FCM-fore) storage element;
the LDM further includes a background filter coefficient multiplier (FCM-back) storage element;
the LDM further includes a foreground input feature map (IFM-fore) storage element;
the DTP is configured to transfer small feature maps (SFM) with pad insertion between the EDM and the LDM by sequentially:
(1) executing a 1D-to-1D data transfer of all the IFM from the EDM to the LDM (1401);
(2) executing a 2D-to-2D data transfer of all input feature maps (IFM) from the LDM to the LDM leaving space in the LDM for zero filling (1402);
(3) executing a peripheral zero-fill operation on the 2D-to-2D data stored in the LDM (1403);
(4) concurrent with steps (4)-(7), executing a 1D-to-1D data transfer of the FCM to the FCM-back via a data transfer from the EDM to the LDM (1404);
(5) concurrent with steps (4)-(7), transferring a previously calculated output feature matrix (OFM) (OFM-back) from the LDM to the EDM (1405);
(6) concurrent with steps (4)-(7), calculating an output matrix product (OMP) and storing the OMP in the OFM-fore via the relation OFM-fore=(FCM-fore*IFM-fore) (1406);
(7) swapping foreground/background ping/pong memory pointers (fore/back) for OFM-fore/OFM-back and FCM-fore/FCM-back (1407); and
(8) removing seams or inserting zero padding in the OMP based on whether output padding is enabled for the OMP (1408, 1409, 1410).

This general system summary may be augmented by the various elements described herein to produce a wide variety of disclosure embodiments consistent with this overall design description. Note, that in alternative embodiments the swapping of memory pointers can be performed concurrently with steps 4-7.

MTA System Summary—Third Small IFM with Pad

Example embodiments may be broadly generalized in some embodiments as a third IFM with pad matrix transfer accelerator (MTA) system comprising:

(a) external data memory (EDM);
(b) local data memory (LDM); and
(c) data transfer processor (DTP);
wherein:
the EDM includes one or more output feature map (OFM) storage elements;
the EDM includes one or more filter coefficient multiplier (FCM) storage elements;
the EDM includes one or more input feature map (IFM) storage elements;
the LDM further includes a foreground output feature map (OFM-fore) storage element;
the LDM further includes a background output feature map (OFM-back) storage element;
the LDM further includes a foreground filter coefficient multiplier (FCM-fore) storage element;
the LDM further includes a background filter coefficient multiplier (FCM-back) storage element;
the LDM further includes a foreground input feature map (IFM-fore) storage element;
the DTP is configured to transfer small feature maps (SFM) with pad insertion between the EDM and the LDM by sequentially:
  (1) executing a 1D-to-1D data transfer of all the IFM from the EDM to the LDM with peripheral zero filling of the LDM data (1601);
  (2) concurrent with steps (2)-(5), executing a 1D-to-1D data transfer of the FCM to the FCM-back via a data transfer from the EDM to the LDM (1602);
  (3) concurrent with steps (2)-(5), transferring a previously calculated output feature matrix (OFM) (OFM-back) from the LDM to the EDM (1603);
  (4) concurrent with steps (2)-(5), calculating an output matrix product (OMP) and storing the OMP in the OFM-fore via the relation OFM-fore=(FCM-fore*IFM-fore) (1604);
  (5) swapping foreground/background ping/pong memory pointers (fore/back) for OFM-fore/OFM-back and FCM-fore/FCM-back (1605); and
  (6) removing seams or inserting zero padding in the OMP based on whether output padding is enabled for the OMP (1606, 1607, 1608).

This general system summary may be augmented by the various elements described herein to produce a wide variety of disclosure embodiments consistent with this overall design description. Note, that in alternative embodiments the swapping of memory pointers can be performed concurrently with steps 2-5.

MTA Method Summary—Large IFM No Pad

The present disclosure method may be broadly generalized as a matrix transfer accelerator (MTA) large IFM no pad method operating in conjunction with a matrix transfer accelerator (MTA) system, the system comprising:
(a) external data memory (EDM);
(b) local data memory (LDM); and
(c) data transfer processor (DTP);
wherein:
the EDM includes one or more input feature map (IFM) storage elements;
the IFM include one or more large feature map (LFM) storage elements;
the DTP is configured to transfer data between the EDM and the LDM;
the method is executed on the DTP and includes the steps of:
  (1) Initializing a column tile processing counter (C=0) (3301);
  (2) Transferring a column tile of LFM[*,C] from the EDM to the LDM (3302);
  (3) Processing data in a first column tile of the LFM [*,C] stored in the LDM (3303);
  (4) Transferring a column tile of the LFM[*,C+1] from the EDM to the LDM (3304);
  (5) Incrementing the column tile counter (C=C+1) (3405);
  (6) Concurrent with operation step (7), processing data in first half of adjacent column tiles of the LFM stored in the LDM (LDM[*,C−1] and LDM[*,C]) (3406);
  (7) Concurrent with operation step (6), transferring a column tile of the LFM[*,C+1] from the EDM to the LDM (3407);
  (8) Processing data in second half of adjacent column tiles of the LFM stored in the LDM (LDM[*,C−1] and LDM[*,C]) (3408); and
  (9) Determining if all column tile processing is complete, and if not, proceeding to the step (5) (3409).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure.

MTA Method Summary—Large OFM No Pad

The present disclosure method may be broadly generalized as a matrix transfer accelerator (MTA) large OFM no pad method operating in conjunction with a matrix transfer accelerator (MTA) system, the system comprising:
(a) external data memory (EDM);
(b) local data memory (LDM); and
(c) data transfer processor (DTP);
wherein:
the LDM includes one or more output feature map (OFM) storage elements;
the OFM include one or more large feature map (LFM) storage elements;
the DTP is configured to transfer data between the EDM and the LDM; the method is executed on the DTP and includes the steps of:
  (1) Initializing a column tile processing counter (C=0) (3501);
  (2) Processing left padding (Lpad) and partial data in a first half of a first column tile of the LFM[*,C] stored in the LDM (3502);
  (3) Processing data in a second half of a first column tile of the LFM[*,C] stored in the LDM (3503);
  (4) Incrementing the column tile counter (C=C+1) (3604);
  (5) Concurrent with operation step (6), processing data in a first half of a column tile of the LFM[*,C] stored in the LDM (3605);
  (6) Concurrent with operation step (5), transferring a column tile of the LFM[*,C−1] from the LDM to the EDM (3606);
  (7) Processing data in a second half of a column tile of the LFM[*,C] stored in the LDM (3607);

(8) Determining if all the LFM tile data in the LDM has been processed (including partial tile data adjacent to right padding (Rpad) data), and if not, proceeding to step (10) (3808);

(9) Transferring a last column tile of LFM[*,C] from the LDM to the EDM (3809); and

(10) Determining if all column tile processing is complete, and if not, proceeding to the step (4) (3810).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure.

MTA Method Summary—Large IFM With Pad

The present disclosure method may be broadly generalized as a matrix transfer accelerator (MTA) large IFM with pad method operating in conjunction with a matrix transfer accelerator (MTA) system, the system comprising:
(a) external data memory (EDM);
(b) local data memory (LDM); and
(c) data transfer processor (DTP);
wherein:
the EDM includes one or more input feature map (IFM) storage elements;
the IFM include one or more large feature map (LFM) storage elements;
the DTP is configured to transfer data between the EDM and the LDM;
the method is executed on the DTP and includes the steps of:

(1) Initializing a column tile processing counter (C=0) (3701);

(2) Padding a left column tile (Lpad) of the LFM[*,C] stored in the LDM (3702);

(3) Transferring a column tile of the LFM[*,C] from the EDM to the LDM (3703);

(4) Incrementing the column tile counter (C=C+1) (3804);

(5) Concurrent with operation step (6), processing data in first half of adjacent column tiles of the LFM stored in the LDM (LDM[*,C−1] and LDM[*,C]) (3805);

(6) Concurrent with operation step (5), transferring a column tile of the LFM[*,C+1] from the EDM to the LDM (3806);

(7) Processing data in second half of adjacent column tiles of the LFM stored in the LDM (LDM[*,C−1] and LDM[*,C]) (3807);

(8) Determining if all the LFM tile data has been transferred to the LDM, and if not, proceeding to step (10) (3808);

(9) Padding a right column tile (Rpad) of the LFM[*,C] stored in the LDM (3809); and

(10) Determining if all column tile processing is complete, and if not, proceeding to the step (4) (3810).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure.

MTA Method Summary—Large OFM with Pad

The present disclosure method may be broadly generalized as a matrix transfer accelerator (MTA) large OFM with pad method operating in conjunction with a matrix transfer accelerator (MTA) system, the system comprising:
(a) external data memory (EDM);
(b) local data memory (LDM); and
(c) data transfer processor (DTP);
wherein:
the LDM includes one or more output feature map (OFM) storage elements;
the OFM include one or more large feature map (LFM) storage elements;
the DTP is configured to transfer data between the EDM and the LDM;
the method is executed on the DTP and includes the steps of:

(1) Initializing a column tile processing counter (C=0) (3901);

(2) Processing data in a first half of a first column tile of the LFM[*,C] stored in the LDM (3902);

(3) Processing data in a second half of the first column tile of the LFM[*,C] stored in the LDM (3903);

(4) Incrementing the column tile counter (C=C+1) (4004);

(5) Concurrent with operation step (6), processing data in a first half of a column tile of the LFM[*,C] stored in the LDM (4005);

(6) Concurrent with operation step (5), transferring a column tile of the LFM[*,C−1] from the LDM to the EDM (4006);

(7) Processing data in a second half of a column tile of the LFM[*,C] stored in the LDM (4007); and (8) Determining if all column tile processing is complete, and if not, proceeding to the step (4) (4008).

This general method may be modified heavily depending on a number of factors, with rearrangement and/or addition/deletion of steps anticipated by the scope of the present disclosure. Integration of this and other embodiment methods in conjunction with a variety of embodiment systems described herein is within the scope of the present disclosure.

MTA Method Summary—Small IFM No Pad

The present disclosure method may be broadly generalized as a matrix transfer accelerator (MTA) small IFM no pad method operating in conjunction with a matrix transfer accelerator (MTA) system, the system comprising:
(a) external data memory (EDM);
(b) local data memory (LDM); and
(c) data transfer processor (DTP);
wherein:
the EDM includes one or more output feature map (OFM) storage elements;
the EDM includes one or more filter coefficient multiplier (FCM) storage elements;
the EDM includes one or more input feature map (IFM) storage elements;
the LDM further includes a foreground output feature map (OFM-fore) storage element;
the LDM further includes a background output feature map (OFM-back) storage element;
the LDM further includes a foreground filter coefficient multiplier (FCM-fore) storage element;

the LDM further includes a background filter coefficient multiplier (FCM-back) storage element;

the LDM further includes a foreground input feature map (IFM-fore) storage element;

the DTP is configured to transfer small feature maps (SFM) between the EDM and the LDM;

the method is executed on the DTP and includes the steps of:
- (1) executing a 1D-to-1D data transfer of all the IFM from the EDM to the LDM (1001);
- (2) concurrent with steps (2)-(5), executing a 1D-to-1D data transfer of the FCM to the FCM-back via a data transfer from the EDM to the LDM (1002);
- (3) concurrent with steps (2)-(5), transferring a previously calculated output feature matrix (OFM) (OFM-back) from the LDM to the EDM (1003);
- (4) concurrent with steps (2)-(5), calculating an output matrix product (OMP) and storing the OMP in the OFM-fore via the relation OFM-fore=(FCM-fore*IFM-fore) (1004);
- (5) swapping foreground/background ping/pong memory pointers (fore/back) for OFM-fore/OFM-back and FCM-fore/FCM-back (1005); and
- (6) removing seams or inserting zero padding in the OMP based on whether output padding is enabled for the OMP (1006, 1007, 1008).

This general method may be modified heavily depending on a number of factors, with rearrangement and/or addition/deletion of steps anticipated by the scope of the present disclosure. Note, that in alternative embodiments the swapping of memory pointers can be performed concurrently with steps 2-5. Integration of this and other embodiment methods in conjunction with a variety of embodiment systems described herein is within the scope of the present disclosure.

MTA Method Summary—First Small IFM with Pad

The present disclosure method may be broadly generalized as a matrix transfer accelerator (MTA) first small IFM with pad method operating in conjunction with a matrix transfer accelerator (MTA) system, the system comprising:
- (a) external data memory (EDM);
- (b) local data memory (LDM); and
- (c) data transfer processor (DTP);

wherein:

the EDM includes one or more output feature map (OFM) storage elements;

the EDM includes one or more filter coefficient multiplier (FCM) storage elements;

the EDM includes one or more input feature map (IFM) storage elements;

the LDM further includes a foreground output feature map (OFM-fore) storage element;

the LDM further includes a background output feature map (OFM-back) storage element;

the LDM further includes a foreground filter coefficient multiplier (FCM-fore) storage element;

the LDM further includes a background filter coefficient multiplier (FCM-back) storage element;

the LDM further includes a foreground input feature map (IFM-fore) storage element;

the DTP is configured to transfer small feature maps (SFM) between the EDM and the LDM;

the method is executed on the DTP and includes the steps of:
- (1) executing a 2D-to-2D data transfer of all the IFM from the EDM to the LDM leaving space in the LDM for zero filling (1201);
- (2) executing a peripheral zero-fill operation on the 2D-to-2D data stored in the LDM (1202);
- (3) concurrent with steps (3)-(6), executing a 1D-to-1D data transfer of the FCM to the FCM-back via a data transfer from the EDM to the LDM (1203);
- (4) concurrent with steps (3)-(6), transferring a previously calculated output feature matrix (OFM) (OFM-back) from the LDM to the EDM (1204);
- (5) concurrent with steps (3)-(6), calculating an output matrix product (OMP) and storing the OMP in the OFM-fore via the relation OFM-fore=(FCM-fore*IFM-fore) (1205);
- (6) swapping foreground/background ping/pong memory pointers (fore/back) for OFM-fore/OFM-back and FCM-fore/FCM-back (1206); and
- (7) removing seams or inserting zero padding in the OMP based on whether output padding is enabled for the OMP (1207, 1208, 1209).

This general method may be modified heavily depending on a number of factors, with rearrangement and/or addition/deletion of steps anticipated by the scope of the present disclosure. Note, that in alternative embodiments the swapping of memory pointers can be performed concurrently with steps 3-6. Integration of this and other embodiment methods in conjunction with a variety of embodiment systems described herein is within the scope of the present disclosure.

MTA Method Summary—Second IFM with Pad

The present disclosure method may be broadly generalized as a matrix transfer accelerator (MTA) second small IFM with pad method operating in conjunction with a matrix transfer accelerator (MTA) system, the system comprising:
- (a) external data memory (EDM);
- (b) local data memory (LDM); and
- (c) data transfer processor (DTP);

wherein:

the EDM includes one or more output feature map (OFM) storage elements;

the EDM includes one or more filter coefficient multiplier (FCM) storage elements;

the EDM includes one or more input feature map (IFM) storage elements;

the LDM further includes a foreground output feature map (OFM-fore) storage element;

the LDM further includes a background output feature map (OFM-back) storage element;

the LDM further includes a foreground filter coefficient multiplier (FCM-fore) storage element;

the LDM further includes a background filter coefficient multiplier (FCM-back) storage element;

the LDM further includes a foreground input feature map (IFM-fore) storage element;

the DTP is configured to transfer small feature maps (SFM) between the EDM and the LDM;

the method is executed on the DTP and includes the steps of:
- (1) executing a 1D-to-1D data transfer of all the IFM from the EDM to the LDM (1401);
- (2) executing a 2D-to-2D data transfer of all input feature maps (IFM) from the LDM to the LDM leaving space in the LDM for zero filling (1402);

(3) executing a peripheral zero-fill operation on the 2D-to-2D data stored in the LDM (1403);

(4) concurrent with steps (4)-(7), executing a 1D-to-1D data transfer of the FCM to the FCM-back via a data transfer from the EDM to the LDM (1404);

(5) concurrent with steps (4)-(7), transferring a previously calculated output feature matrix (OFM) (OFM-back) from the LDM to the EDM (1405);

(6) concurrent with steps (4)-(7), calculating an output matrix product (OMP) and storing the OMP in the OFM-fore via the relation OFM-fore=(FCM-fore*IFM-fore) (1406);

(7) swapping foreground/background ping/pong memory pointers (fore/back) for OFM-fore/OFM-back and FCM-fore/FCM-back (1407); and (8) removing seams or inserting zero padding in the OMP based on whether output padding is enabled for the OMP (1408, 1409, 1410).

This general method may be modified heavily depending on a number of factors, with rearrangement and/or addition/deletion of steps anticipated by the scope of the present disclosure. Note, that in alternative embodiments the swapping of memory pointers can be performed concurrently with steps 4-7. Integration of this and other embodiment methods in conjunction with a variety of embodiment systems described herein is within the scope of the present disclosure.

MTA Method Summary—Third Small IFM with Pad

The present disclosure method may be broadly generalized as a matrix transfer accelerator (MTA) third small IFM with pad method operating in conjunction with a matrix transfer accelerator (MTA) system, the system comprising:
(a) external data memory (EDM);
(b) local data memory (LDM); and
(c) data transfer processor (DTP);
wherein:
the EDM includes one or more output feature map (OFM) storage elements;
the EDM includes one or more filter coefficient multiplier (FCM) storage elements;
the EDM includes one or more input feature map (IFM) storage elements;
the LDM further includes a foreground output feature map (OFM-fore) storage element;
the LDM further includes a background output feature map (OFM-back) storage element;
the LDM further includes a foreground filter coefficient multiplier (FCM-fore) storage element;
the LDM further includes a background filter coefficient multiplier (FCM-back) storage element;
the LDM further includes a foreground input feature map (IFM-fore) storage element;
the DTP is configured to transfer small feature maps (SFM) between the EDM and the LDM;
the method is executed on the DTP and includes the steps of:
(1) executing a 1D-to-1D data transfer of all the IFM from the EDM to the LDM with peripheral zero filling of the LDM data (1601);
(2) concurrent with steps (2)-(5), executing a 1D-to-1D data transfer of the FCM to the FCM-back via a data transfer from the EDM to the LDM (1602);

(3) concurrent with steps (2)-(5), transferring a previously calculated output feature matrix (OFM) (OFM-back) from the LDM to the EDM (1603);

(4) concurrent with steps (2)-(5), calculating an output matrix product (OMP) and storing the OMP in the OFM-fore via the relation OFM-fore=(FCM-fore*IFM-fore) (1604);

(5) swapping foreground/background ping/pong memory pointers (fore/back) for OFM-fore/OFM-back and FCM-fore/FCM-back (1605); and (6) removing seams or inserting zero padding in the OMP based on whether output padding is enabled for the OMP (1606, 1607, 1608).

This general method may be modified heavily depending on a number of factors, with rearrangement and/or addition/deletion of steps anticipated by the scope of the present disclosure. Note, that in alternative embodiments the swapping of memory pointers can be performed concurrently with steps 2-5. Integration of this and other embodiment methods in conjunction with a variety of embodiment systems described herein is within the scope of the present disclosure.

System/Method Variations

The present disclosure anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the MTA further includes a pad-fill direct memory access (DMA) controller (PDC) that includes:
(a) first data transfer processor (FDP);
(b) second data transfer processor (SDP); and
(c) third data transfer processor (TDP);
wherein:
the FDP, the SDP, and the TDP operate in parallel;
the FDP transfers data from the EDM to a first read data buffer (FDB);
the SDP transfers data from a second read data buffer (SDB) to a circular write buffer (CWB) with additional matrix periphery pad-fill during the SDB-to-CWB data transfer;
the TDP path transfers data from the CWB to the LDM;
the data transfers to the FDB are alternated with the SDB in a ping-pong fashion after every completion of the FDP transfer from the EDM to the FDB; and
the data transfers from the SDB are alternated with the FDB in a ping-pong fashion after every completion of the FDP transfer from the EDM to the FDB.

An embodiment wherein the MTA further includes a zero-fill direct memory access (DMA) controller (ZDC) that includes:
(a) first data transfer processor (FDP);
(b) second data transfer processor (SDP); and
(c) third data transfer processor (TDP);
wherein:
the FDP, the SDP, and the TDP operate in parallel;
the FDP transfers data from the EDM to a first read data buffer (FDB);

the SDP transfers data from a second read data buffer (SDB) to a circular write buffer (CWB) with additional matrix periphery zero-fill during the SDB-to-CWB data transfer;
the TDP path transfers data from the CWB to the LDM;
the data transfers to the FDB are alternated with the SDB in a ping-pong fashion after every completion of the FDP transfer from the EDM to the FDB; and
the data transfers from the SDB are alternated with the FDB in a ping-pong fashion after every completion of the FDP transfer from the EDM to the FDB.

An embodiment wherein the MTA further includes a pad-fill direct memory access (DMA) controller (PDC) that transfers data from the EDM to the LDM based on the content of a set of DMA controller registers including:
(a) data width register (DWR);
(b) transfer count register (TCR);
(c) fill count register (FCR);
(d) EDM source address register (ESR); and
(e) LDM target address register (LTR);
wherein:
the PDC transfers matrix data from the EDM at the ESR address to the LDM at the LTR address;
the EDM consists of matrix row data having a data width defined by a width value in the DWR;
the PDC is configured to transfer data from the EDM to the LDM and automatically peripherally pad-fill matrix data written to the LDM based on a count value in the FCR.

An embodiment wherein the MTA further includes a zero-fill direct memory access (DMA) controller (ZDC) that transfers data from the EDM to the LDM based on the content of a set of DMA controller registers including:
(a) data width register (DWR);
(b) transfer count register (TCR);
(c) fill count register (FCR);
(d) EDM source address register (ESR); and
(e) LDM target address register (LTR);
wherein:
the ZDC transfers matrix data from the EDM at the ESR address to the LDM at the LTR address;
the EDM consists of matrix row data having a data width defined by the DWR;
the ZDC is configured to transfer data from the EDM to the LDM and automatically peripherally pad-fill matrix data written to the LDM based on a count value in the FCR.

One skilled in the art will recognize that other embodiments are possible based on any combination of elements taught within the above disclosure description.

Generalized Computer Usable Medium

In various alternate embodiments, the present disclosure may be implemented as a computer program product for use with a computerized computing system. Those skilled in the art will readily appreciate that programs defining the functions defined by the present disclosure can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present disclosure methods, such computer readable media represent alternate embodiments of the present disclosure.

As generally illustrated herein, Example embodiments can incorporate a variety of computer readable media that include computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present disclosure anticipates and includes this type of computer readable media within the scope of the disclosure. Pursuant to In re Nuijten, 500 F.3d 1346 (Fed. Cir. 2007) (U.S. patent application Ser. No. 09/211,928), the present disclosure scope is limited to computer readable media wherein the media is both tangible and non-transitory.

A matrix transfer accelerator (MTA) system/method that coordinates data transfers between an external data memory (EDM) and a local data memory (LDM) using matrix tiling and/or grouping has been disclosed. The system utilizes foreground/background buffering that overlaps compute and data transfer operations and permits EDM-to-LDM data transfers with or without zero pad peripheral matrix filling. The system may incorporate an automated zero-fill direct memory access (DMA) controller (ZDC) that transfers data from the EDM to the LDM based on a set of DMA controller registers including data width register (DWR), transfer count register (TCR), fill count register (FCR), EDM source address register (ESR), and LDM target address register (LTR). The ZDC transfers matrix data from the EDM[ESR] to the LDM[LTR] such that EDM matrix data of DWR row data width is automatically zero-filled around a periphery of a matrix written to the LDM matrix based on the FCR value.

What is claimed is:
1. A matrix transfer accelerator (MTA) system comprising:
an external data memory (EDM);
a local data memory (LDM); and
a data transfer processor (DTP);
wherein:
said EDM includes one or more input feature map (IFM) storage elements;
said IFM include one or more large feature map (LFM) storage elements;
said DTP is configured to transfer data between said EDM and said LDM by:
initializing a column tile processing counter;
transferring a first column tile of said LFM that corresponds to said column tile processing counter from said EDM to said LDM;
processing data in said first column tile stored in said LDM;
transferring a second column tile of said LFM that corresponds to one greater than said column tile processing counter from said EDM to said LDM;
incrementing said column tile processing counter;
processing data in a first half of said first column tile and said second column tile of said LFM stored in said LDM;
concurrent with said processing of said data in said first half of said first column tile and said second column tile, transferring a third column tile of said LFM that corresponds to one greater than said incremented column tile processing counter from said EDM to said LDM;
processing data in a second half of said first column tile and said second column tile of said LFM stored in said LDM; and
determining if all column tile processing is complete, and if not, proceeding to said incrementing of said column tile processing counter.

2. The matrix transfer accelerator (MTA) system of claim 1 wherein said MTA further includes a pad-fill direct memory access (DMA) controller (PDC) that includes:
a first data transfer processor (FDP);
a second data transfer processor (SDP); and
a third data transfer processor (TDP);
wherein:
said FDP, said SDP, and said TDP operate in parallel;
said FDP transfers data from said EDM to a first read data buffer (FDB);
said SDP transfers data from a second read data buffer (SDB) to a circular write buffer (CWB) with additional matrix periphery pad-fill during said SDB-to-CWB data transfer;
said TDP transfers data from said CWB to said LDM;
said data transfers to said FDB are alternated with said SDB in a ping-pong fashion after every completion of said FDP transfer from said EDM to said FDB; and
said data transfers from said SDB are alternated with said FDB in a ping-pong fashion after every completion of said FDP transfer from said EDM to said FDB.

3. The matrix transfer accelerator (MTA) system of claim 1 wherein said MTA further includes a zero-fill direct memory access (DMA) controller (ZDC) that includes:
a first data transfer processor (FDP);
a second data transfer processor (SDP); and
a third data transfer processor (TDP);
wherein:
said FDP, said SDP, and said TDP operate in parallel;
said FDP transfers data from said EDM to a first read data buffer (FDB);
said SDP transfers data from a second read data buffer (SDB) to a circular write buffer (CWB) with additional matrix periphery zero-fill during said SDB-to-CWB data transfer;
said TDP transfers data from said CWB to said LDM;
said data transfers to said FDB are alternated with said SDB in a ping-pong fashion after every completion of said FDP transfer from said EDM to said FDB; and
said data transfers from said SDB are alternated with said FDB in a ping-pong fashion after every completion of said FDP transfer from said EDM to said FDB.

4. The matrix transfer accelerator (MTA) system of claim 1 wherein said MTA further includes a pad-fill direct memory access (DMA) controller (PDC) that transfers data from said EDM to said LDM based on the content of a set of DMA controller registers including:
a data width register (DWR);
a transfer count register (TCR);
a fill count register (FCR);
an EDM source address register (ESR); and
an LDM target address register (LTR);
wherein:
said PDC transfers matrix data from said EDM at said ESR address to said LDM at said LTR address;
said EDM consists of matrix row data having a data width defined by a width value in said DWR; and
said PDC is configured to transfer data from said EDM to said LDM and automatically peripherally pad-fill matrix data written to said LDM based on a count value in said FCR.

5. The matrix transfer accelerator (MTA) system of claim 1 wherein said MTA further includes a zero-fill direct memory access (DMA) controller (ZDC) that transfers data from said EDM to said LDM based on the content of a set of DMA controller registers including:
a data width register (DWR);
a transfer count register (TCR);
a fill count register (FCR);
an EDM source address register (ESR); and
an LDM target address register (LTR);
wherein:
said ZDC transfers matrix data from said EDM at said ESR address to said LDM at said LTR address;
said EDM consists of matrix row data having a data width defined by said DWR; and
said ZDC is configured to transfer data from said EDM to said LDM and automatically peripherally pad-fill matrix data written to said LDM based on a count value in said FCR.

6. A matrix transfer accelerator (MTA) system comprising:
external data memory (EDM);
local data memory (LDM); and
data transfer processor (DTP);
wherein:
said LDM includes one or more output feature map (OFM) storage elements;
said OFM include one or more large feature map (LFM) storage elements;
said DTP is configured to transfer data between said EDM and said LDM by:
initializing a column tile processing counter;
processing left padding (Lpad) and partial data in a first half of a first column tile of said LFM that corresponds to said column tile processing counter and is stored in said LDM;
processing data in a second half of said first column tile of said LFM stored in said LDM;
incrementing said column tile processing counter;
processing data in a first half of a second column tile of said LFM that corresponds to said incremented column tile processing counter and is stored in said LDM;
concurrent with said processing of said data in said first half of said second column tile, transferring said first column tile of said from said LDM to said EDM;
processing data in a second half of said second column tile of said LFM stored in said LDM;
determining if all said LFM tile data in the said LDM has been processed (including partial tile data adjacent to right padding (Rpad) data);
transferring a last column tile of said LFM from said LDM to said EDM; and
determining if all column tile processing is complete, and if not, proceeding to said incrementing of said column tile processing counter.

7. The matrix transfer accelerator (MTA) system of claim 6 wherein said MTA further includes a pad-fill direct memory access (DMA) controller (PDC) that includes:
a first data transfer processor (FDP);
a second data transfer processor (SDP); and
a third data transfer processor (TDP);

wherein:
said FDP, said SDP, and said TDP operate in parallel;
said FDP transfers data from said EDM to a first read data buffer (FDB);
said SDP transfers data from a second read data buffer (SDB) to a circular write buffer (CWB) with additional matrix periphery pad-fill during said SDB-to-CWB data transfer;
said TDP transfers data from said CWB to said LDM;
said data transfers to said FDB are alternated with said SDB in a ping-pong fashion after every completion of said FDP transfer from said EDM to said FDB; and
said data transfers from said SDB are alternated with said FDB in a ping-pong fashion after every completion of said FDP transfer from said EDM to said FDB.

8. The matrix transfer accelerator (MTA) system of claim 6 wherein said MTA further includes a zero-fill direct memory access (DMA) controller (ZDC) that includes:
a first data transfer processor (FDP);
a second data transfer processor (SDP); and
a third data transfer processor (TDP);
wherein:
said FDP, said SDP, and said TDP operate in parallel;
said FDP transfers data from said EDM to a first read data buffer (FDB);
said SDP transfers data from a second read data buffer (SDB) to a circular write buffer (CWB) with additional matrix periphery zero-fill during said SDB-to-CWB data transfer;
said TDP transfers data from said CWB to said LDM;
said data transfers to said FDB are alternated with said SDB in a ping-pong fashion after every completion of said FDP transfer from said EDM to said FDB; and
said data transfers from said SDB are alternated with said FDB in a ping-pong fashion after every completion of said FDP transfer from said EDM to said FDB.

9. The matrix transfer accelerator (MTA) system of claim 6 wherein said MTA further includes a pad-fill direct memory access (DMA) controller (PDC) that transfers data from said EDM to said LDM based on the content of a set of DMA controller registers including:
a data width register (DWR);
a transfer count register (TCR);
a fill count register (FCR);
an EDM source address register (ESR); and
an LDM target address register (LTR);
wherein:
said PDC transfers matrix data from said EDM at said ESR address to said LDM at said LTR address;
said EDM consists of matrix row data having a data width defined by a width value in said DWR; and
said PDC is configured to transfer data from said EDM to said LDM and automatically peripherally pad-fill matrix data written to said LDM based on a count value in said FCR.

10. The matrix transfer accelerator (MTA) system of claim 6 wherein said MTA further includes a zero-fill direct memory access (DMA) controller (ZDC) that transfers data from said EDM to said LDM based on the content of a set of DMA controller registers including:
a data width register (DWR);
a transfer count register (TCR);
a fill count register (FCR);
an EDM source address register (ESR); and
an LDM target address register (LTR);
wherein:
said ZDC transfers matrix data from said EDM at said ESR address to said LDM at said LTR address;
said EDM consists of matrix row data having a data width defined by said DWR; and
said ZDC is configured to transfer data from said EDM to said LDM and automatically peripherally pad-fill matrix data written to said LDM based on a count value in said FCR.

11. A system comprising:
a first memory configured to store a feature map;
a second memory; and
a data transfer processor coupled between the first memory and the second memory, wherein:
the data transfer processor includes a column tile counter configured to store a count; and
the data transfer processor is configured to:
transfer a first column tile of the feature map that corresponds to the count from the first memory to the second memory;
process the first column tile stored in the second memory;
transfer a second column tile of the feature map that corresponds to one greater than the count from the first memory to the second memory;
increment the count;
concurrently process data in a first half of the first column tile and the second column tile stored in the second memory and transfer a third column tile of the feature map that corresponds to one greater than the incremented count from the first memory to the second memory; and
process data in a second half of the first column tile and the second column tile.

12. The system of claim 11, wherein:
the system further comprises a pad fill controller that includes:
a first data transfer processor;
a second data transfer processor;
a third data transfer processor;
a first read buffer and a second read buffer configured in a ping-pong configuration; and
a write buffer;
the first data transfer processor is configured to transfer data from the first memory to the first read buffer and the second read buffer;
the second data transfer processor is configured to transfer data from the first read buffer and the second read buffer to the write buffer and to pad fill the data transferred to the write buffer; and
the third data transfer processor is configured to transfer data from the write buffer to the second memory.

13. The system of claim 11, wherein:
the system further comprises a zero fill controller that includes:
a first data transfer processor;
a second data transfer processor;
a third data transfer processor;
a first read buffer and a second read buffer configured in a ping-pong configuration; and
a write buffer;
the first data transfer processor is configured to transfer data from the first memory to the first read buffer and the second read buffer;
the second data transfer processor is configured to transfer data from the first read buffer and the second read buffer to the write buffer and to zero fill the data transferred to the write buffer; and the third data transfer processor is configured to transfer data from the write buffer to the second memory.

14. The system of claim 11, wherein:

the system further comprises a pad fill controller and a set of memory registers that include:

a data width register;

a transfer count register;

a fill count register;

a source address register; and a target address register;

wherein:

the pad fill controller is configured to transfer matrix data from the first memory based on the source address register to the second memory based on the target address register;

the matrix data has a data width specified by the data width register; and the pad fill controller is configured to pad fill the matrix data during the transfer to the second memory based on the fill count register.

15. The system of claim 11, wherein:

the system further comprises a zero fill controller and a set of memory registers that include:

a data width register;

a transfer count register;

a fill count register;

a source address register; and a target address register;

wherein:

the zero fill controller is configured to transfer matrix data from the first memory based on the source address register to the second memory based on the target address register;

the matrix data has a data width specified by the data width register; and the zero fill controller is configured to zero fill the matrix data during the transfer to the second memory based on the fill count register.

\* \* \* \* \*